United States Patent
Imagawa et al.

(10) Patent No.: US 7,596,177 B2
(45) Date of Patent: *Sep. 29, 2009

(54) IMAGE GENERATION APPARATUS AND IMAGE GENERATION METHOD

(75) Inventors: Taro Imagawa, Osaka (JP); Takeo Azuma, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/785,367

(22) Filed: Apr. 17, 2007

(65) Prior Publication Data

US 2007/0189386 A1 Aug. 16, 2007

Related U.S. Application Data

(63) Continuation of application No. PCT/JP2006/310976, filed on Jun. 1, 2006.

(30) Foreign Application Priority Data

Jun. 22, 2005 (JP) .............................. 2005-182646
Jan. 27, 2006 (JP) .............................. 2006-019138

(51) Int. Cl.
*H04N 7/12* (2006.01)
*G06K 9/36* (2006.01)

(52) U.S. Cl. .................................. 375/240.03; 382/236

(58) Field of Classification Search ............. 375/240.3, 375/240.16, 240.17, 240.21, 240.18, 240.03; 382/236; 348/14.12, 448

See application file for complete search history.

(56) References Cited

U.S. PATENT DOCUMENTS 5,821,986 A * 10/1998 Yuan et al. ............... 348/14.12

(Continued)

FOREIGN PATENT DOCUMENTS

JP 2003-203237 7/2003

(Continued)

OTHER PUBLICATIONS

Toru Matsunobu et al., "Generation of High Resolution Video Using Morphing", Technical report of IEICE, PRMU2004-178, (Jan. 2005), pp. 85-90, and its English translation.

(Continued)

*Primary Examiner*—Gims S Philippe
(74) *Attorney, Agent, or Firm*—Wenderoth, Lind & Ponack, L.L.P.

(57) ABSTRACT

An image generation apparatus includes an image receiving unit which receives a first video sequence including frames having a first resolution and a second video sequence including frames having a second resolution which is higher than the first resolution. Each frame of the first video sequence is obtained with a first exposure time, and each frame of the second video sequence is obtained with a second exposure time which is longer than the first exposure time. The image generation apparatus also includes an image integration unit which generates, from the first video sequence and the second video sequence, a new video sequence including frames having a resolution which is equal to or higher than the second resolution, at a frame rate which is equal to or higher than a frame rate of the first video sequence. The new video sequence is generated by reducing a difference between a value of each frame of the second video sequence and a sum of values of frames of the new video sequence which are included within an exposure period of the frame of the second video sequence.

12 Claims, 42 Drawing Sheets

U.S. PATENT DOCUMENTS

2005/0195899 A1* 9/2005 Han .................. 375/240.21
2005/0219642 A1* 10/2005 Yachida et al. ............. 358/448
2006/0165179 A1* 7/2006 Feuer et al. ............ 375/240.18

FOREIGN PATENT DOCUMENTS

JP 2003-234931 8/2003
JP 2004-040422 2/2004

OTHER PUBLICATIONS

Kiyotaka Watanabe et al., "Generation of High Resolution Video Sequence from Two Video Sequences with Different Spatio-temporal Frequencies," Information Technology Letters (FIT2004), vol. 3, No. LI-004, 2004, pp. 169-172, and its English translation.

* cited by examiner

FIG. 7
(a) Two-camera system
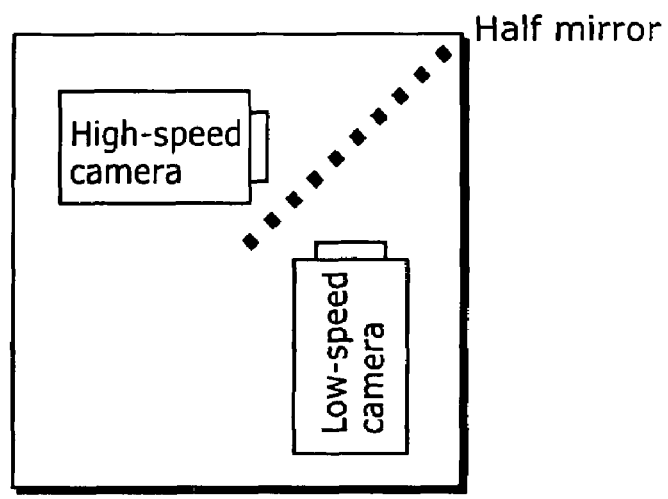
(b) Two-element system
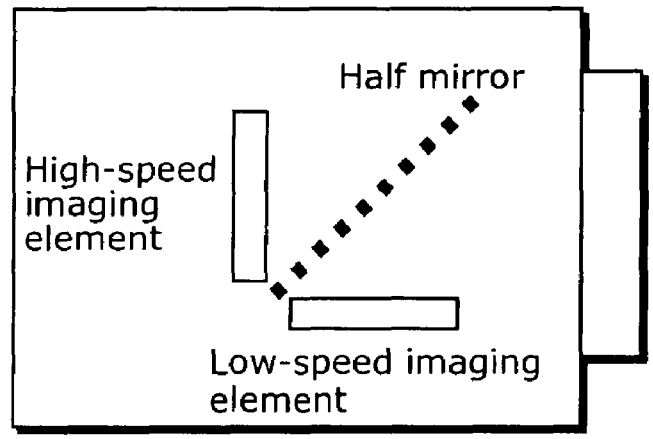
(c) One-element system
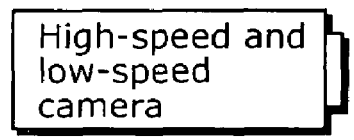

(a) High-speed and high-resolution video sequence HH(x, y, t)

(b) High-speed and low-resolution video sequence HL($x_L$, $y_L$, t)

(c) Low-speed and high-resolution video sequence LH(x, y, $t_L$)

FIG. 9
(a)
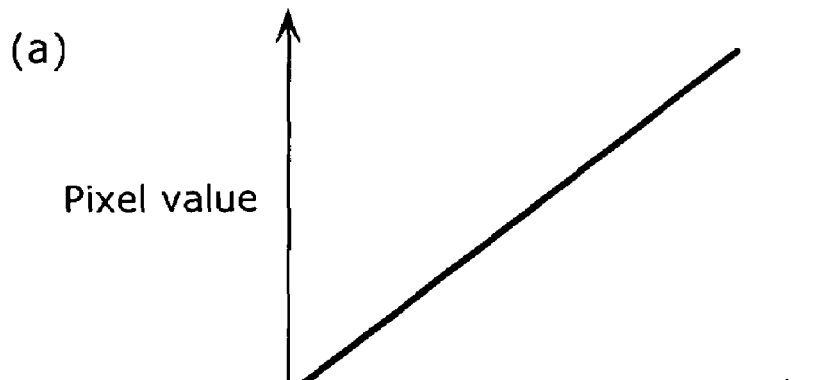
(b)
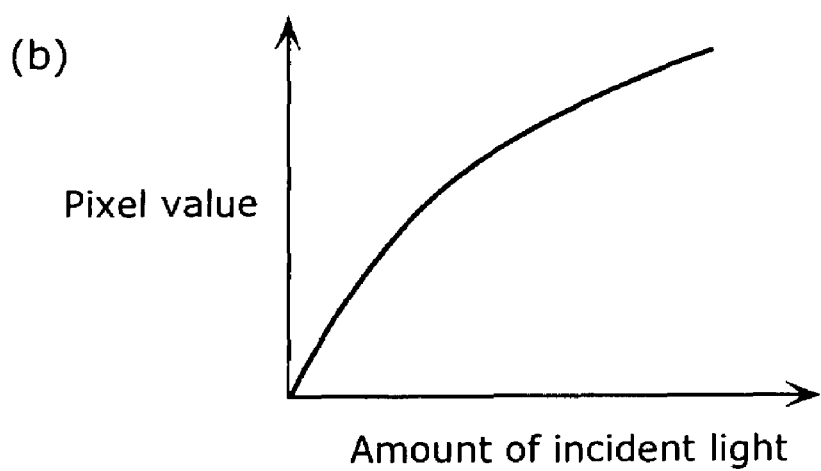
(c)
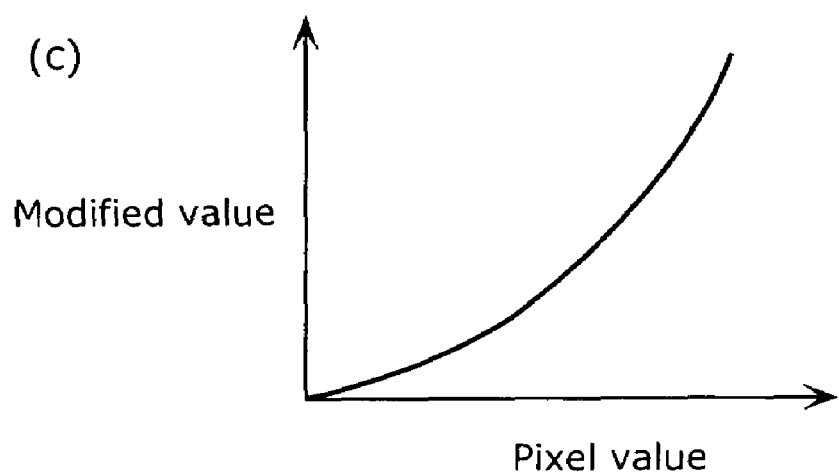

FIG. 10
(a)
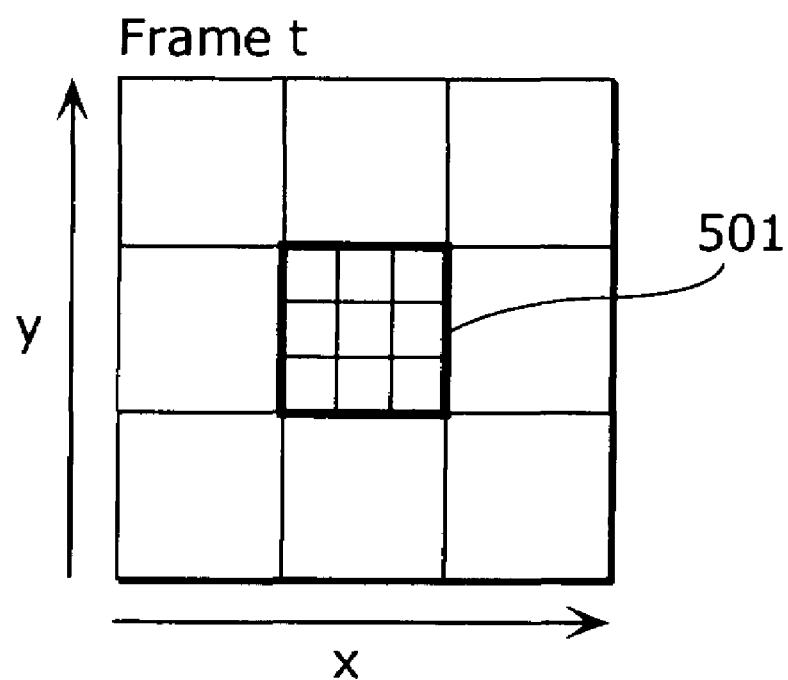
(b)
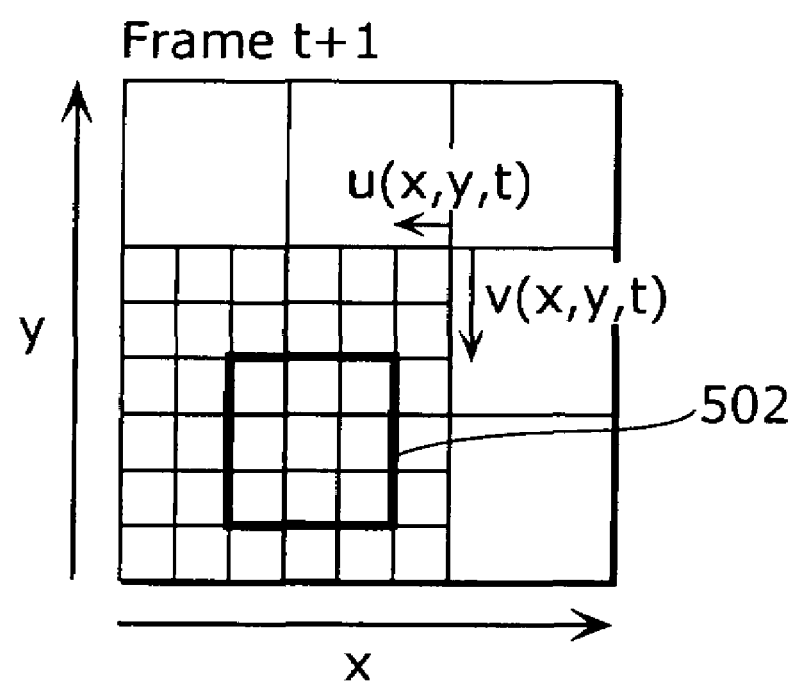

(a)

(b)

(c)

(d)

FIG. 19
(a) 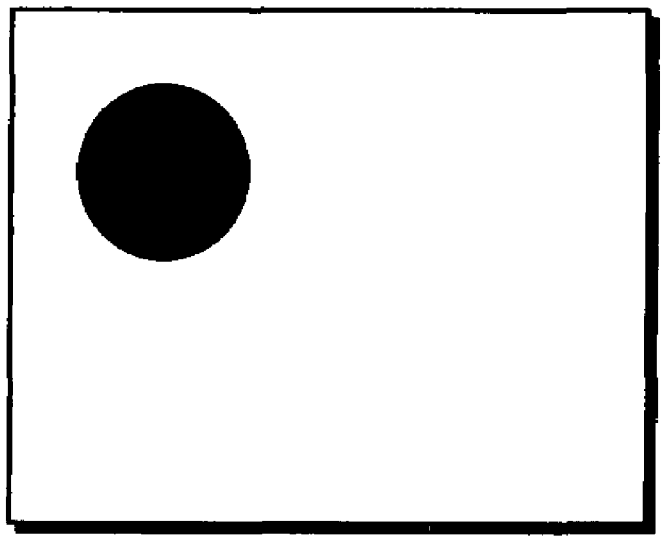
(b) 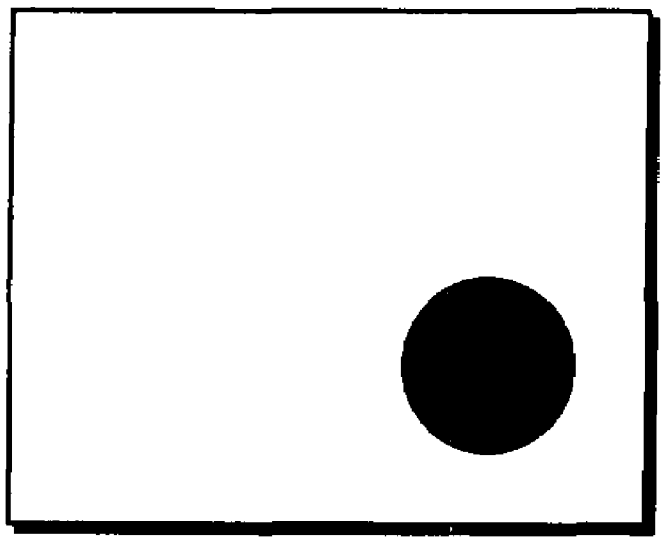

FIG. 20
(a)
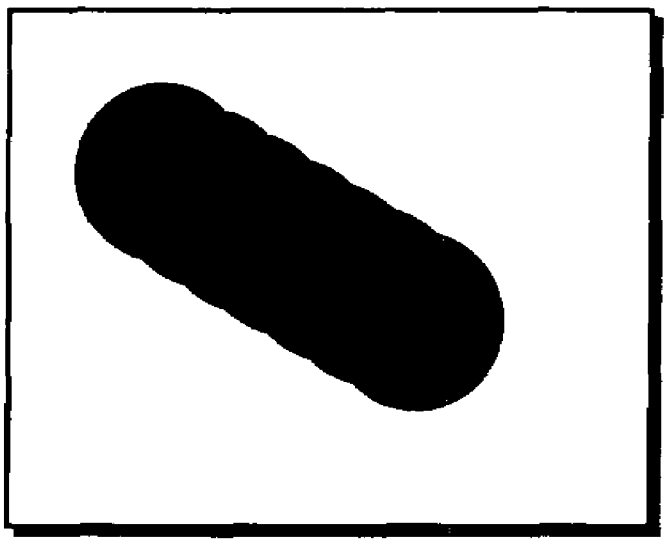
(b)
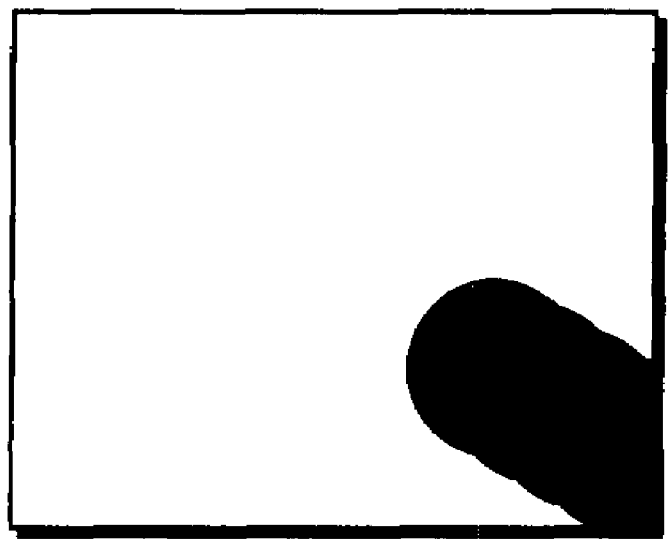

(a)

(b)

(c)

(d)

(e)

(n is a natural number)

FIG. 39
(a)
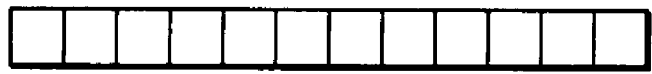
(b)

FIG. 40
(a)
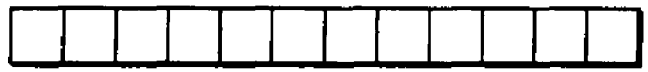
(b)
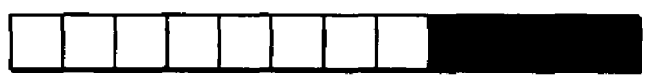

FIG. 41
(a)
(b)
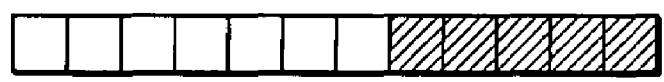

FIG. 42
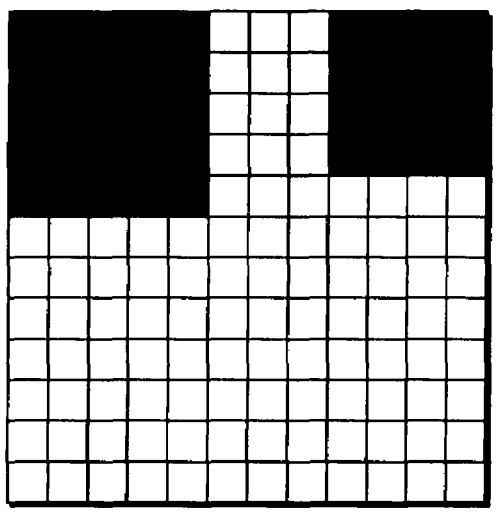
(a)
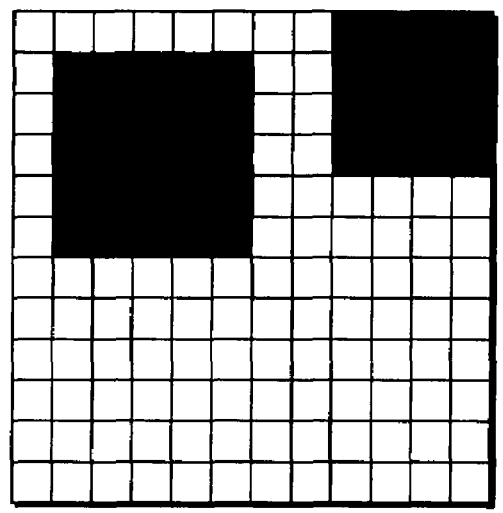
(b)
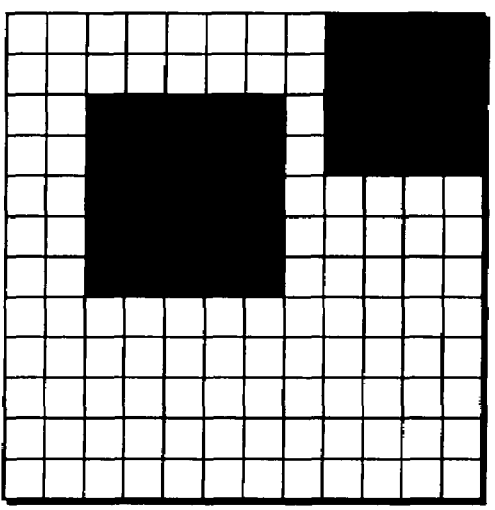
(c)
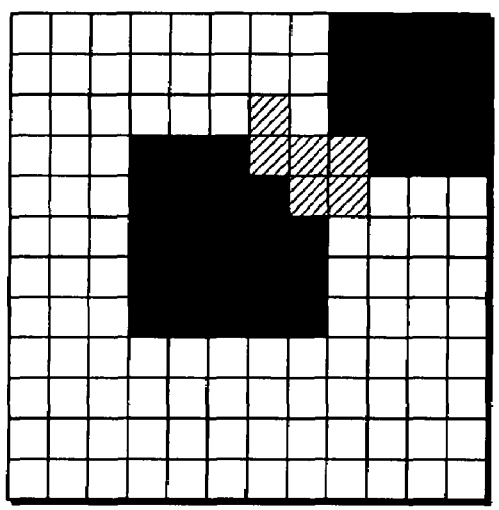
(d)
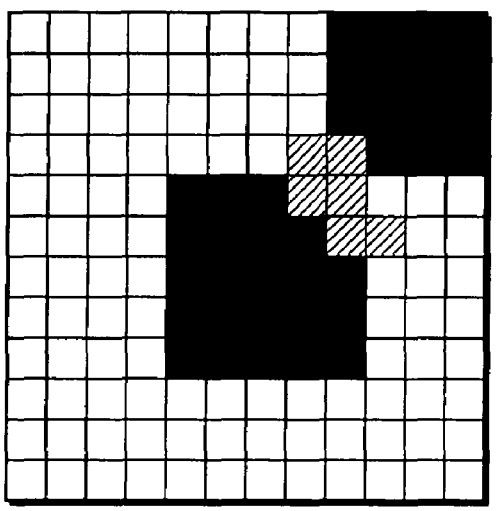
(e)
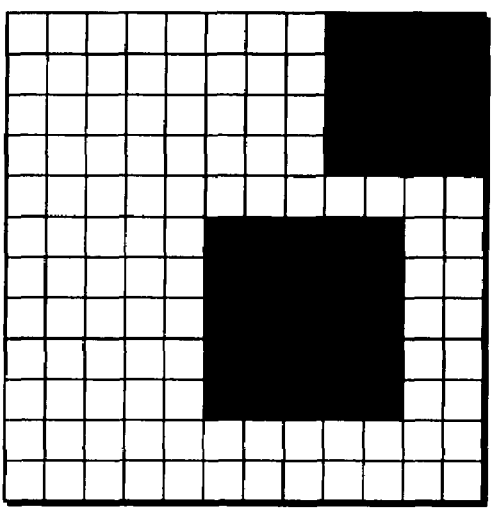
(f)

FIG. 44
(a)
(b)

FIG. 45
(a)
(b)

FIG. 46
(a)
(b)
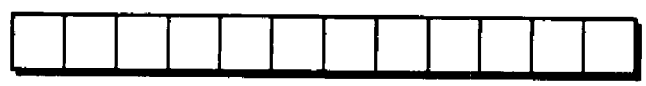

IMAGE GENERATION APPARATUS AND IMAGE GENERATION METHOD

CROSS REFERENCE TO RELATED APPLICATION

This is a continuation application of PCT application No. PCT/JP2006/310976 filed Jun. 1, 2006, designating the United States of America.

BACKGROUND OF THE INVENTION (1) Field of the Invention

The present invention relates to an image generation apparatus that generates a video sequence, and particularly to an image generation apparatus that generates, from a plurality of video sequences, a new video sequence having all the excellent properties of the plurality of video sequences.

(2) Description of the Related Art

With the development in digital imaging devices, they have been capable of capturing still images with high spatial resolution at relatively low cost. However, there is a problem to be solved in order to obtain images which move smoothly (for example, at approximately 30 frames per second) while maintaining the high spatial resolution equivalent to such a high spatial resolution of still images, and to further increase image capturing speed.

This is because the speed of transferring image information in an imaging device is not high enough for an enormous amount of image information obtained per unit time, and a special imaging device is needed for transferring a plurality of pieces of image information in parallel, thereby the cost of a photographing apparatus increases or a separate adjustment of the properties of the imaging device is required.

In one of the conventional image generation methods for obtaining images of a high spatial and temporal resolution, morphing is performed based on the detected corresponding points between the frames of a video sequence captured by a high-speed and low-resolution camera and a video sequence captured by a low-speed and high-resolution camera (see, for example, Japanese Patent Application Laid-Open No. 2003-203237 (FIG. 13). FIG. 1 is a diagram for explaining the conventional image generation method described in Japanese Patent Application Laid-Open No. 2003-203237. Note that in the specification of the present application, "high speed" (or "low speed") as an imaging capability or a property of a video sequence means a relatively high frame rate (or a relatively low frame rate), and "high resolution" (or "low resolution") means a relatively high spatial resolution (or a relatively low spatial resolution).

In FIG. 1, a high-speed and low-resolution camera A01 and a low-speed and high-resolution camera A02 photograph the same object at the same angle in synchronization with each other. FIG. 2 shows the relationship between the images captured by the camera A01 and the images captured by the camera A02. In FIG. 2, the frames captured by these two cameras A01 and A02 are shown in time order. Frames B01 and B02 are the images captured by the camera A02, while frames B11 to B15 are the images captured by the camera 01. In this diagram, the difference in spatial resolution is represented by the sizes of the images, and the frames B11 to B15 have a smaller number of pixels and thus a lower spatial resolution than that of the frames B01 and B02. On the other hand, since the frame rate of the camera A01 is higher than that of the camera A02, the camera A01 captures four frames while the camera A02 captures one frame. The camera A01 captures the frames in synchronization with the frame capturing by the camera A02 (i.e., the frames B01 and B11 are captured at the same time, and the frames B02 and B15 are captured at the same time). A method for generating a high resolution intermediate frame image which corresponds to the frame B23 in terms of position (and to the frame B13 in terms of capturing time) will be described below as an example.

As for the frame images captured as mentioned above, a primary matching unit A03 calculates the correspondence of pixels between adjacent frames in the video sequence captured by the high-speed camera A01. Here, the correspondence is the relationship between a position of a part of an object represented by each pixel in a frame image and a position of the corresponding pixel in another frame image. Next, by combining the correspondences between respective adjacent high-speed images, the primary matching unit A03 calculates the correspondence between each pixel of the high-speed camera frame B13 located at the time of the frame B23 to be generated and each pixel of the high-speed camera frame B11 captured in synchronization with the low-speed camera frame.

Next, a secondary matching unit A04 combines the positional relationship between the pixels of the low-speed camera frame B01 and the high-speed camera frame B11 captured in synchronization with each other, the positional relationship between the pixels of the frame B13 and the frame B23, and the correspondence between the frame B11 and the frame B13 calculated by the primary matching unit A03, so as to determine the correspondence of the pixels between the frame B01 and the frame B23.

Next, an image generation unit A05 determines the pixel values of the frame B23 using the pixel values of the frame B01 based on the correspondence of the pixels between the frame B01 and the frame B02, so as to generate the high-resolution intermediate frame image B23. The image generation unit A05 generates other intermediate frames in the same manner so as to generate a high-resolution and high-speed video sequence.

The other related documents (Toru MATSUNOBU, et al., "Generation of High Resolution Video Using Morphing", Technical Report of IEICE, PRMU 2004-178, and Kiyotaka WATANABE, et al., "Generation of High Resolution Video Sequence from Two Video Sequences with Different Spatio-temporal Frequencies", Information Technology Letters (FIT 2004), Vol. 3, No. LI-004, 2004) also show the similar methods for generating high-resolution intermediate frame images using a video sequence captured by a high-speed and low-resolution camera and a video sequence captured by a low-speed and high-resolution camera, i.e., by estimating motions between frames of the high-speed video sequence and then morphing the frames of the low-speed and high-resolution video sequence in accordance with the motions.

SUMMARY OF THE INVENTION

However, the above-mentioned conventional art is based on the premise that an accurate correspondence can be obtained between adjacent high-speed frame images and that the accurate motion estimation can be performed, and therefore has a problem that a significantly deteriorated image is generated or a merely enlarged low-resolution image is generated if the accurate correspondence cannot be obtained or the accurate motion estimation cannot be performed. Generally, it is difficult to accurately calculate a correspondence between frames or estimate motions for all the pixels, in the case, for example, where a moving object in a video sequence makes complex motions, an illumination condition changes, occlusion occurs, or an aperture problem occurs.

More specifically, in a frame in which a high-resolution image is present, a clear image is generated using the high-resolution image itself. Then, the quality of the images generated using the following successive frames in which only low-resolution images are present deteriorates gradually, and suddenly a clear image is again generated without deterioration in a frame in which a high-resolution image is present. Such variations in the image clarity depending on frames brings discomfort to human perception.

In view of the above problems, it is an object of the present invention to provide an image generation apparatus and a method therefor which are capable of generating a new video sequence by integrating a plurality of video sequences even if they include image areas in which an accurate correspondence cannot be detected or accurate motion estimation cannot be performed.

In order to achieve the above object, the image generation apparatus according to the present invention includes: an image receiving unit that receives a first video sequence including frames having a first resolution and a second video sequence including frames having a second resolution which is higher than the first resolution, each frame of the first video sequence being obtained with a first exposure time, and each frame of the second video sequence being obtained with a second exposure time which is longer than the first exposure time; and an image integration unit that generates, from the first video sequence and the second video sequence, a new video sequence including frames having a resolution which is equal to or higher than the second resolution, at a frame rate which is equal to or higher than a frame rate of the first video sequence, by reducing a difference between a value of each frame of the second video sequence and a sum of values of frames of the new video sequence which are included within an exposure period of the frame of the second video sequence.

With this structure, for example, when the image receiving unit receives the low-resolution first video sequence at a high frame rate and the high-resolution second video sequence at a low frame rate, the image integration unit can generate the new video sequence having the same resolution as that of the second video sequence at the same frame rate as that of the first video sequence. In other words, it can generate a new video sequence having all the excellent properties of the inputted plurality of video sequences.

In addition, the new video sequence is generated so as to reduce the difference between each frame value of the second video sequence and the sum of the values of frames of the new video sequence included within the exposure period of each frame of the second video sequence. Therefore, the image information included in one frame of the second video sequence is reflected in all the plurality of frames of the new video sequence to be generated. As a result, variations in image clarity from frame to frame are smoothed and a video sequence with less perceptual discomfort can be obtained.

Note that it is possible to embody the present invention not only as such an image generation apparatus, but also as an image generation method, a program for causing a computer to execute the method, a computer-readable recording medium, such as a CD-ROM, on which the program is recorded, and so forth.

According to the image generation apparatus of the present invention, it is possible to generate a new video sequence with an improved spatial and temporal resolution even if an original video sequence includes an image area in which an accurate correspondence cannot always be calculated or accurate motion estimation cannot always be performed. For example, it is possible to reliably generate, from a plurality of video sequences, a new video sequence having all the excellent properties of the plurality of video sequences.

In addition, it is possible to obtain a video sequence with less discomfort to human perception by smoothing the variations in image clarity from frame to frame.

The disclosure of Japanese Patent Application No. 2005-182646 filed on Jun. 22, 2005 and Japanese Patent application No. 2006-019138 filed on Jan. 27, 2006 including specifications, drawings and claims are incorporated herein by reference in their entirety.

The disclosure of PCT application No. PCT/JP2006/310976 filed Jun. 1, 2006, including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 7 is a diagram which shows specific examples of photographing devices;

FIG. 9 is graphs which show examples of relationship between the amount of incident light and pixel values used for obtaining modified pixel values;

FIG. 10 is a diagram which shows the relationship between the result of motion estimation obtained from a high-speed and low-resolution video sequence and a high-speed and high-resolution video sequence;

FIG. 19 is a diagram which shows examples of frame images of a low-speed and high-resolution video sequence captured with a short exposure time;

FIG. 20 is a diagram which shows examples of frame images of a low-speed and high-resolution video sequence captured with a long exposure time;

FIG. 39 is a diagram which shows examples of inputted field images;

FIG. 40 is a diagram which shows examples of inputted field images;

FIG. 41 is a diagram which shows examples of inputted field images;

FIG. 42 is a diagram which shows examples of frame images of a video sequence generated without using confidence levels;

FIG. 44 is a diagram which shows examples of inputted field images;

FIG. 45 is a diagram which shows examples of inputted field images; and

FIG. 46 is a diagram which shows examples of inputted field images.

DETAILED DESCRIPTION OF THE INVENTION

First Embodiment

Figure 1:
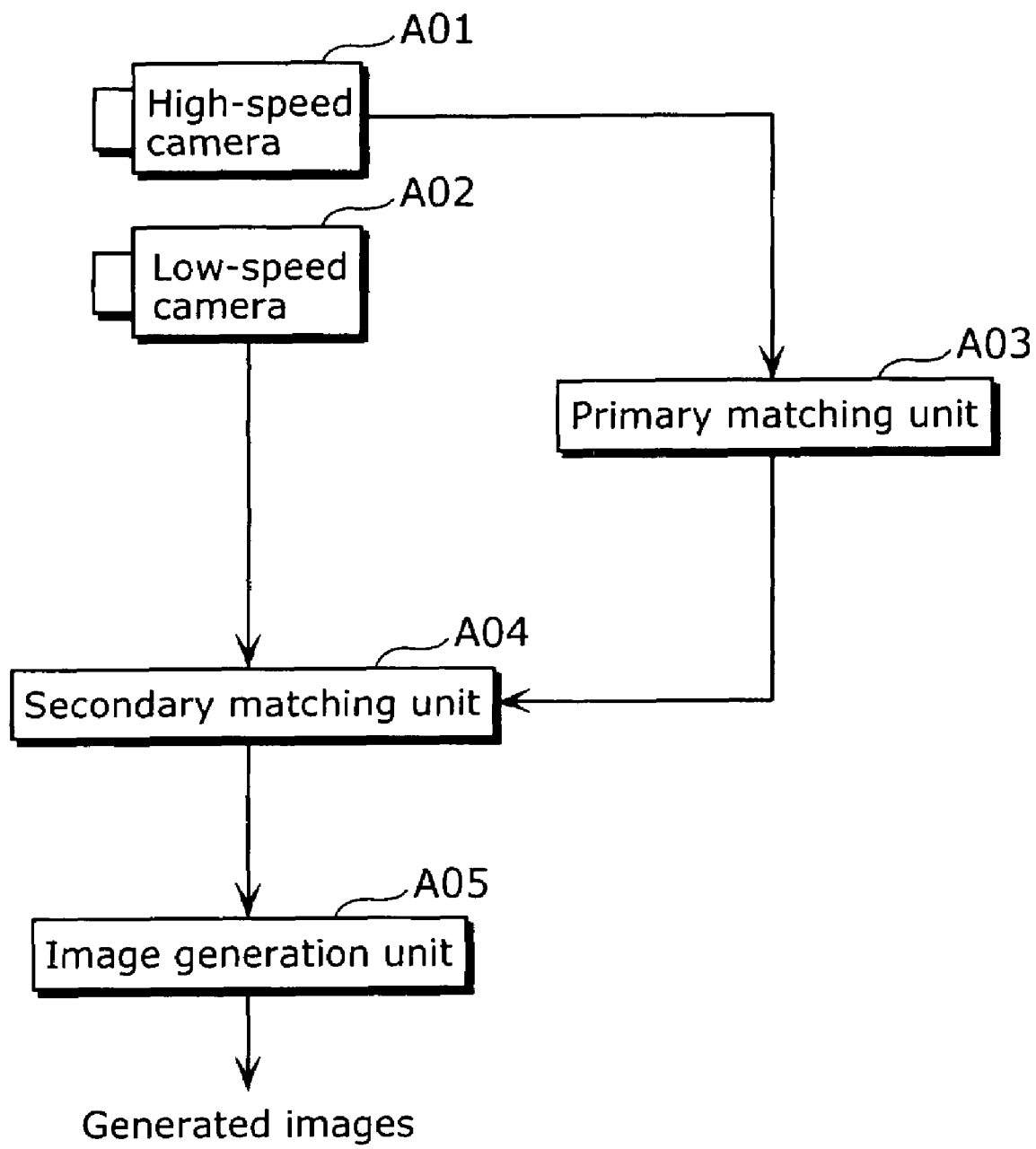
FIG. 1 is a block diagram which shows the structure of a conventional image generation apparatus.
Figure 2:
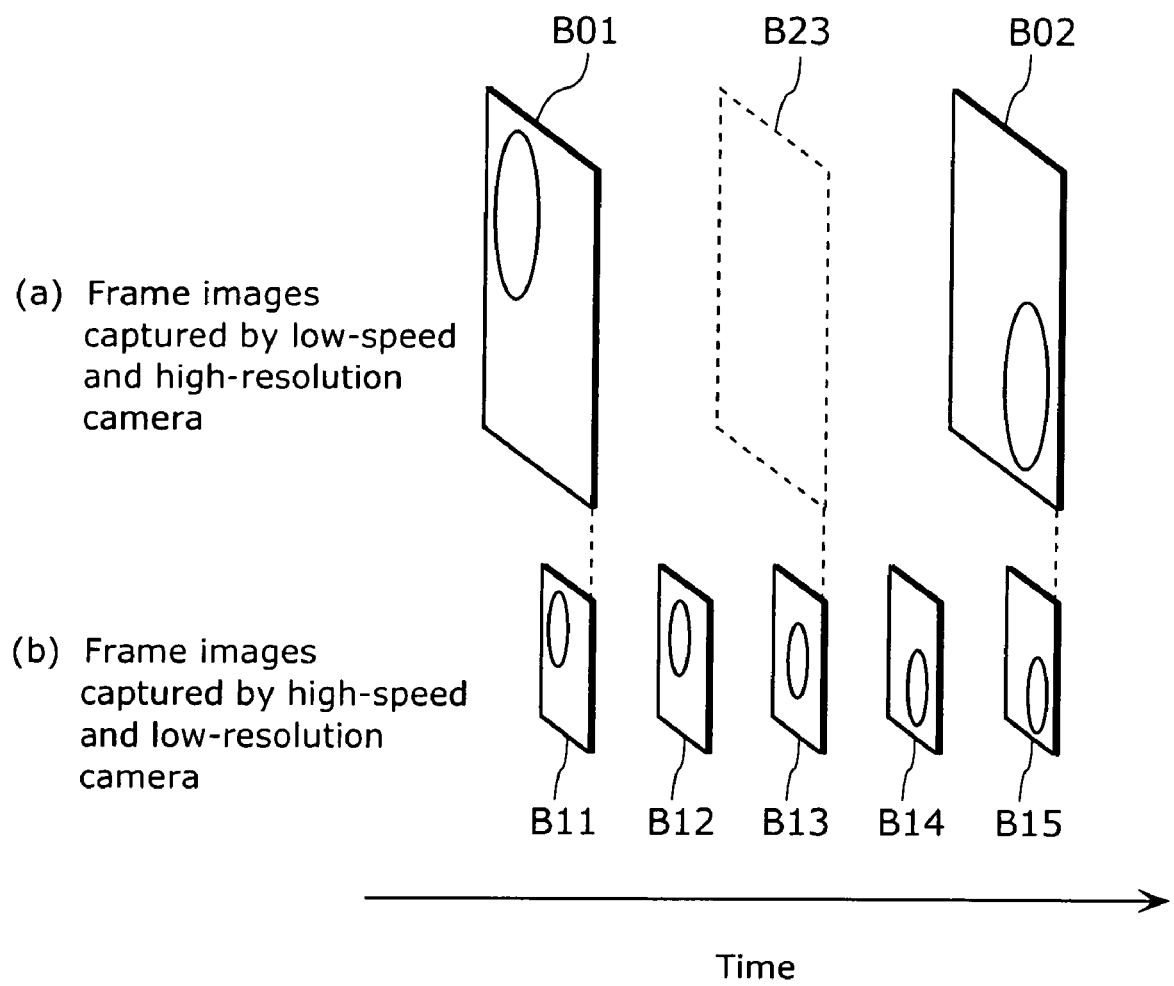
FIG. 2 is a diagram which shows images inputted in time order to the conventional image generation apparatus.

One aspect of the present invention is an image generation apparatus that generates, from a plurality of video sequences respectively obtained by photographing a same object, a new video sequence which represents the same object. This apparatus includes an image receiving unit that receives a first video sequence including frames having a first resolution and a second video sequence including frames having a second resolution which is higher than the first resolution. Each frame of the first video sequence is obtained with a first exposure time, and each frame of the second video sequence is obtained with a second exposure time which is longer than the first exposure time. The image generation apparatus also includes an image integration unit that generates, from the first video sequence and the second video sequence, a new video sequence including frames having a resolution which is equal to or higher than the second resolution, at a frame rate which is equal to or higher than a frame rate of the first video sequence, by reducing a difference between a value of each frame of the second video sequence and a sum of values of frames of the new video sequence which are included within an exposure period of the frame of the second video sequence.

With this structure, for example, when the image receiving unit receives the low-resolution first video sequence at a high frame rate and the high-resolution second video sequence at a low frame rate, the image integration unit can generate the new video sequence having the same resolution as that of the second video sequence at the same frame rate as that of the first video sequence. In other words, it can generate a new video sequence having all the excellent properties of the inputted plurality of video sequences.

Note that since each frame of the second video sequence is obtained with an exposure time longer than the exposure time of each frame of the first video sequence, the second video sequence includes motion information such as afterimages, and therefore a more accurate new video sequence can be generated using this motion information.

More specifically, the new video sequence is generated so as to reduce the difference between each frame value of the second video sequence and the sum of the values of frames of the new video sequence included within the exposure period of each frame of the second video sequence. Therefore, the image information included in one frame of the second video sequence is reflected in all the plurality of frames of the new video sequence to be generated, and as a result, variations in image clarity from frame to frame are smoothed and a video sequence with less perceptual discomfort can be obtained.

Here, if each of the frames of the second video sequence is obtained by open exposure between the frames, the variations are further smoothed and more desirable video sequence can be obtained.

The above-mentioned image generation apparatus may further include a constraint unit that specifies a constraint to be satisfied by pixel values of a new video sequence to be generated, based on continuity between pixel values of spatially and temporally adjacent pixels, and the above-mentioned image integration unit may generate the new video sequence in which the specified constraint is satisfied.

With this structure, a new video sequence in which temporal and spatial continuity of images are maintained can be generated. Such a video sequence is suitable for photographing an object in nature which obviously shows such continuity.

The above-mentioned image generation apparatus may further include a motion estimation unit that estimates a motion of the object from at least one of the plurality of video sequences received by the image receiving unit. Moreover, the image generation apparatus may include a constraint unit that specifies a constraint to be satisfied by pixel values of a new video sequence to be generated, based on a result of the motion estimation, and the above-mentioned image integration unit may generate the new video sequence in which the specified constraint is satisfied.

By doing so, the new video sequence can be generated using a motion estimation approach.

Here, the motion estimation unit may calculate a confidence level of the motion estimation, and the image integration unit may generate the new video sequence, using the constraint specified based on the result of the motion estimation for an image area with a high confidence level calculated by the motion estimation unit, and using a predetermined constraint other than the constraint specified based on the motion estimation for an image area with a low confidence level.

Here, the motion estimation unit may estimate the motion on the basis of each block obtained by dividing each of the frames which constitute the video sequence, and calculate, as the confidence level, a negative value of a sum of squares of differences in pixel values between the blocks. The image integration unit may generate the new video sequence by setting, as the image area with the high confidence level, a block with a confidence level of a value which is greater than a predetermined value, and setting, as the image area with the low confidence level, a block with a confidence level of a value which is equal to or smaller than the predetermined value.

By doing so, video sequences are integrated using a predetermined external model constraint for an image area with a low confidence level of motion estimation. Therefore, the present invention allows integration of video sequences including an image area in which the corresponding points cannot be detected or motion estimation cannot be performed conventionally.

With this structure, for example, when the image receiving unit receives the low-resolution first video sequence at a high frame rate and the high-resolution second video sequence at a low frame rate, the image integration unit can generate the new video sequence having the same resolution as that of the second video sequence at the same frame rate as that of the first video sequence. In other words, it can generate a new video sequence having all the excellent properties of the inputted plurality of video sequences.

When a color video sequence is inputted, it is preferable that the image integration unit extracts chrominance information from the first video sequence, generates a new intermediate video sequence from the second video sequence and luminance information obtained from the first video sequence, and finally generates the new video sequence by adding the chrominance information to the generated intermediate video sequence. By doing so, it is possible, for example, to generate a high-speed and high-resolution color video sequence with less amount of processing than that for generating new video sequences for respective RGB colors.

The above-mentioned motion estimation unit may further include an attitude sensor signal receiving unit that receives a signal from an attitude sensor that detects an attitude of an imaging device which images an object, and estimate the motion using the signal received by the attitude sensor receiving unit. With this structure, more accurate motion estimation can be secured, and therefore, a more accurate new video sequence can be generated.

The above-mentioned image integration unit may calculate an amount of temporal change between respective frames of at least one of the plurality of video sequences, and generate the new video sequence by setting a temporal boundary between frames between which the calculated amount of change exceeds a predetermined value. By doing so, not only it is necessary to perform image integration processing only in a required time section, but also a time section in which integration processing is performed is smoothly combined with a time section in which integration processing is not performed, which causes less perception of discontinuity.

It is preferable that the image integration unit further calculates a value indicating a confidence level of the generated new video sequence, and outputs the calculated value as well as the new video sequence. By doing so, it is possible to perform post-processing on a video sequence using the confidence level. For example, if the coding unit obtains these two types of information and encodes an image of a low confidence level at a high compression ratio while it encodes an image of a high confidence level at a low compression ratio, image coding at a high compression ratio can be achieved across the sequence without a significant loss of information.

Furthermore, the image generation apparatus according to another aspect of the present invention is an image generation apparatus that generates a new video sequence from a plurality of video sequences. This apparatus may include: an image receiving unit that receives a plurality of video sequences which are respectively obtained by photographing the same object but have different spatial and temporal resolutions or different spatial and temporal phases; a motion estimation unit that estimates a motion of the object from at least one of the plurality of video sequences received by the image receiving unit and calculates a confidence level of the motion estimation; an external model constraint unit that specifies an external model constraint which is a condition to be satisfied by pixel values of a new video sequence to be generated; and an image integration unit that generates the new video sequence by integrating the plurality of video sequences received by the image receiving unit, using a result of the motion estimation for an image area with a high confidence level, and using the external model constraint specified by the external model constraint unit for an image area with a low confidence level, based on the confidence level calculated by the motion estimation unit.

Here, the image receiving unit may receive, as the plurality of video sequences having different spatial and temporal phases, a plurality of video sequences, each of which is made up of a series of one type of field images through a plurality of frames, out of a plurality of types of field images which represent respective different parts of each original frame of an original video sequence obtained at different times. The image integration unit may generate a new video sequence which is made up of frames having a frame rate which is the same as a field rate of the original video sequence and a resolution which is the same as a resolution of the original frame. Furthermore, the exposure time of the field image may be longer than the time interval between temporally adjacent fields.

By doing so, even images of a low confidence level of motion estimation are integrated under a predetermined external model constraint. Therefore, according to the present invention, it is possible to integrate images even if they include an image area in which corresponding points cannot be detected or motion estimation cannot be performed accurately.

An image generation system in the first embodiment of the present invention will be described in detail with reference to the diagrams.

Figure 3:
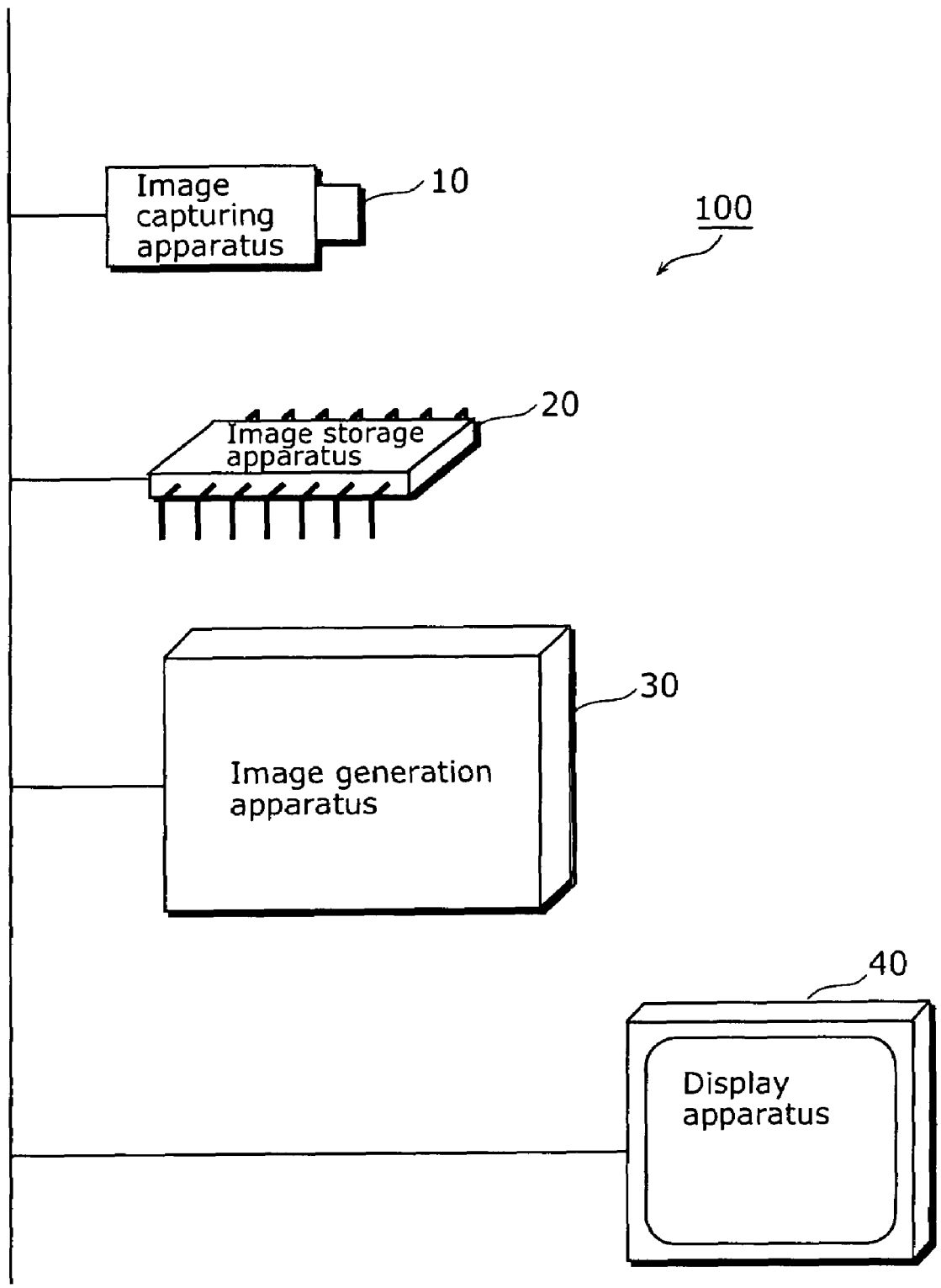
FIG. 3 is a block diagram which shows the hardware structure of the image generation system in a first embodiment of the present invention.

FIG. 3 is a block diagram which shows the hardware structure of the image generation system in a first embodiment of the present invention.

An image generation system 100 is a system for generating a new high spatial and temporal resolution video sequence (a high-speed and high-resolution video sequence in this example) from a plurality of video sequences (a high-speed and low-resolution video sequence and a low-speed and high-resolution video sequence) showing the same object. This system includes an image capturing apparatus 10, an image storage apparatus 20, an image generation apparatus 30 and a display apparatus 40. The image capturing apparatus 10 is a camera or the like which photographs an object so as to capture two types of video sequences of different spatial and temporal resolutions (a high-speed and low-resolution video sequence and a low-speed and high-resolution video sequence). The image storage apparatus 20 is a memory or the like which temporarily stores the video sequences captured by the image capturing apparatus 10. The image generation apparatus 30 is an apparatus which reads a plurality of video sequences stored in the image storage apparatus 20 and generates a new video sequence with an increased spatial and temporal resolution from the read plurality of video sequences. The display apparatus 40 is an apparatus which displays the new video sequence generated by the image generation apparatus 30. Note that the image generation apparatus 30 may be embodied as hardware such as a dedicated circuit, or as software such as an image processing program for a general-purpose computer.

Figure 4:
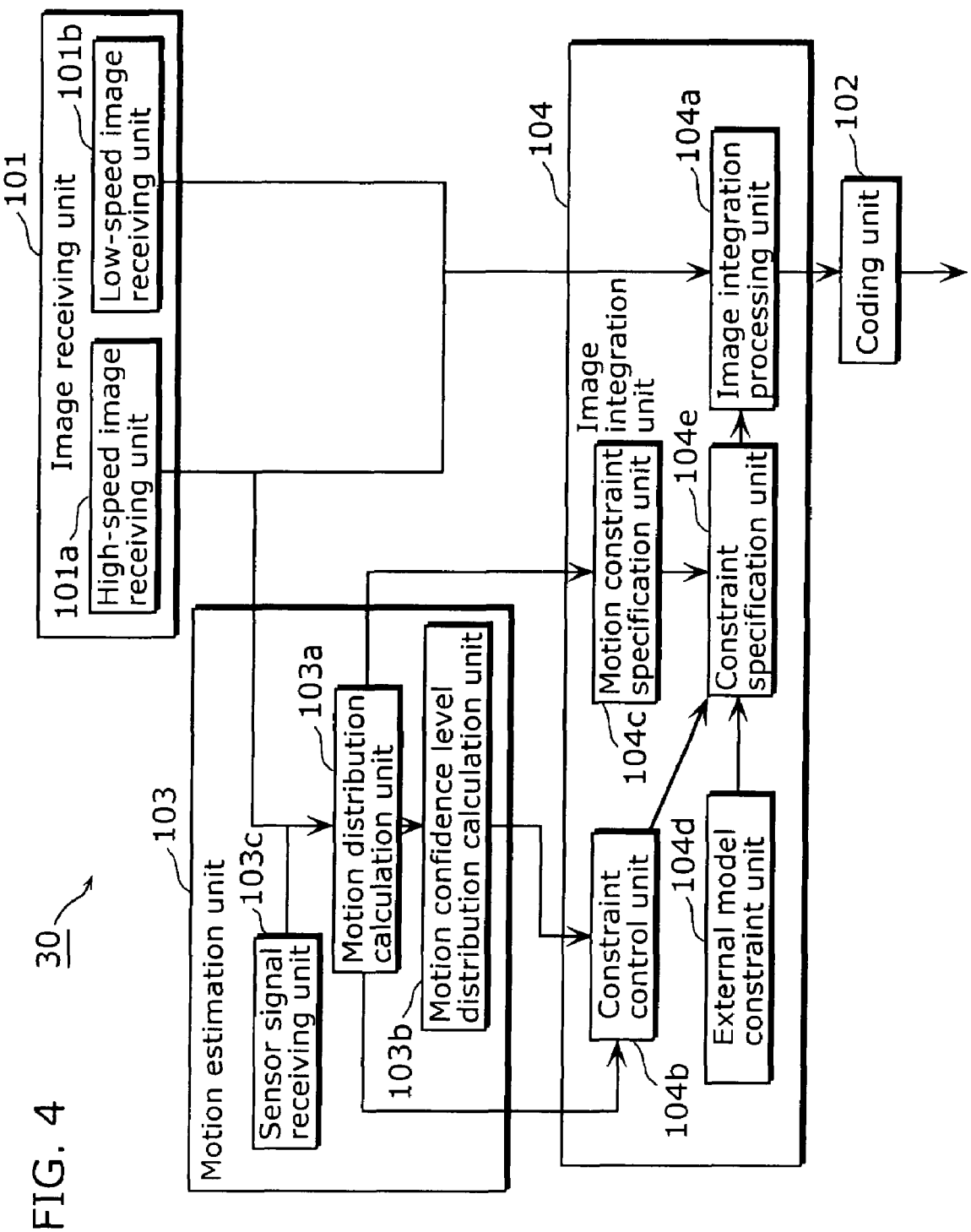
FIG. 4 is a functional block diagram which shows the structure of the image generation apparatus in the first embodiment.

FIG. 4 is a functional block diagram which shows the internal structure of the image generation apparatus 30 in the image generation system 100 shown in FIG. 3. This image generation apparatus 30 includes an image receiving unit 101, a motion estimation unit 103 and an image integration unit 104.

The image receiving unit 101 is an interface or the like which accepts inputted plurality of video sequences of different spatial and temporal resolutions or different spatial and temporal phases obtained by photographing the same object. The image receiving unit 101 includes a high-speed image receiving unit 101a which accepts (or acquires) an inputted video sequence (a high-speed and low-resolution video sequence) captured at a high speed (high frame rate) and with a low spatial resolution, and a low-speed image receiving unit 101b which accepts (or acquires) an inputted video sequence (a low-speed and high-resolution video sequence) captured at a low speed (low frame rate) and with a high spatial resolution. As mentioned above, both the image inputted to the high-speed image receiving unit 101a and the image inputted to the low-speed image receiving unit 101b are the images obtained by photographing the same object, although they are different in their spatial and temporal resolutions.

The motion estimation unit 103 includes: a sensor signal receiving unit 103c which acquires a signal from a motion estimation sensor in the image capturing apparatus 10 which generates images to be inputted to the image receiving unit 101 (such as an acceleration sensor included in the image capturing apparatus 10); a motion distribution calculation unit 103a which performs motion estimation of an object across the entire inputted image of each frame, based on the image inputted to the image receiving unit 101 and/or the motion signal inputted to the sensor signal receiving unit 103c; and a motion confidence level distribution calculation unit 103b which calculates the confidence level of motion estimation performed across the entire image of each frame by the motion distribution calculation unit 103a.

The image integration unit 104 is a processing unit which generates a new video sequence by integrating a plurality of video sequences, using the result of motion estimation performed by the motion estimation unit 103 for an image area with a high confidence level out of the plurality of video sequences inputted to the image receiving unit 101, while using predetermined constraints for an image area with a low confidence level out of the plurality of video sequences. The image integration unit 104 includes an integration processing unit 104a, a constraint control unit 104b, a motion constraint specification unit 104c, an external model constraint unit 104d, and a constraint specification unit 104e.

The motion constraint specification unit 104c is a processing unit which specifies, using the result of motion estimation performed by the motion distribution calculation unit 103a, the constraints (the constraints specified depending on the result of motion estimation are hereinafter referred as "motion constraints") which should be satisfied by each pixel value of a high-speed and high-resolution video sequence to be generated.

The external model constraint unit 104d specifies the constraints (the constraints specified independent of the result of motion estimation are hereinafter referred to as "external model constraints"), in addition to the result of motion estimation performed by the motion distribution calculation unit 103a, which should be satisfied by each pixel value of a high-speed and high-resolution video sequence to be generated.

The constraint control unit 104b determines, using the result of motion estimation calculated by the motion distribution calculation unit 103a and the confidence level calculated by the motion confidence level distribution calculation unit 103b, the degrees of motion constraints and external model constraints to be imposed respectively in each position in each frame image in a high-speed and high-resolution video sequence to be generated. The constraint control unit 104b also notifies the constraint specification unit 104e of the determined degrees.

The constraint specification unit 104e specifies, based on the degrees of the motion constraints and external model constraints to be imposed determined by the constraint control unit 104b, the constraints obtained by integrating the motion constraints specified by the motion constraint specification unit 104b and the external model constraints specified by the external model constraint unit 104d. That is, the constraints which should be satisfied by each pixel value of the high-speed and high-resolution video sequence to be generated.

The integration processing unit 104a integrates the high-speed video sequence inputted to the high-speed image receiving unit 101a and the low-speed video sequence inputted to the low-speed image receiving unit 101b according to the constraints specified by the constraint specification unit 104e, so as to generate a high-speed and high-resolution video sequence.

The coding unit 102 compresses and encodes the video sequence generated by the integration processing unit 104a and outputs the resulting data.

Note that "frames" in the first embodiment include not only frames in progressive scan but also even fields and odd fields in interlaced scan.

Figure 5:
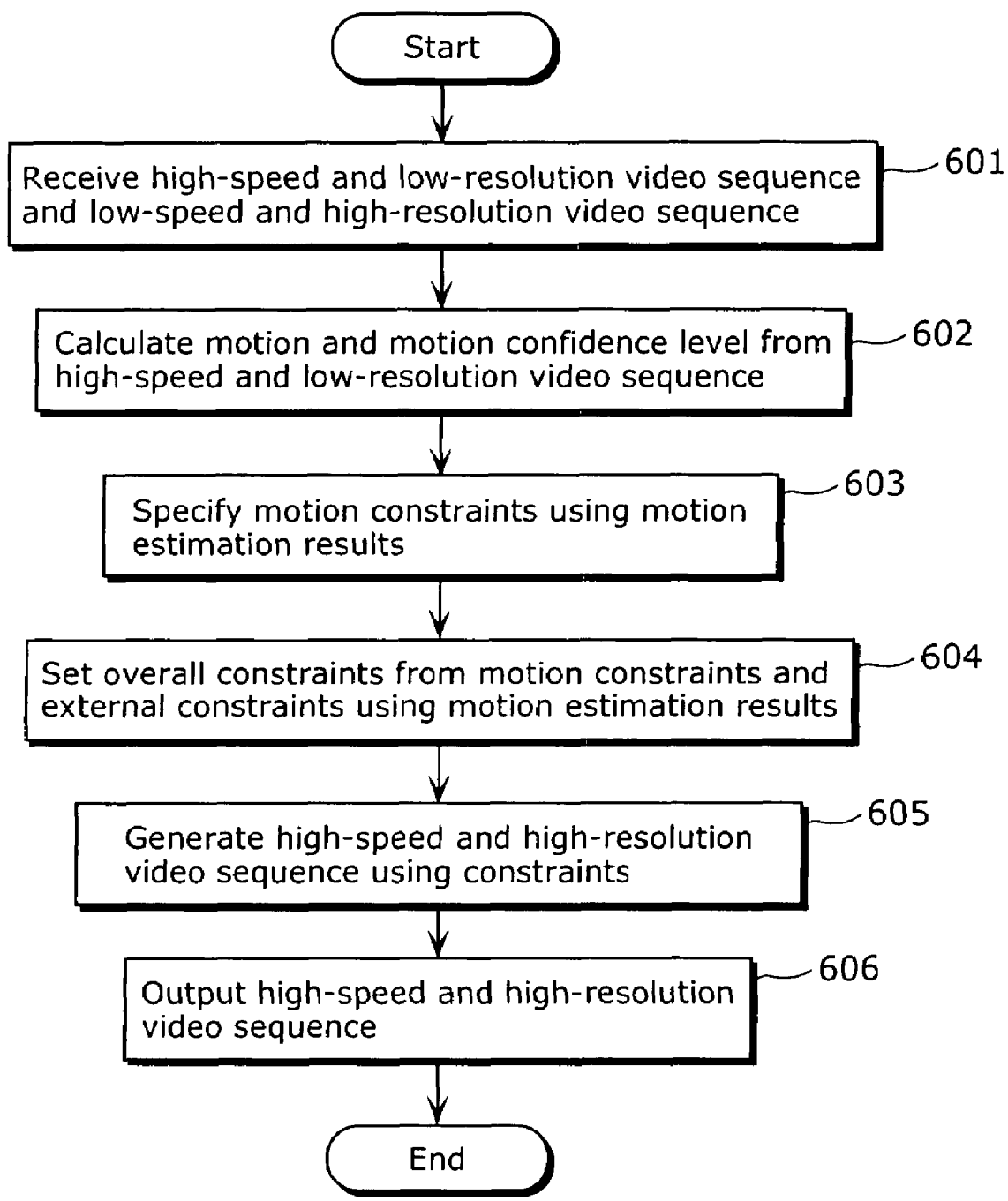
FIG. 5 is a flowchart which shows the operations of the image generation apparatus.

Next, the processes executed by the image generation apparatus 30 structured as mentioned above will be described below. FIG. 5 is a flowchart of the processes executed by the image generation apparatus 30.

In Step 601, the high-speed image receiving unit 101a accepts the input of a high-speed and low-resolution video sequence, while the low-speed image receiving unit 101b accepts the input of a low-speed and high-resolution video sequence of the same object. In the following description, a luminance image is used as an image.

Figure 6:
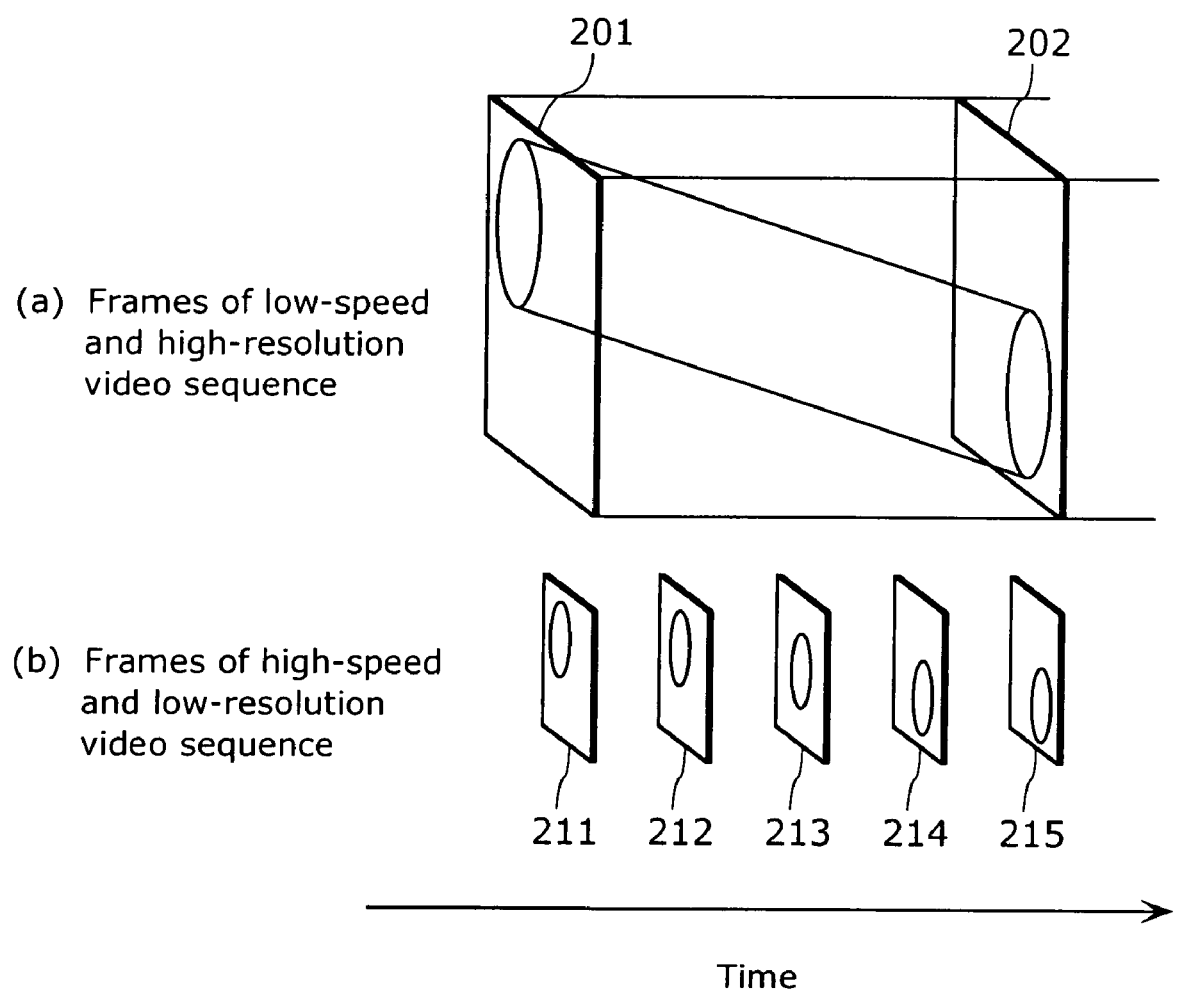
FIG. 6 is a diagram which shows an example of inputted images in time order.

FIG. 6 shows the relationship between a high-speed and low-resolution video sequence inputted to the high-speed image receiving unit 101a and a low-speed and high-resolution video sequence inputted to the low-speed image receiving unit 101b. In FIG. 6, the successive frame images in these two video sequences are arranged in time order. Frames 201 and 202 represent low-speed and high-resolution images, while frames 211 to 215 represent high-speed and low-resolution images.

In this diagram, the difference in spatial resolution is represented by the difference in image size. The frames 211 to 215 each has a smaller number of pixels and a less spatial resolution than those of the frames 201 and 202. On the other hand, as for the frame rate, the high-speed image receiving unit 101a captures images at a higher frame rate than the low-speed image receiving unit 101b. In this example, the high-speed image receiving unit 101a captures four frames while the low-speed image receiving unit 101b captures one frame. The time length between the frames 201 and 202 represents exposure time. The images inputted to the low-speed image receiving unit 101b are captured at a lower frame rate but can be exposed for a longer time than the images inputted to the high-speed image receiving unit 101a. In FIG. 6, the frame 201 in the low-speed and high-resolution video sequence is exposed for a time period which is equivalent to a time period for capturing four frames in the high-speed and low-resolution video sequence.

The image of the frame inputted to the high-speed image receiving unit 101a and the image of the frame inputted to the low-speed image receiving unit 101b do not always need to be captured at the same time, if the relative relationship between these imaging timings is previously known (in other words, the phases at these imaging timings may be different from each other). In addition, longer exposure allows acquisition of motion information such as an afterimage of a moving object even in a high-resolution video sequence. It is possible to generate a video sequence with a high spatial and temporal resolution by generating a video sequence which is consistent with motion information obtained from high-resolution images in an image integration process to be described later.

A specific example of the image capturing apparatus 10, namely, a photographing unit which captures two types of images will be shown below. These two types of images may be captured by arranging two types of cameras having different characteristics, using a half mirror, so that their angles of view become identical, as shown in FIG. 7 (a), or they may be captured by arranging two types of imaging elements having different characteristics within a camera, using a half mirror or a prism, so that their angles of view become identical, as shown in FIG. 7 (b), or they may be captured using an imaging element which captures simultaneously two types of images having different properties, as shown in FIG. 7 (c).

Next, a description will be given below, with reference to FIG. 8, of the relationship between the pixel values (luminance values) of a target high-speed and high-resolution video sequence and the pixel values (luminance values) of a high-speed and low-resolution video sequence inputted to the high-speed image receiving unit 101a and a low-speed and high-resolution video sequence inputted to the low-speed image receiving unit 101b. This relationship is used for image generation as an external model constraint which should be satisfied by each pixel of the high-speed and high-resolution video sequence to be generated.

It is assumed here that the pixel values of each image are proportional to the amount of incident light when the image is captured, and the common proportional constant is used for all the pixel values. FIG. 8 (a) shows an arrangement of pixels of each frame in a target high-speed and high-resolution video sequence. For convenience of explanation, a part of the high-speed and high-resolution video sequence is extracted. FIG. 8 (a) shows an arrangement of vertical three pixels (in the y-axis direction) and horizontal three pixels (in the x-axis direction) in four successive frames. The value of a pixel located at the pixel position (x, y, t) shall be HH(x, y, t). Here, x and y are the values within a range of 0, 1 and 2, while the value of t is within a range of 0, 1, 2 and 3.

Figure 8:
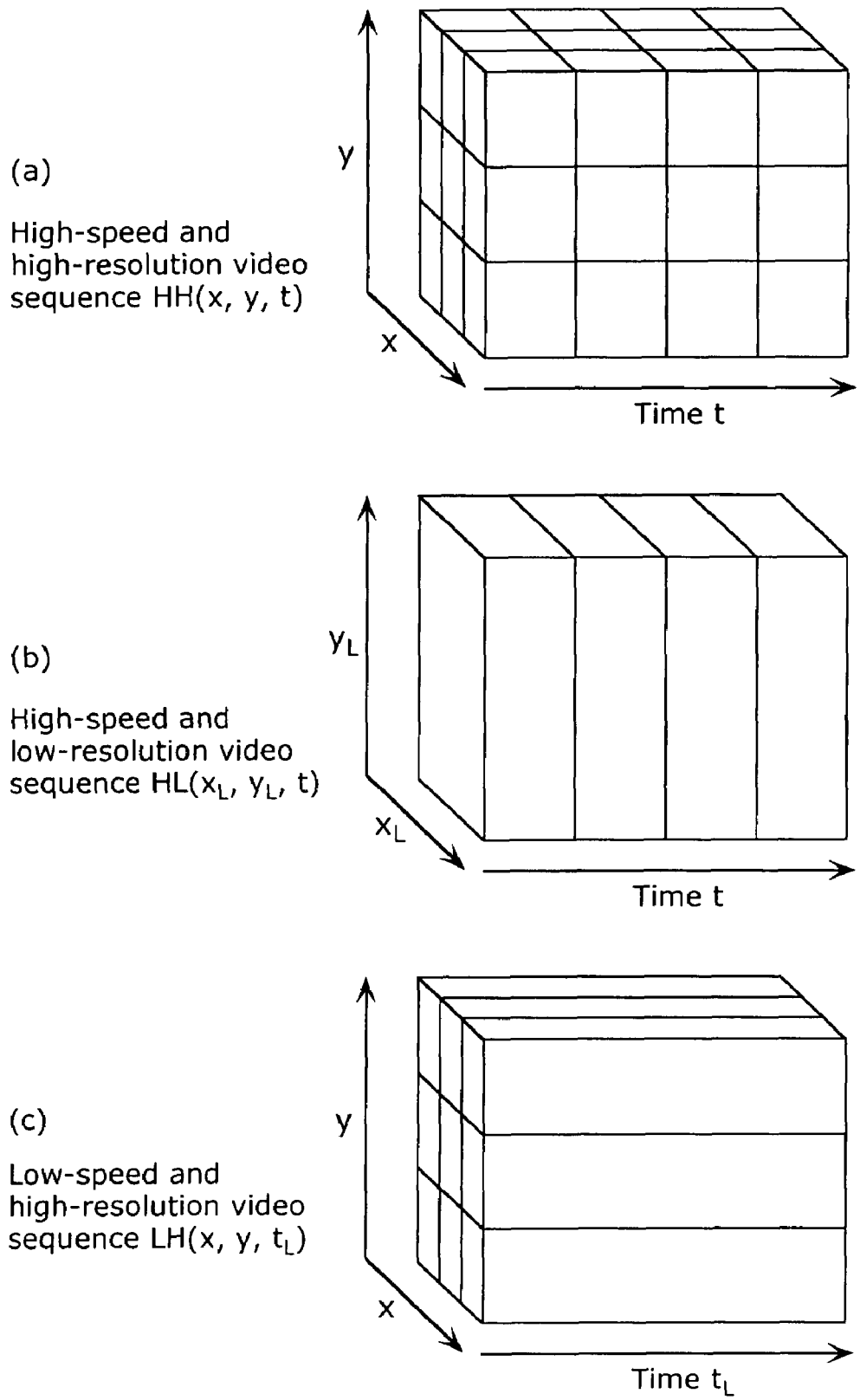
FIG. 8 is a diagram which shows examples of pixel arrangements of a generated high-speed and high-resolution video sequence, an inputted high-speed and low-resolution video sequence, and an inputted low-speed and high-resolution video sequence, respectively.

Similarly, FIG. 8 (b) shows an arrangement of pixels in a high-speed and low-resolution video sequence captured at the same time and at the same angle of view as those of the high-speed and high-resolution video sequence shown in FIG. 8 (a). Here, the value of a pixel located at the pixel position $(x_L, y_L, t)$ in the high-speed and low-resolution video sequence is represented as $HL(x_L, y_L, t)$. Since a low-resolution image and a high-resolution image are different in their numbers of pixels in the x direction and the y direction, the x and y coordinate values of the low-resolution image are respectively represented as $x_L$ and $y_L$ so as to be distinguished from those of the high-resolution image. In this example, an image area of nine pixels (three pixels in the x direction and three pixels in the y direction) in the high-resolution image is equivalent to an image area of one pixel in the low-resolution image, and the relationship of pixel values are represented by the following Equation 1.

$$HL(x_L, y_L, t) = \sum_{x=0}^{2} \sum_{y=0}^{2} HH(x, y, t) \qquad [\text{Equation 1}]$$

Similarly, FIG. 8 (c) shows an arrangement of pixels of a low-speed and high-resolution video sequence captured at the same time and the same angle of view as those of the video sequence shown in FIG. 8 (a). Here, the pixel value of a pixel located at the pixel position $(x, y, t_L)$ in the low-speed and high-resolution video sequence is represented as $LH(x, y, t_L)$.

Since a low-resolution image and a high-resolution image are different in their numbers of frames in the time direction, the frame number of the low-speed image is represented as $t_L$ so as to be distinguished from that of the high-resolution image. In this example, a time interval of four frames in the high-speed image is equivalent to a time interval of one frame in the low-speed image, and the relationship of the pixel values are represented by the following Equation 2.

$$LH(x, y, t_L) = \sum_{t=0}^{3} G(t) * HH(x, y, t) \qquad [\text{Equation 2}]$$

Here, G(t) represents an image capturing intensity at a time t, and indicates a scaling factor of a pixel value which changes according to the temporal change in the sensitivity of an imaging element and the aperture used for image capture.

When there is no temporal change in the sensitivity of the imaging element and the aperture used for image capture, G(t) is 1.0.

Note that in the above example, the time t is represented in a discrete manner, but the relational expression as the following Equation 3 is used when the change in images are associated with temporally continuous change. It is possible to represent the process of deterioration in temporally continuous sequence of inputs by substituting $HH_{cont}(x, y, t_{cont})$ in Equation 3 for HH(x, y, t) in Equations 1 and 2.

$$LH(x, y, t) = \int_{t}^{t+\Delta t} \text{Exp}(t_{cont}) \cdot HH_{cont}(x, y, t_{cont}) \, dt_{cont} \quad \text{[Equation 3]}$$

In Equation 3, $\Delta t$ indicates a virtual exposure time of a frame image of a high-speed and high-resolution video sequence to be generated, $t_{cont}$ indicates a continuous time, $HH_{cont}(x, y, t_{cont})$ indicates temporally successive sequence of images, and $\text{Exp}(t_{cont})$ indicates a change in the virtual exposure time of the frame image of the high-speed and high-resolution video sequence.

By making the exposure time of low-speed images longer than that of high-speed images, as shown in FIG. 6, it becomes possible to accumulate afterimage information for a long period of time, thereby producing an effect that a high-speed and high-resolution video sequence can be generated with a spatial and temporal resolution being increased even in a part thereof in which motion occurs.

The above description has been given, taking, as an example, the case where pixel values are proportional to an amount of incident light (FIG. 9 (*a*)). However, in the case where they are not proportional because of γ correction or the like (FIG. 9 (*b*)) and the case where the proportional constant varies from pixel to pixel, it is possible to modify the pixel values so that they have the common proportional constant to the incident light so as to satisfy Equations 1 and 2. This is done by inversely associating the pixel values with the input-output characteristics (input-output relationship) of an imaging element determined by capturing separately provided images. For example, by modifying the pixel values obtained as shown in FIG. 9 (*b*) using the correspondence between the pixel values and the modified values as shown in FIG. 9 (*c*), it is possible to process the modified pixel values in the same manner as the pixel values obtained as shown in FIG. 9 (*a*).

The above description has been given using luminance values as pixel values. However, even if each pixel has the values of colors R, G and B, the same relationship as the luminance values can be obtained for respective values of R, G and B.

Other external model constraints include continuity and smoothness between the values of spatially and temporally adjacent pixels. When the continuity of pixel values is used, the sum of squares Qs of the differences in luminance values of adjacent pixels in a high-speed and high-resolution video sequence is considered as shown in the following Equation 4.

$$Qs = \lambda s(x, y, t) \cdot \begin{bmatrix} \sum_{x=1}^{x_{max}} \left\{ \begin{matrix} HH(x, y, t) - \\ HH(x-1, y, t) \end{matrix} \right\}^2 + \\ \sum_{y=1}^{y_{max}} \left\{ \begin{matrix} HH(x, y, t) - \\ HH(x, y-1, t) \end{matrix} \right\}^2 + \\ \sum_{t=1}^{t_{max}} \left\{ \begin{matrix} HH(x, y, t) - \\ HH(x, y, t-1) \end{matrix} \right\}^2 \end{bmatrix} \quad \text{[Equation 4]}$$

When the smoothness of pixel values is used, the sum of squares Qs of the second order differences in luminance values of adjacent pixels in a high-speed and high-resolution video sequence is considered as shown in the following Equation 5.

$$Qs = \lambda s(x, y, t) \cdot \begin{bmatrix} \sum_{x=1}^{x_{max}-1} \left\{ \begin{matrix} 2 \cdot HH(x, y, t) - \\ HH(x+1, y, t) - \\ HH(x-1, y, t) \end{matrix} \right\}^2 + \\ \sum_{y=1}^{y_{max}-1} \left\{ \begin{matrix} 2 \cdot HH(x, y, t) - \\ HH(x, y+1, t) - \\ HH(x, y-1, t) \end{matrix} \right\}^2 + \\ \sum_{t=1}^{t_{max}-1} \left\{ \begin{matrix} 2 \cdot HH(x, y, t) - \\ HH(x, y, t+1) - \\ HH(x, y, t-1) \end{matrix} \right\}^2 \end{bmatrix} \quad \text{[Equation 5]}$$

In Equations 4 and 5, $x_{max}$, $y_{max}$ and $t_{max}$ indicate an x-direction pixel number, a y-direction pixel number and a maximum frame number, respectively. $\lambda s(x, y, t)$ is a coefficient for specifying the spatial and temporal distribution of constraints, and is determined using a motion confidence level in Step 604 to be described later.

As mentioned above, an external model constraint can be represented as an evaluation function for a high-speed and high-resolution video sequence to be generated. A decrease in the value of the evaluation function (evaluation value) is equivalent to an addition of the above-mentioned external model constraint to the high-speed and high-resolution video sequence.

Spatially and temporally continuity of edges can be used as one of the other external model constraints. For example, a constraint, as shown by the following Equation 6, that a change in the direction of an edge is small between the corresponding positions in temporally adjacent frames can be used.

$$Qte = \lambda te(x, y, t) \cdot \sum_{x=0}^{x_{max}} \sum_{y=0}^{y_{max}} \sum_{t=0}^{t_{max}} \sum_{i=0}^{i_{max}} \left\{ \text{edge} \begin{pmatrix} x + u(x, y, t), y + \\ v(x, y, t), t+1, i \end{pmatrix} - \right\}^2 \quad \text{[Equation 6]}$$

A constraint, as shown by the following Equation 7, that edges facing the same direction exist in a spatially successive manner can be used.

$$Qse = \lambda se(x, y, t) \cdot \quad \text{[Equation 7]}$$

-continued
$$\sum_{x=0}^{x_{max}} \sum_{y=0}^{y_{max}} \sum_{t=0}^{t_{max}} \sum_{i=0}^{i_{max}} \left\{ \begin{array}{c} \text{edge}(x+i_x, y+i_y, t, i) - \\ \text{edge}(x, y, t, i) \end{array} \right\}^2$$

In Equations 6 and 7, edge(x, y, t, i) indicates the strength of an edge of the i-th direction located at the position (x, y, t) in a video sequence. "i" indicates the type of an edge direction and has an integral value within a range from 0 to $i_{max}$. $(i_x, i_y)$ in Equation 7 indicates a vector representing the direction indicated by the i-th edge direction.

u(x, y, t) and v(x, y, t) indicate an x-direction component and a y-direction component of a motion vector at the position (x, y, t) in an image. Edge detection can be achieved using the output from an edge detection filter such as a Gabor filter having direction dependence or using an edge direction which is discretized, when necessary, after the edge direction and strength are obtained by an differential operation as shown in the following Equation 8.

$$\left( \frac{\partial HH(x, y, t)}{\partial x}, \frac{\partial HH(x, y, t)}{\partial y} \right)$$ [Equation 8]

Equation 8 represents the edge direction and strength at the coordinate (x, y, t) of a high-speed and high-resolution video sequence HH, as a two-dimensional vector. The direction of the vector corresponds to the edge direction, and the magnitude of the vector corresponds to the edge strength.

In Equation 8, as with λs(x, y, t), λte(x, y, t) and λse(x, y, t) are also coefficients for specifying the spatial and temporal distribution of a constraint, and are determined using a motion confidence level in Step 604 to be described later.

As one of the other constraints, a limitation to principal components in a group of video sequences, which predetermine acceptable limits of images which can be represented by a video sequence to be generated, may be performed. For example, assuming that the luminance value HH(x, y, t) of each pixel in each frame of a video sequence is an independent element and the video sequence is a single data point, principal component analysis is performed on a group of video sequences each having the same predetermined number of frames and predetermined number of pixels, so as to generate a video sequence using the principal components preferentially. In this case, when the vector of a non-principal component is NPC(x, y, t), the inner product of the non-principal component (NPC) and a video sequence HH(x, y, t) to be generated is a constraint. This constraint Qpc is represented by the following Equation 9.

$$Qpc = \lambda pc(x, y, t) \cdot \sum_{x=0}^{x_{max}} \sum_{y=0}^{y_{max}} \sum_{t=0}^{t_{max}} NPC(x, y, t) \cdot HH(x, y, t)$$ [Equation 9]

NPC is not limited to only one. A plurality of NPCs may be used, or the type of NPCs may be switched depending on an inputted image. In this case, the relationship between the inputted image and the principal component of a high-resolution image is previously learned and an NPC is selected using this learning result. For example, three different types of groups of high-speed and high-resolution video sequences 1, 2 and 3 are prepared for learning. Vectors of non-principal components NPC1, NPC2 and NPC3 are obtained respectively from these groups of video sequences. Separately from the vectors, high-speed and low-resolution video sequences HL1, HL2 and HL3 and high-speed and high-resolution video sequences HH1, HH2 and HH3 are obtained respectively from the above groups of video sequences 1, 2 and 3 using Equations 1 and 2. The relationship to be learned here is the correspondences between the three types of non-principal components NPC1, NPC2 and NPC3 and the three groups of video sequences: video sequences HL1 and HH1; video sequences HL2 and HH2; and video sequences HL3 and HH3. These correspondences may be learned using an arbitrary method. For example, a pair of average images of a high-speed and low-resolution video sequence HL and a high-speed and high-resolution video sequence HH is obtained for each group of video sequences and the correspondence between the pair of average images and the type of the non-principal component is retained (learning). The difference between each pair of average images and a pair of new inputted video sequences HL and HH is obtained, and the non-principal component corresponding to the pair of average images having the smallest difference is used for the processing for reconstructing the inputted video sequences. A method other than retention of the relationship between the average images and the type of non-principal components may be used. For example, it is acceptable to obtain in advance the input-output relationship using a learning method such as a neural network where the input is a pair of a high-speed and low-resolution video sequence HL and a high-speed and high-resolution video sequence HH and the output is the types of non-principal components corresponding to these HL and HH; to input the pair of input video sequences HL and HH to the neural network after the learning; and to use, as a constraint, the non-principal component of the type obtained as the output from the neural network.

In Equation 9, as with λs(x, y, t), λpc(x, y, t) is also a coefficient for specifying the spatial and temporal distribution of a constraint, and is determined using a motion confidence level in Step 604 to be described later.

Next, in Step 602, the motion estimation unit 103 calculates a motion and the confidence level of the motion from a high-speed and low-resolution video sequence. Here, the motion distribution calculation unit 103a obtains the direction and magnitude of the motion of an object (motion estimation) at each position in each frame of a video sequence received from the high-speed image receiving unit 101a, so as to calculate the spatial and temporal distribution of the directions and magnitudes of the motions. The motion confidence level distribution calculation unit 103b calculates the spatial and temporal distribution conf(x, y, t) of the confidence levels of motion estimation. In this case, the confidence level of motion estimation indicates that the certainty of a motion estimation result increases as the confidence level increases and that the lower confidence level implies an error in the motion estimation result. A motion between the corresponding positions in images of adjacent two frames can be obtained by, for example, a method used in P. ANANDAN, "A Computational Framework and an Algorithm for the Measurement of Visual Motion", IJCV, 2,283-310 (1989), a motion estimation technique generally used for video coding, and a feature point tracking technique used for tracking a moving object in an image sequence. It is also acceptable to perform motion estimation for each of a plurality of areas using a common technique of global motion (such as affine motion) estimation across the image, a technique shown in Lihi Zelkik-Manor, "Multi-body Segmentation: Revisiting Motion consistency", ECCV (2002), or the like, so as to determine the motion as a motion at each pixel position. A confidence level can be calculated by a method described in the above document written by P. ANANDAN. In the case of motion estimation using block matching, it is acceptable to use, as a confidence level, the value obtained by subtracting the sum of squares of differences in pixel values between blocks corresponding to each other through a motion from the maximum possible value $SSD_{max}$ of the sum of squares, as shown in Equation 10, namely, Conf(x, y, t) which is the negative value of the sum of squares of differences in pixel values between the blocks. Either when global motion estimation in an image is used or when local motion estimation in each area of an image is used, it is acceptable to use, as a confidence level, the value Conf(x, y, t) obtained by subtracting the sum of squares of differences in respective pixel values between an area adjacent to the starting point of a motion and an area adjacent to the ending point of the motion, from the maximum possible value $SSD_{max}$ of the sum of squares.

$$Conf(x, y, t) = SSD_{max} - \sum_{i \subset block} \sum_{j \subset block} \left\{ \begin{array}{c} I(x+i, y+j, t) - \\ I(x'+i, y'+j, t+1) \end{array} \right\}^2$$

[Equation 10]

In Equation 10, the position (x', y', t+1) is a pixel position which is equivalent to the destination of a motion from the pixel position (x, y, t) obtained as a result of motion estimation. In Equation 10, Σ indicates an addition within a block area to be used for block matching.

Note that although in the above description, motion estimation and confidence level calculation are performed using images obtained from the high-speed image receiving unit 101a, such motion estimation and confidence level calculation may be performed using images obtained from the low-speed image receiving unit 101b.

Information from a sensor (a signal inputted to the sensor signal receiving unit 103c) which detects a change in attitude of a photographing device may be used as an input. In this case, if the image capturing apparatus 10 includes an acceleration sensor and an angular acceleration sensor and the sensor signal receiving unit 103c obtains the speed and angular speed as an integration value of the acceleration, the motion distribution calculation unit 103a can obtain, based on the information inputted to the sensor signal receiving unit 103c, information of motion across the entire image produced by a change in the camera attitude such as motion blur. For example, when a camera including vertical and horizontal angular acceleration sensors is used as the image receiving unit 101, it is possible to obtain, based on the outputs from the sensors, vertical and horizontal accelerations as a measured value of the attitude at each time. By integrating the acceleration values over time, it is possible to calculate an angular speed at each time. When a camera has a horizontal angular speed ωh and a vertical angular speed ωv at a time t, the angular speed of the camera can be uniquely associated with the two-dimensional motion (u, v) of the object image originating from the camera direction, at the time t and at the position (x, y) on an imaging element (a captured image). The correspondence between the angular speed of the camera and the motion of the object image can be generally determined based on the characteristics (such as a focal length and lens distortion) of the optical system (such as a lens) in the camera, as well as the arrangement and the pixel pitch of the imaging element. The actual value of the correspondence can be calculated geometrically and optically from the characteristics of the optical system, the arrangement and the pixel pitch of the imaging element, or by referring to the speed (u, v) of the object image on the imaging element (x, y) obtained from the angular speeds ωh and ωh in the correspondences previously held as a table.

Motion information obtained using such a sensor can be used together with the result of motion estimation obtained from an image. In this case, the motion distribution calculation unit 103a uses the information from the sensor mainly for motion estimation across the image, while using the result of motion estimation obtained from the image mainly for motion of an object in the image.

Next, in Step 603, the motion constraint specification unit 104c specifies the relationship between the result of motion estimation obtained by the motion estimation unit 103 and the target high-speed and high-resolution video sequence. The relationship between the result of motion estimation obtained from low-resolution images and a high-speed and high-resolution video sequence is described with reference to FIG. 10. In FIG. 10, (a) and (b) respectively show high-speed frame images (frame numbers t and t+1) which are adjacent to each other. For ease of explanation, an area of three pixels by three pixels in a low-resolution image will be described as an example. Here, each pixel of a high-resolution image area is obtained by dividing a pixel of a low-resolution image area into nine (3×3) pieces. FIG. 10 shows only the pixels of the high-resolution image, which is necessary for explanation. It is assumed here that, as a result of motion estimation performed by the motion estimation unit 103, the position of a low-resolution image pixel enclosed by a thick line 501 in FIG. 10 (a) corresponds to the pixel position 502 in FIG. 10 (b) (i.e., the image area 501 moves to the image area 502). Using the above-mentioned motion estimation technique, it is generally possible to calculate the direction and magnitude of motion on the basis of a smaller unit than a pixel. Therefore, it is possible to calculate a motion of each pixel of a high-resolution image which differs in position from the position of a low-resolution image pixel, as shown in FIG. 10 (b), so as to obtain the relationship as shown in the following Equation 11.

It is assumed that the following relationship is obtained for the value of each pixel within the areas 501 and 502 in an image of a high-speed and high-resolution video sequence, using this result of motion estimation.

$$HH(x,y,t)=HH(x+u(x,y,t),y+v(x,y,t),t+1)$$ [Equation 11]

Here, u(x, y, t) and v(x, y, t) represent the results of motion estimation. Specifically, u(x, y, t) and v(x, y, t) indicate an amount of motion in the x direction and an amount of motion in the y direction, respectively, in the motion from the position (x, y, t) within the area 501 in FIG. 10 (a) to the area 502 in FIG. 10 (b). In the above example, motion estimation is performed on a high-speed and low-resolution video sequence, but motion estimation can be performed on a low-speed and high-resolution video sequence so as to use the result thereof. When a high-resolution video sequence is used, the time interval between the frames increases. However, the positional accuracy in associating pixels between frames to be used for motion estimation improves.

Next, in Step 604, the constraint control unit 104b determines the spatial and temporal distribution of the strength of a constraint, and the constraint specification unit 104e specifies an overall constraint to be imposed on a high-speed and high-resolution video sequence to be generated. More specifically, the constraint specification unit 104e specifies an overall constraint J(HH) to a target high-speed and high-resolution video sequence, using the respective relationships, as shown in Equations 1 and 2, between an image in a high-speed and high-resolution video sequence and a high-speed image and a low-speed image; the relationship, as shown in Equation 11, between the result of motion estimation and a high-speed and high-resolution video sequence; and the external model constraints as shown in Equations 4, 5, 6, 7, 9 and others. The following Equation 12 shows an example of an overall constraint J.

$$J=|HL-HL'|^2+|LH-LH'|^2+Qs+Qm+Qse+Qte+Qpc \quad \text{[Equation 12]}$$

In Equation 12, the first term of the right side is a constraint indicating the difference (the sum of squares of the differences between the corresponding pixels) between a high-speed and low-resolution video sequence HL' created from a high-speed and high-resolution video sequence using Equation 1 and a high-speed and low-resolution video sequence HL which is actually inputted to the high-speed image receiving unit 101$a$. The second term is a constraint indicating the difference (the sum of squares of the differences between the corresponding pixels) between a low-speed and high-resolution video sequence LH' created from a high-speed and high-resolution video sequence and a low-speed and high-resolution video sequence LH which is actually inputted to the low-speed image receiving unit 101$b$. The constraint in the first term and the constraint in the second term are used so that the relationship of luminance values between a generated image and a captured image satisfies the relationships shown in Equations 1 and 2 as much as possible. In other words, these constraints are the conditions for avoiding inconsistency in luminance values between the generated image and the captured image as much as possible.

The third term of the right side of Equation 12 represents an external model constraint Qs. When the constraints shown in Equations 4 and 5 are used, this constraint Qs helps spatially and temporally adjacent pixels in a generated image have similar luminance values. Therefore, this constraint suppresses generation of an image of which luminance values spatially and temporally change little by little like noise. The fourth term of the right side of Equation 12 represents a constraint Qm obtained based on a motion estimation result. The following Equation 13 shows an example of a constraint obtained based on a motion estimation result so as to help to avoid inconsistency between the motion estimation result and a generated image.

$$Q_m = \sum_{x=0}^{x_{max}-1}\sum_{y=0}^{y_{max}-1}\sum_{t=0}^{t_{max}-1} \lambda_m(x,y,t) \cdot \left\{HH\left(\begin{array}{c}x+u(x,y,t), y+\\v(x,y,t), t+1\end{array}\right) - HH(x,y,t)\right\}^2 \quad \text{[Equation 13]}$$

In Equation 13, a constraint is created using the motions u and v between adjacent frames t and t+1 in a high-speed and high-resolution video sequence. However, a constraint may be created using motion estimation results u' and v' between frames separated from each other by one or more frames, as shown in the following Equation 14. Both the constraints shown in Equations 13 and 14 may be used.

$$Q_m = \sum_{x=0}^{x_{max}-2}\sum_{y=0}^{y_{max}-2}\sum_{t=0}^{t_{max}-2} \lambda_m(x,y,t) \cdot \quad \text{[Equation 14]}$$

-continued $$\left\{HH\left(\begin{array}{c}x+u'(x,y,t), y+\\v'(x,y,t), t+2\end{array}\right) - HH(x,y,t)\right\}^2$$

Using motion estimation performed in different frame intervals, it is possible to estimate a motion which is hard to estimate in a small number of frame intervals, such as a slow motion, and to reflect the estimated motion to image generation.

The fifth term of the right side of Equation 12 represents a constraint indicating temporal continuity of edges, the sixth term of the right hand of Equation 12 represents a constraint indicating spatial continuity of edges, and the seventh term of the right side of Equation 12 represents a constraint for suppressing non-principal components in a generated image.

Here, $\lambda s$, $\lambda m$, $\lambda se$, $\lambda te$ and $\lambda pc$ are coefficients for determining a spatial and temporal distribution of strengths of constraints, and are determined by the constraint control unit 104$b$. It is assumed that the confidence level of motion estimation calculated by the motion confidence level distribution calculation unit 103$b$ in Step 602 is conf(x, y, t)(>0), and the confidence level of motion estimation increases as this value increases.

For example, $\lambda s$, $\lambda m$, $\lambda se$, $\lambda te$ and $\lambda pc$ are determined as follows: when conf(x, y, t)>$\alpha$ is satisfied where $\alpha$ is a predetermined constant, a motion constraint is imposed by setting, for example, $\lambda m(x, y, t)$=1.0, other constraints are set to small values $\omega$(>1.0) which are predetermined on a coordinate (x, y, t), and when conf(x, y, t)<=$\alpha$, $\lambda m(x, y, t)$=0.0 is set and other $\lambda$ values are set to 1.0. More specifically, when the motion estimation unit 103 performs motion estimation on the basis of a block obtained by dividing each image in a video sequence, the confidence level of motion estimation conf(x, y, t) is calculated by subtracting the sum of squares of differences in pixel values between blocks from the maximum possible value of the sum of squares thereof. Using, as a high-confidence image area, a block having the difference greater than a predetermined value $\alpha$, the image integration unit 104 generates a new image for the high-confidence image area using the motion estimation result. On the other hand, using, as a low-confidence image area, a block having the difference smaller than or equal to the predetermined value $\alpha$, the image integration unit 104 generates a new image for the low-confidence image area using external model constraints.

$\lambda$ may be determined in another manner. For example, it may be defined successively using a monotonically increasing function g(x), where $\lambda m(x, y, t)$=g(conf(x, y, t)) and the other $\lambda$ values at the position (x, y, t) are g(conf_max)–g(conf(x, y, t)). Here, conf_max is the maximum possible value of the confidence level. As mentioned above, by placing importance on motion constraints when the confidence level of motion estimation is high while raising the proportion of external model constraints when the confidence level is low, it is possible to suppress image degradation and increase a spatial and temporal resolution even at the position where accurate motion estimation cannot be performed. In the above example, a plurality of constraints are used all together as external model constraints. However, another constraint may be further added, and even if only some of these constraints are used, the effect of the present invention can be obtained.

Next, in Step 605, the integration processing unit 104$a$ obtains a high-speed and high-resolution video sequence which minimizes a constraint J. Such a high-speed and high-resolution video sequence which minimizes the constraint J can be obtained, for example, by solving the following Equation 15 where a value obtained by differentiating the constraint J by each pixel value of the high-speed and high-resolution video sequence is 0, or using an iteration method such as a maximum grading scale. Lastly, in Step 606, the integration processing unit 104a outputs the generated high-speed and high-resolution video sequence.

$$\frac{\partial J}{\partial HH(x, y, t)} = 0 \qquad \text{[Equation 15]}$$

Figure 11:
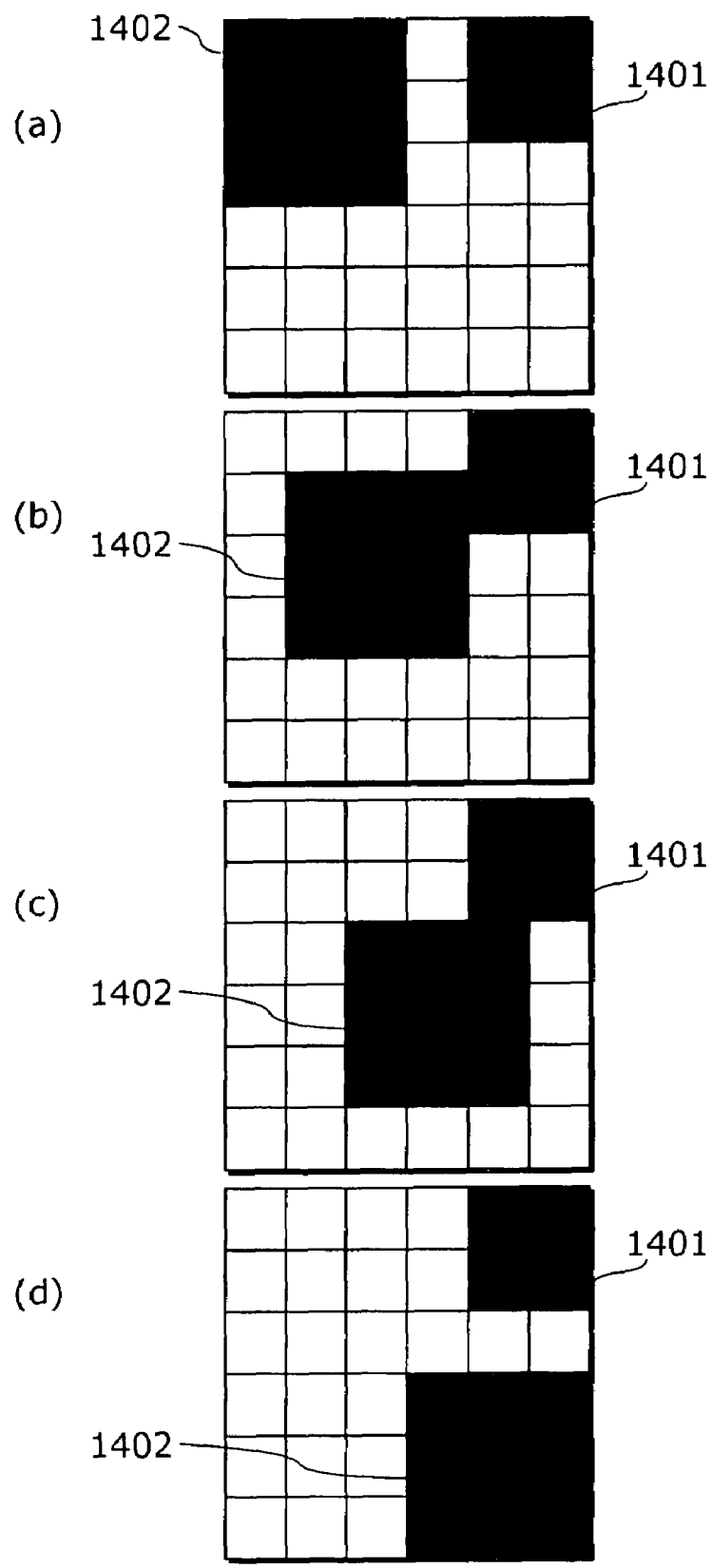
FIG. 11 is a diagram which shows examples of frame images of a generated high-speed and high-resolution video sequence.
Figure 12:
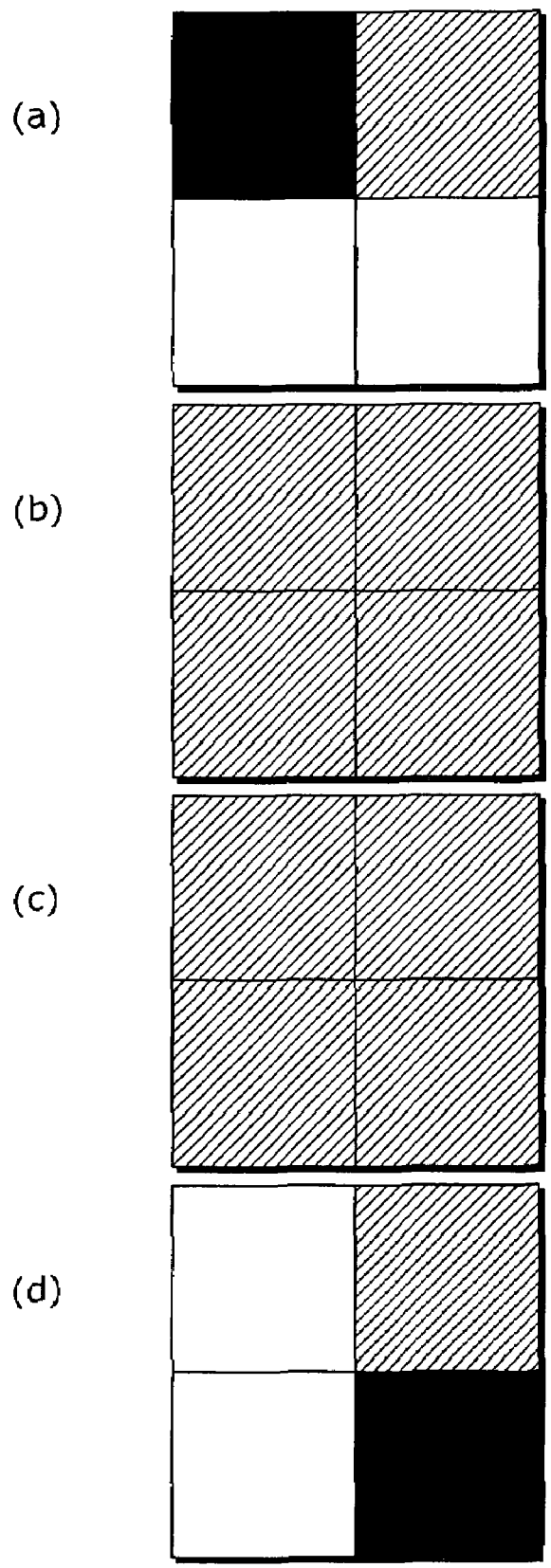
FIG. 12 is a diagram which shows examples of frame images of an inputted high-speed and low-resolution video sequence.
Figure 13:
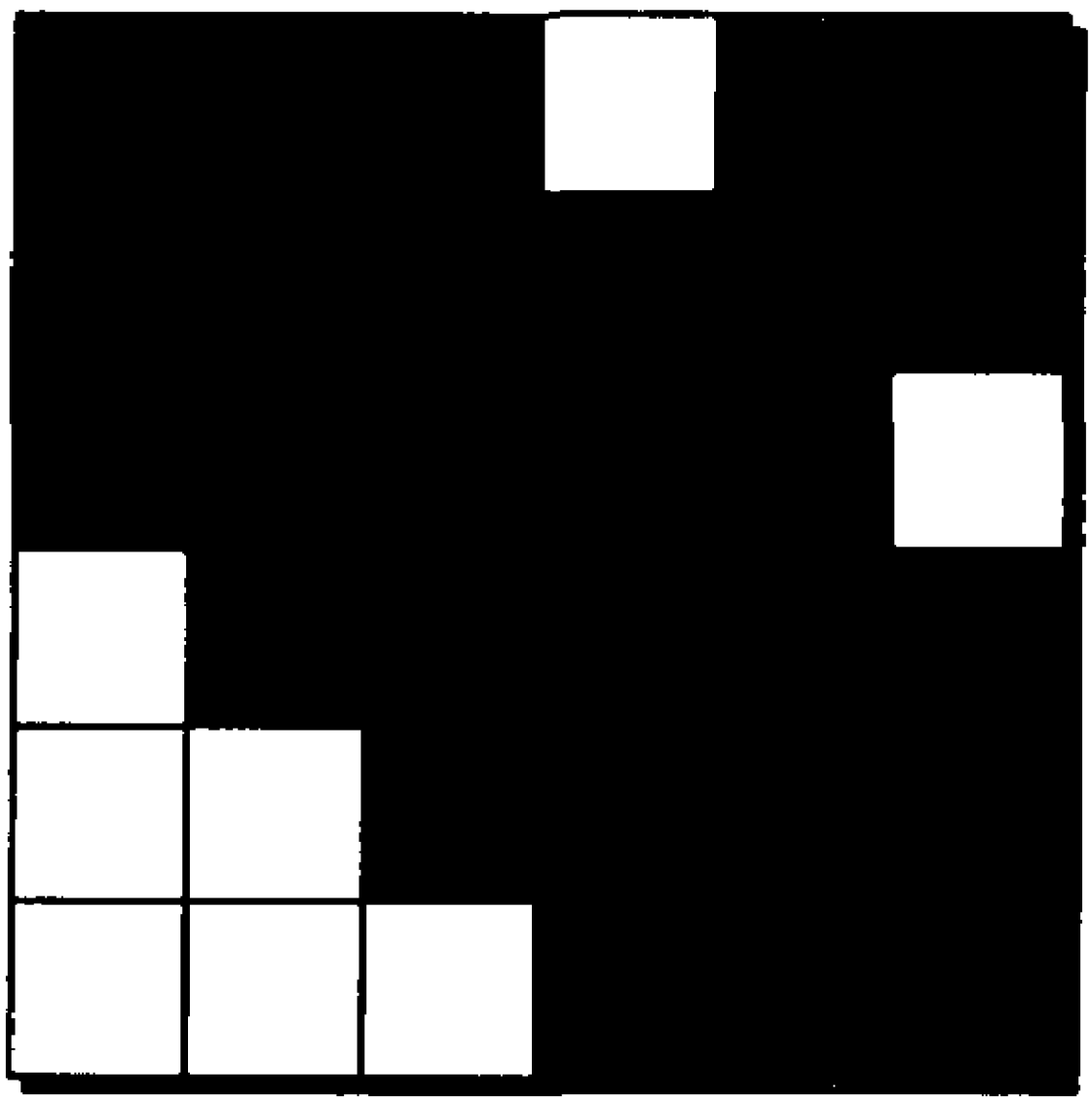
FIG. 13 is a diagram which shows an example of a frame image of an inputted low-speed and high-resolution video sequence.

A more specific example of a set of inputted images and outputted images will be described with reference to FIGS. 11 through 15. For ease of explanation, an explanation is given using a video sequence including four frames, each consisting of six pixels by six pixels. These four frames can be considered as a part of a video sequence which is larger in size and frame number. FIG. 11 shows example images obtained by photographing an object at high speed and high resolution. The images in FIG. 11 cannot inherently be obtained by photographing, but are shown just as example images for explanation. In FIG. 11, (a) through (d) show four frames placed in time order, in which a still object 1401 and a moving object 1402 are shown. For these objects, a high-speed and low-resolution video sequence and a low-speed and high-resolution video sequence are captured (Step 601). FIG. 12 shows example images of these objects in the high-speed and low-resolution video sequence (whose number of vertical and horizontal pixels is one third of that of the low-speed and high-resolution video sequence). In FIG. 12, (a) through (d) show frames corresponding to the frames shown in (a) through (d) of FIG. 11 in image capturing time. In these images, pixels having the intermediate values between black pixels and white pixels are shaded diagonally from upper right to left below. The number of frames is same as that in FIG. 11, while the spatial resolution is lower than that in FIG. 11. Similarly, FIG. 13 shows an example image (of one frame) of these objects in the low-speed and high-resolution video sequence. The spatial resolution is the same as that in FIG. 11, but the object 1402 is photographed as an afterimage because this image is exposed for a time period equivalent to the four frames shown in FIG. 11 (a) through (d).

Next, the motion estimation unit 103 obtains the motion of the object in the images and the confidence level of the motion from the high-speed and low-resolution video sequence (Step 602). Since the images in FIG. 11 show a part of a larger image, it is also possible to obtain the result of motion estimation regarding the image areas shown in FIG. 11 from the result of motion estimation performed across the larger image.

Figure 14:
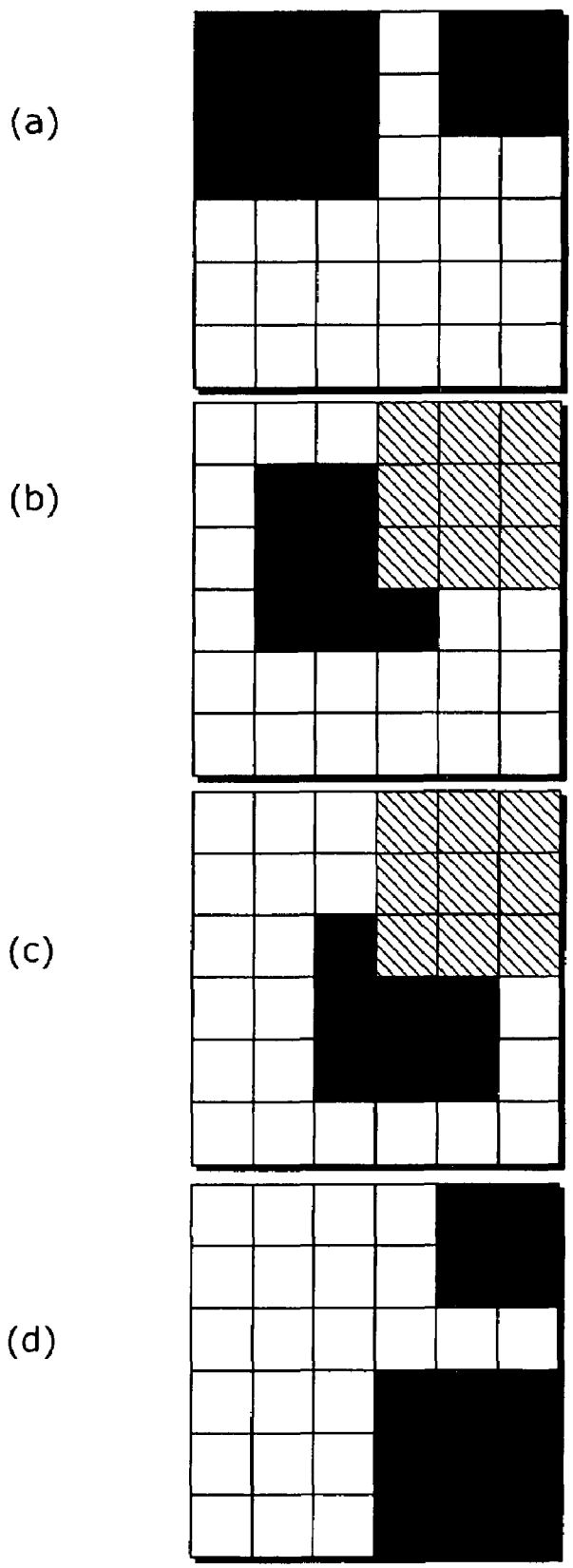
FIG. 14 is a diagram which shows an example of distribution of confidence levels.

FIG. 14 shows an example of distributions of confidence levels. In FIG. 14, (a) through (d) show frames corresponding to the frames shown in (a) through (d) of FIG. 11 in image capturing time. In FIG. 14, areas of lower confidence levels of motion estimation are shaded diagonally from upper left to right below, while areas of higher confidence levels of motion estimation are shown as white or black areas. Here, both the black and white pixels represent the relationship with the objects, there is no difference in confidence level between them. The motion estimation results for the still object and the background are considered to have an amount of motion of 0. In FIG. 11, in the area where the two objects 1401 and 1402 get close to each other, accurate motion estimation is difficult. The constraint control unit 104b sets an overall constraint from the constraints which have been set using the motion estimation result in Step 603 and the external constraints for the area of a lower confidence level. Then the integration processing unit 104a generates a high-speed and high-resolution video sequence using the overall constraint and outputs the resulting video sequence (Steps 605 and 606).

Figure 15:
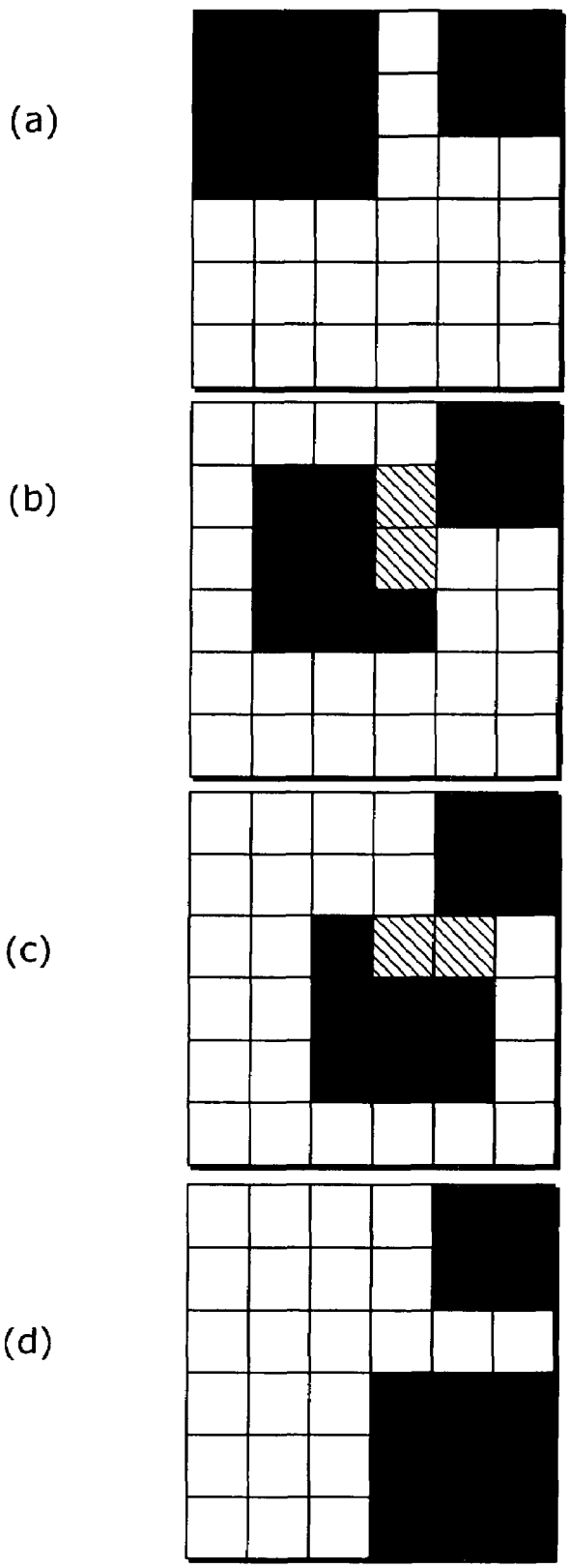
FIG. 15 is a diagram which shows examples of frame images of a generated video sequence.
Figure 16:
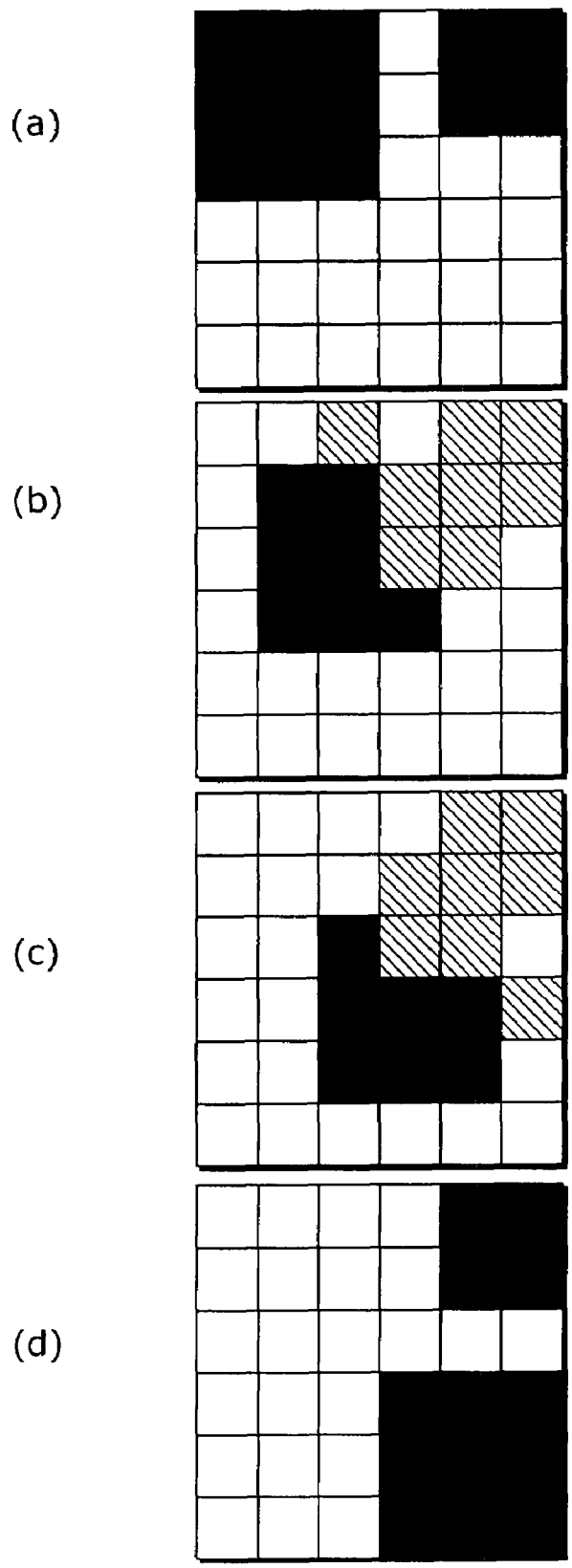
FIG. 16 is a diagram which shows examples of frame images of a video sequence generated without using confidence levels.

FIG. 15 shows an example of generated images. In FIG. 15, (a) through (d) show frames corresponding to the frames shown in (a) through (d) of FIG. 11 in image capturing time. These images are similar to the images in FIG. 11 which cannot inherently be obtained by photographing, while frames (b) and (c), in which the two objects get close to each other, include the intermediate pixel values. FIG. 16 shows an example of images generated when only the motion estimation results are used without using the motion confidence levels and external constraints. Accurate image generation cannot be performed in the upper right portions in the frames (b) and (c) in FIG. 16 where accurate motion estimation cannot be performed. Accurate motion estimation cannot be performed in the upper right portions in the frames (b) and (c) in FIG. 16. However, using various external constraints, such as the continuity of pixel values between positions in a frame or between frames (Equations 4, 5 or the like), or the continuity of edges between them (Equations 6, 7 or the like) and the tendency of principal components of a video sequence (Equation 9), the integration processing unit 104a can generate a desirable high-speed and high-resolution video sequence.

Next, an explanation is given, taking as an example, the images shown in FIGS. 17 through 24, about the effect of making the exposure time of a low-speed and high-resolution video sequence longer than the frame interval of a high-speed and low-resolution video sequence.

Figure 17:
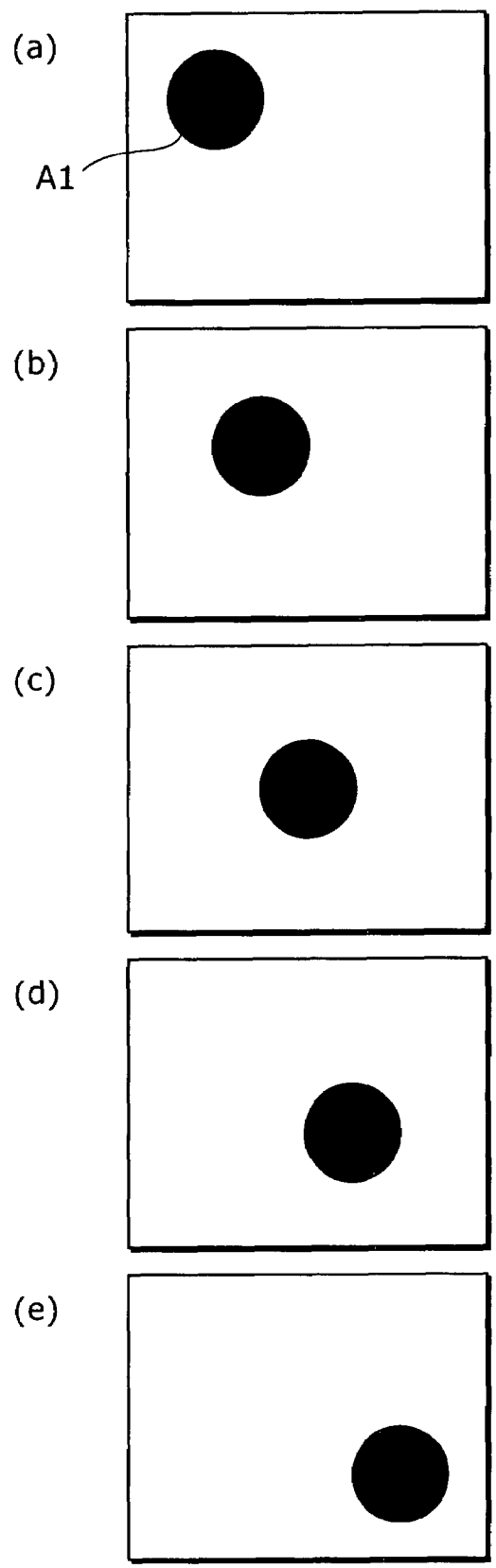
FIG. 17 is a diagram which shows examples of frame images of a high-speed and high-resolution video sequence.
Figure 18:
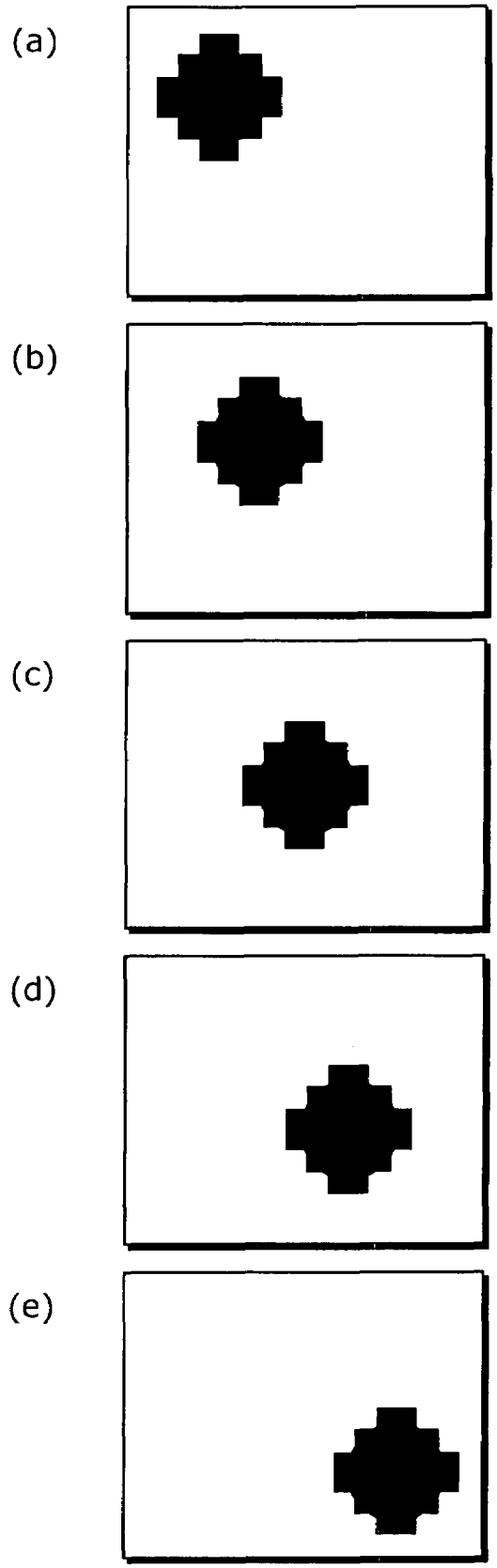
FIG. 18 is a diagram which shows examples of frame images of a high-speed and low-resolution video sequence.

FIG. 17 shows example images obtained by photographing an object at high speed and high resolution. The images in FIG. 17 cannot inherently be captured by photographing, but are shown just as example images for explanation. In FIG. 17, (a) through (e) show temporally successive five frames placed in time order, in which a moving object A1 is shown. FIG. 18 shows images of this object in a high-speed and low-resolution video sequence, and FIGS. 19 and 20 show images of this object in a low-speed and high-resolution video sequence. In FIG. 18, (a) through (e) show frame images corresponding to respective frames shown in (a) through (d) of FIG. 17 in time. Since FIG. 18 shows the low-resolution images in the same size as a high-resolution image, the low level of resolution of these images presents themselves as coarse pixels. In this example, the frame rate of the low-speed and high-resolution video sequence is one fourth of that of the high-speed and low-resolution video sequence, and the frames (a) and (b) in FIGS. 19 and 20 correspond to the frame images which are started to be exposed at the times of the frame images (a) and (e) in FIG. 17. FIG. 19 shows low-speed and high-resolution frame images captured in a shorter exposure time like the conventional art. FIG. 20 shows low-speed and high-resolution frame images captured in a longer exposure time than the frame rate of high-speed and low-resolution images, as shown in the present invention.

Figure 21:
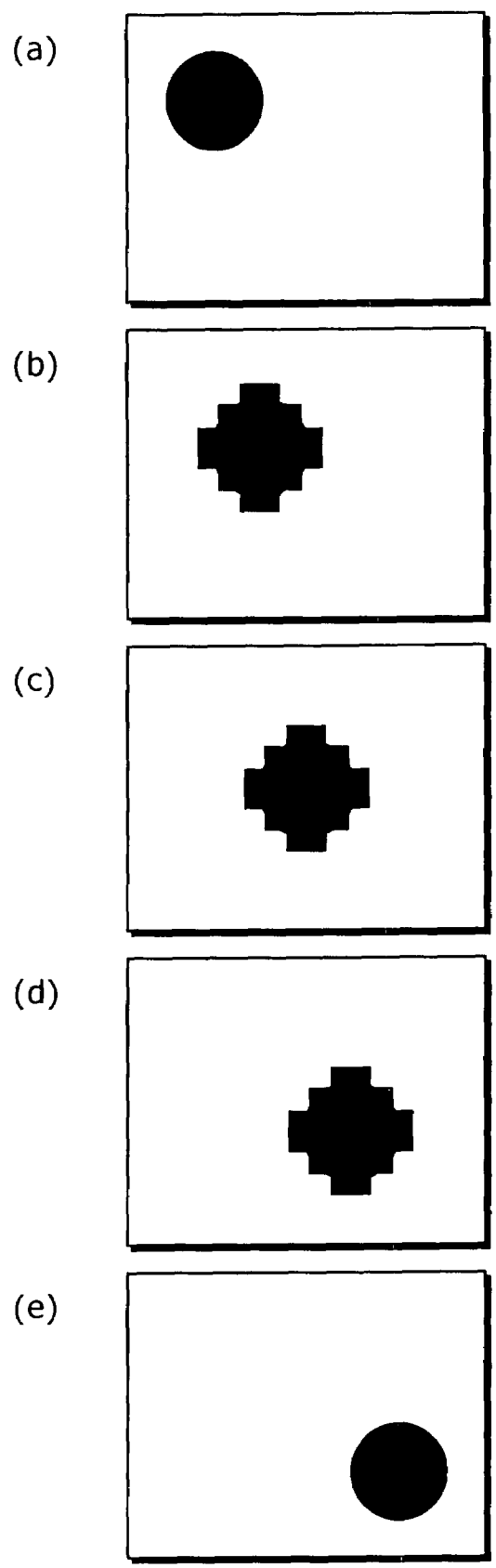
FIG. 21 is a diagram which shows examples of frame images generated with a short exposure time.
Figure 22:
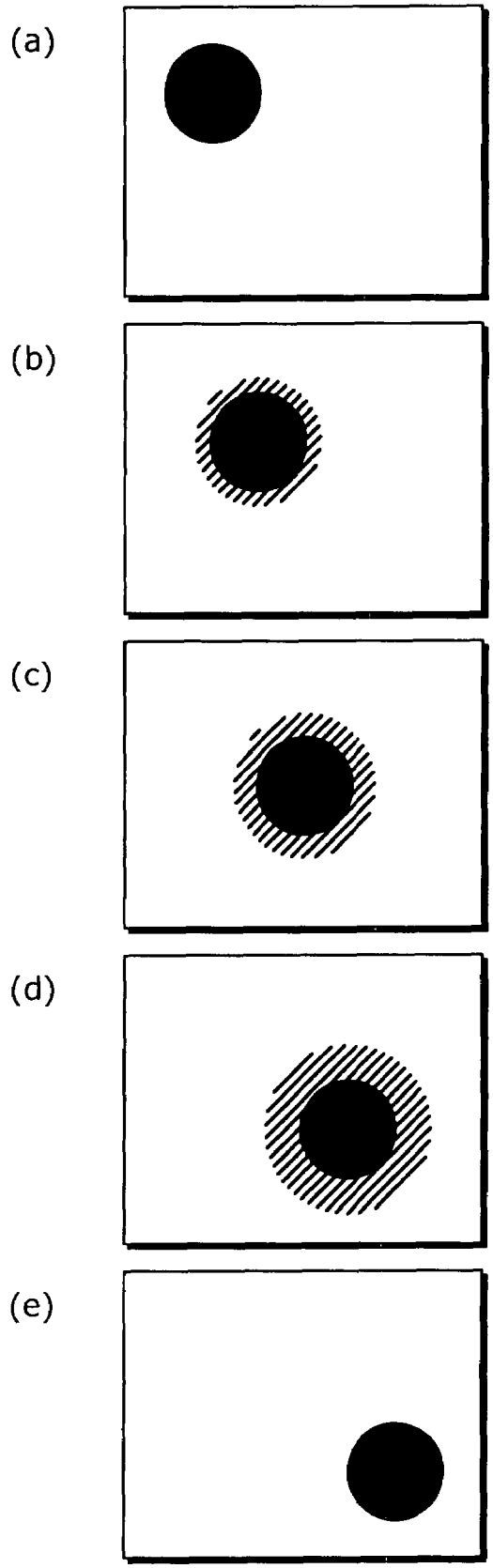
FIG. 22 is a diagram which shows examples of frame images generated with a short exposure time.
Figure 23:
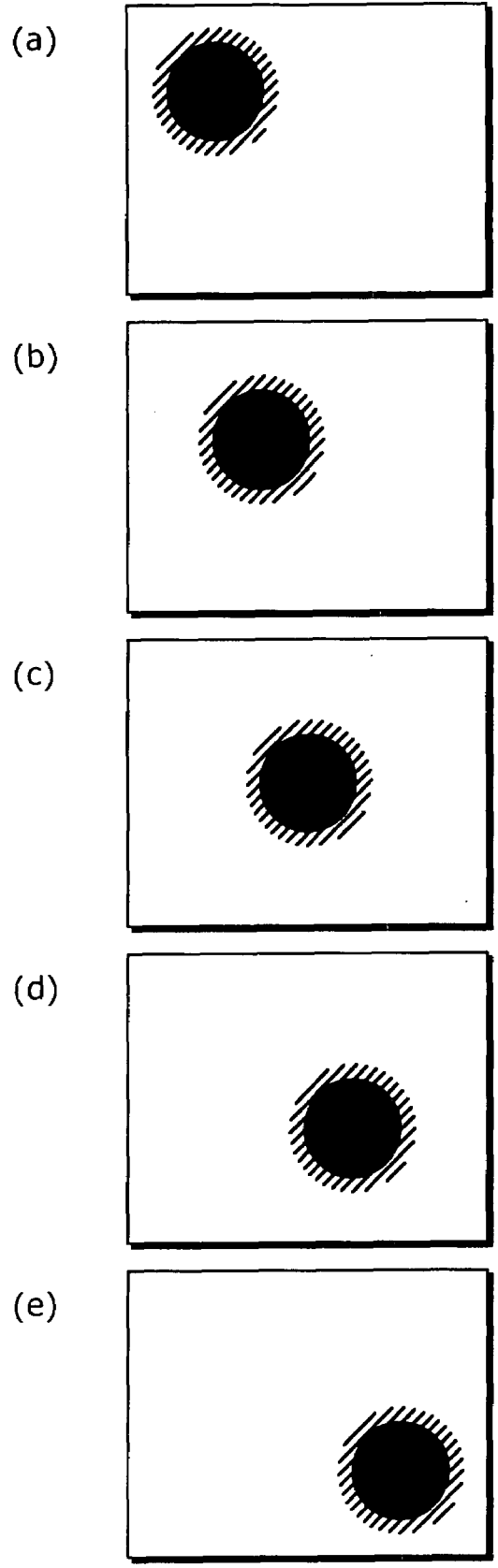
FIG. 23 is a diagram which shows examples of frame images generated with a long exposure time.
Figure 24:
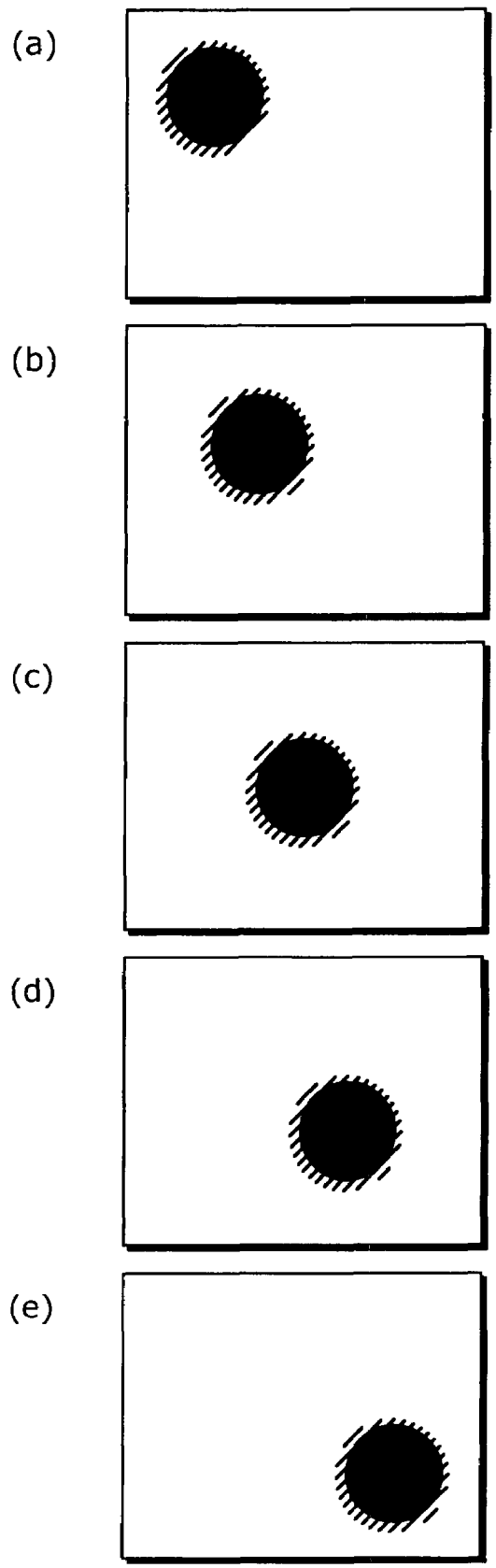
FIG. 24 is a diagram which shows examples of frame images generated with a long exposure time.

FIGS. 21 through 24 show examples of images generated using the images captured in the above-mentioned processes. In FIGS. 21 through 24, (a) through (e) show frame images corresponding to respective frames shown in (a) through (e) of FIG. 17 in time. In FIGS. 22 through 24, diagonally shaded portions are areas having intermediate luminance values between the luminance value of the object A1 and the luminance value of the background. FIGS. 21 and 22 show the example images generated using the inputted images shown in FIGS. 18 and 19, while FIGS. 23 and 24 show the example images generated using the inputted images shown in FIGS. 18 and 20. FIG. 21 shows the example images generated without using motion information, while FIG. 22 show the example images generated using motion information. The images (a) and (e) in FIGS. 21 and 22 are sharp and clear because they are captured at the same time as the inputted images in FIG. 19. On the other hand, the images (b) through (d) in FIG. 21 has a low resolution equivalent to that of the high-speed and low-resolution images (b) through (d) shown in FIG. 18 because they are captured without using motion information.

In FIG. 22, the images (b) through (d) become blurred more and more with temporal distance from a low-speed and high-resolution frame image, and the image (e) returns to a clear state when it reaches the next low-speed and high-resolution frame image. This results from decreased accuracy in motion estimation from a high-speed and low-resolution image as well as inevitable errors in motion estimation itself, while the spatial resolution of the generated images (b) through (d) need to be improved using motion information obtained from the low-speed and high-resolution image. Since these motion estimation errors accumulate in each frame, its sharpness and clarity decrease gradually. When inputted images as shown in FIG. 19 are used, if motion estimation information cannot be obtained or it is inaccurate, the sharpness of the generated images (b) through (d) not only gradually decreases but also greatly varies periodically (in this example, at intervals of four frames), thereby causing poor quality of images. This tendency becomes increasingly prominent as the frame interval of a low-speed and high-resolution video sequence becomes longer. This problem does not occur if motion estimation can be performed at accuracy as high as the resolution of a high-resolution image. However, it is actually difficult to perform highly accurate motion estimation from a low-resolution image because of complex changes or occlusion of an object shape in an image, change in illumination conditions, and so forth.

FIG. 23 shows the example images generated without using motion information, while FIG. 24 shows the example images generated using motion information. In FIG. 23, the sharpness of the images does not decrease so much as the image (d) in FIG. 22, while the sharpness thereof decreases somewhat compared with the images in FIGS. 17 and 19. In the images in FIG. 23, since the temporal variations of the sharpness is suppressed, the temporal deterioration in the sharpness can be alleviated. Furthermore, since the images in FIG. 24 are generated using motion information, their sharpness is further improved than the images in FIG. 23.

In the conventional image generation method as described above, each image is clearly captured by shortening the exposure time for both high-speed and low-resolution images and low-speed and high-resolution images so as to suppress motion blur. However, this method is not necessarily desirable in terms of maintaining the stable quality of generated images and reflecting the sudden changes in the images to generated images.

Unlike such a conventional method, the image generation method of the present invention is characterized in that images are generated using low-speed and high-resolution images obtained by long-time exposure in which motion blur may occur, in order to improve the sharpness and clarity of high-speed and high-resolution images to be generated and to suppress the changes in the image sharpness from frame to frame.

Therefore, it is possible not only to suppress the changes in the image quality from frame to frame even in the case where motion estimation is not performed, but also to improve the image sharpness by adding motion information of the images. Furthermore, since only highly confident motion information obtained based on the confidence level of motion estimation is used, it is possible to suppress the degradation of image quality due to inaccurate motion information.

As for a longer exposure time, the above-mentioned effects can be achieved more easily by opening the shutter at frame intervals of low-speed images. Actually, there may be an unexposed time period between the end of exposure of a frame and the start of exposure of the next frame. Even in such a case, by making the exposure time as long as possible, it is possible to achieve the effects of the present invention.

Note that whether or not an image has been generated using long-time photographing can be judged based on whether or not the generated image includes a sudden change in high-resolution images when such a change occurs in the image (a) and the image (b) in FIG. 19.

As a specific example, the effect which is unique to long-time exposure can be achieved in the following situation.

In the case where an object is dark and moving in images, if low-speed and high-resolution images are captured in a short exposure time, the resulting images include much noise. Such noise affects the generation of high-speed and high-resolution images, thereby causing a significant degradation in the generated images. This is because a shorter exposure time causes insufficient light because a light-receiving part of an imaging element for high-resolution images generally has a small area, thereby causing thermal noise generated by the imaging element itself.

So, if low-speed and high-resolution images are captured in a long exposure time, as in the case of the present invention, it is possible to accumulate a sufficient amount of light in a light-receiving part of an imaging element for high-resolution images and thus obtain images on which thermal noise generated by the imaging element itself has a relatively low impact. By generating high-speed and high-resolution images using the above-mentioned images obtained by long-time exposure and the luminance and motion information obtained from high-speed and low-resolution images (since the light-receiving part for such low-resolution images can have a relatively large area compared with that for high-resolution images, it is less subject to the thermal noise), it is possible to achieve a special effect that less noisy images can be obtained even if an object is dark and moving.

In the above example, the image integration unit 104 only outputs generated images. However, it may output the confidence levels of the generated images in addition to the images themselves. A confidence level $\gamma$ of a generated image is a value which predicts the degree to which a high-speed and high-resolution image is accurately generated. The value $\gamma$ can be determined using the total sum of confidence levels of motions shown in the following Equation 16, the ratio N/M between the number of effective constraints N and the total number of pixels M (which is the number of frames multiplied by the number of pixels of each frame image) of a target video sequence, and so forth.

$$\gamma = \sum_{x=0}^{X_{max}} \sum_{y=0}^{Y_{max}} \sum_{t=0}^{T_{max}} conf(x, y, t)$$ [Equation 16]

where $N=Nh+Nl+N\lambda \times C$, Nh is the total number of pixels of high-speed images (the number of frames multiplied by the number of pixels of one frame image), Nl is the total number of pixels of low-speed images, $N\lambda$ is the total number of spatial and temporal positions (x, y, t) at which external constraints are to be imposed, and C is the number of types of the external constraints. Note that in the case where an equation like Equation 15 is solved as a linear simultaneous equation, the number of conditions indicating the stability of solution calculation, described in Cline, A. K., Moler, C. B., Stewart, G. W. and Wilkinson, J. H., "an Estimate for the Condition Number of a Matrix", SIAM J. Num. Anal. 16 (1979), 368-375 and the like, can be used as a confidence level. If a motion confidence level is high, it can be expected that the confidence level of a video sequence generated using a motion constraint is also high. Furthermore, when there are a lot of effective constraints for the total number of pixels of a video sequence to be generated, a video sequence as a solution can be generated stably, and thus the confidence level of the generated sequence is also expected to be high. Similarly, since it is expected that a small number of constraints leads to a smaller error between the solutions, the confidence level of the generated video sequence is also expected to be high.

Figure 25:
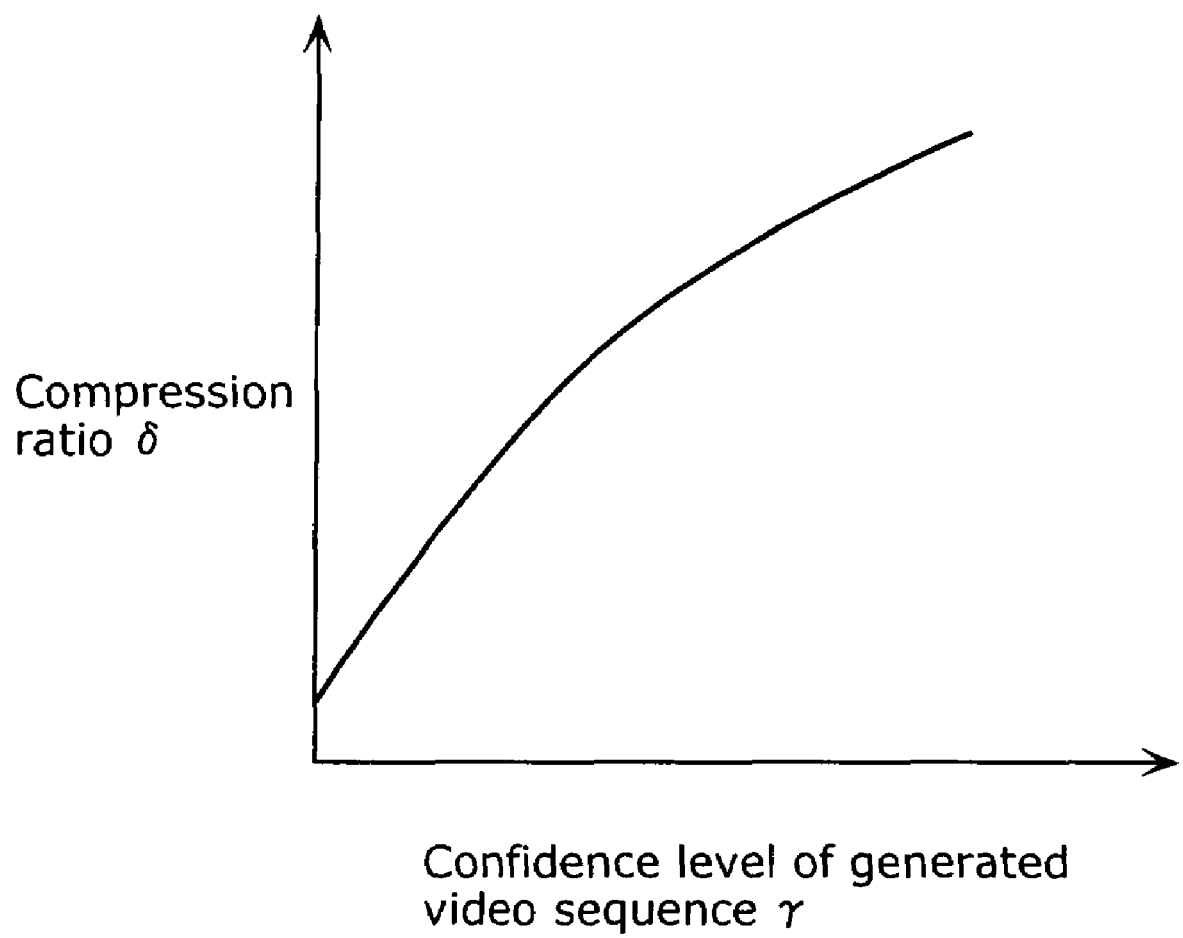
FIG. 25 is a graph which shows an example of the relationship between a confidence level and a compression ratio used when the compression ratio for coding an image is changed using the confidence level of a generated image.

By outputting the confidence level of a generated video sequence, it is possible to increase the compression ratio of the outputted video sequence to be coded and compressed according to MPEG when its confidence level is low, and to decrease the compression ratio thereof when its confidence level is high. Therefore, an appropriate compression ratio can be set. For example, a confidence level $\gamma$ of a generated video sequence and a compression ratio $\delta$ for coding the sequence are set in monotonically increasing relationship as shown in FIG. 25, and coding is performed at the compression ratio $\delta$ which corresponds to the value $\gamma$ of the confidence level of the generated video sequence. Since the generated video sequence may include a certain margin of error when its confidence level is low, it is expected that a substantial loss of information does not occur even at an increased compression ratio. Therefore, an effective reduction of data amount can be achieved. Here, a compression ratio is a ratio of an amount of coded image data with respect to an amount of original image data. The amount of coded data decreases and thus the quality of the decoded data decreases, as the compression ratio increases (i.e., as the compression ratio has a larger value).

Similarly, in an MPEG environment or the like, by setting a highly confident frame preferentially to be a frame to be intra-coded such as an I-picture and other frames to be frames to be inter-coded, it is possible to improve the quality of a reproduced video sequence when it is fast-forwarded or paused. For example, as for the above generated video sequence, the confidence level $\gamma(t)$ of each frame is calculated, where t is a frame time. In order to select a frame to be intra-coded from among successive frames, such a frame is selected from among frames having values $\gamma(t)$ larger than a predetermined threshold value $\gamma(t)$, or a frame having the largest value $\gamma(t)$ is selected from among frames of a predetermined section of successive frames.

Note that the effects of the present invention can be achieved, regardless of whether or not coding processing is performed on the outputted video sequence.

The above example has been explained on the assumption that a pixel value is a single luminance value. However, it is also possible to generate a high-speed and high-resolution video sequence from color images by performing the above processing for luminance values on each of R, G, B components of the color images. There is another method for handling color information more easily to achieve the same effects. In that method, a low-speed image is divided into luminance components and chrominance components. Then the above processing is performed only on the luminance components so as to generate a high-speed and high-resolution luminance image, and the chrominance components are interpolated to be expanded and added to the high-speed and high-resolution luminance image. In this case, the principal components of the image information are contained in the luminance information. Therefore, even if the chrominance information is interpolated to be expanded, it is possible to generate a higher-speed and higher-resolution video sequence than an inputted video sequence by combining the luminance information and chrominance information, and thus to reduce the processing amount compared with the separate processing of R, G, B components.

Figure 26:
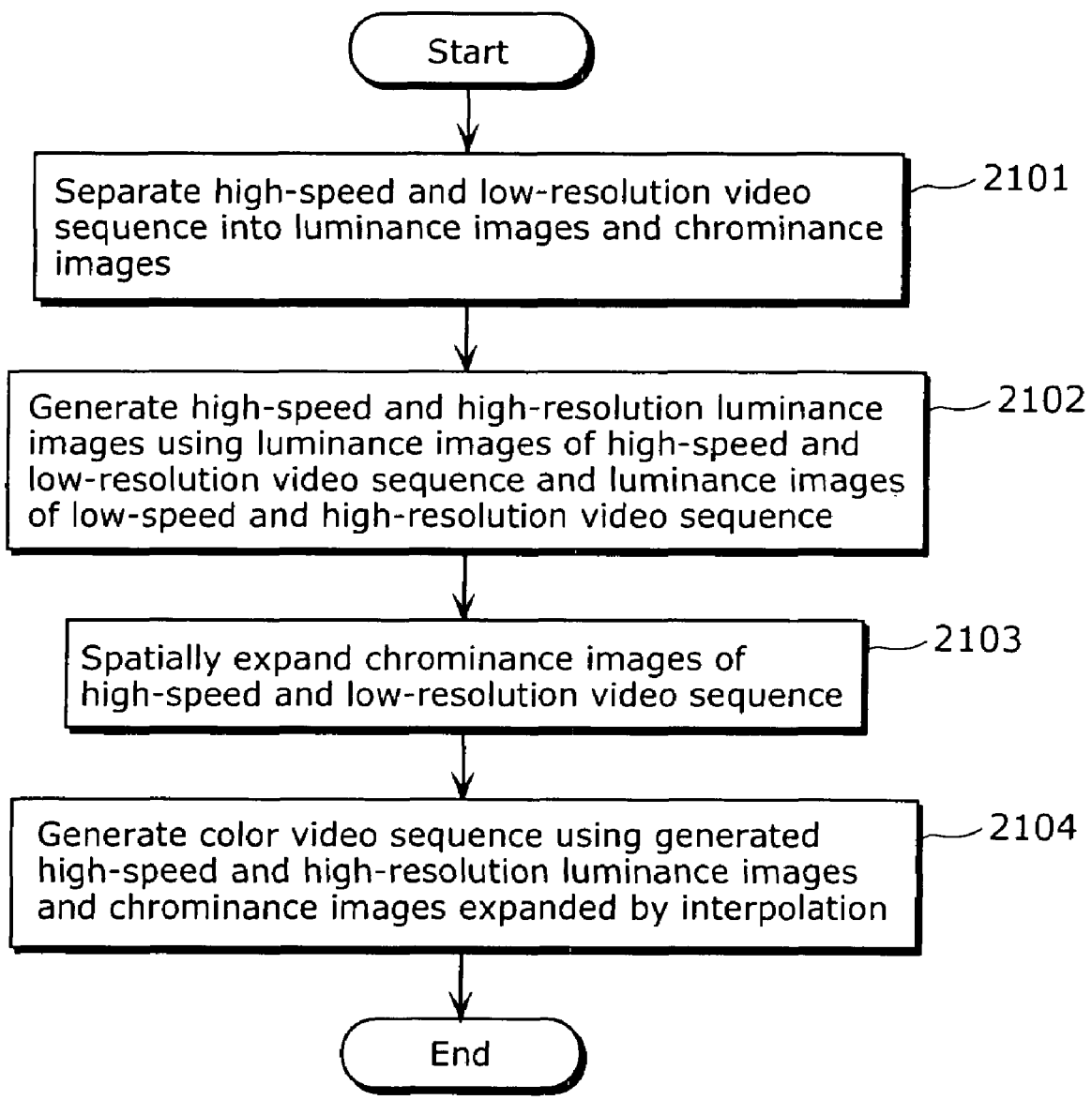
FIG. 26 is a flowchart which shows a sequence of processes for integrating color video sequences.

FIG. 26 shows the sequence of processes to be performed on color images. Images of a high-speed and low-resolution video sequence are divided into luminance images and chrominance images in Step 2101, and then in Step 2102, a high-speed and high-resolution video sequence is generated using these luminance images and the luminance images of a low-speed and high-resolution video sequence, according to the process sequence shown in FIG. 5. In Step 2103, the chrominance images are interpolated to be expanded so as to have the same number of pixels as the high-resolution images. In Step 2104, the generated luminance images and the interpolated and expanded chrominance images are synthesized so as to generate a high-speed and high-resolution color images. As described above, the image integration unit 104 extracts chrominance information from a high-speed and low-resolution video sequence, and generates a new intermediate video sequence from the luminance information of the high-speed and low-resolution video sequence as well as a low-speed and high-resolution video sequence. Then, the image integration unit 104 adds the chrominance information to the generated intermediate video sequence so as to generate a new final video sequence. Therefore, less processing is required for integrating images of a color video sequence.

As described above, according to the image generation system 100 in the first embodiment, the constraint control unit 104b determines, according to the confidence level obtained by the motion estimation unit 103, the degree to which external model constraints and motion constraints are to be imposed, and high-speed images and low-speed images are integrated using the imposed constraints. Therefore, it is possible to obtain a high-speed and high-resolution video sequence even when motion estimation cannot be performed or the accuracy of motion estimation is low in the corresponding image area.

Note that the first embodiment describes an example where the entire processing is performed across the video sequence. However, it is acceptable to spatially and temporally divide a video sequence into regions and the same processing as mentioned above is performed on each region so as to generate partial high-speed and high-resolution video sequences, and then to spatially and temporally combine the generated partial video sequences to obtain a high-speed and high-resolution video sequence corresponding to the entire original video sequence. By spatially and temporally dividing a video sequence, it is possible to suppress the calculation processing and memory size required for processing a video sequence including a large number of pixels or frames. Particularly, by dividing a video sequence in the time direction, it is also possible to reduce temporal delay of image generation caused by processing previously inputted frames all at once.

Figure 27:
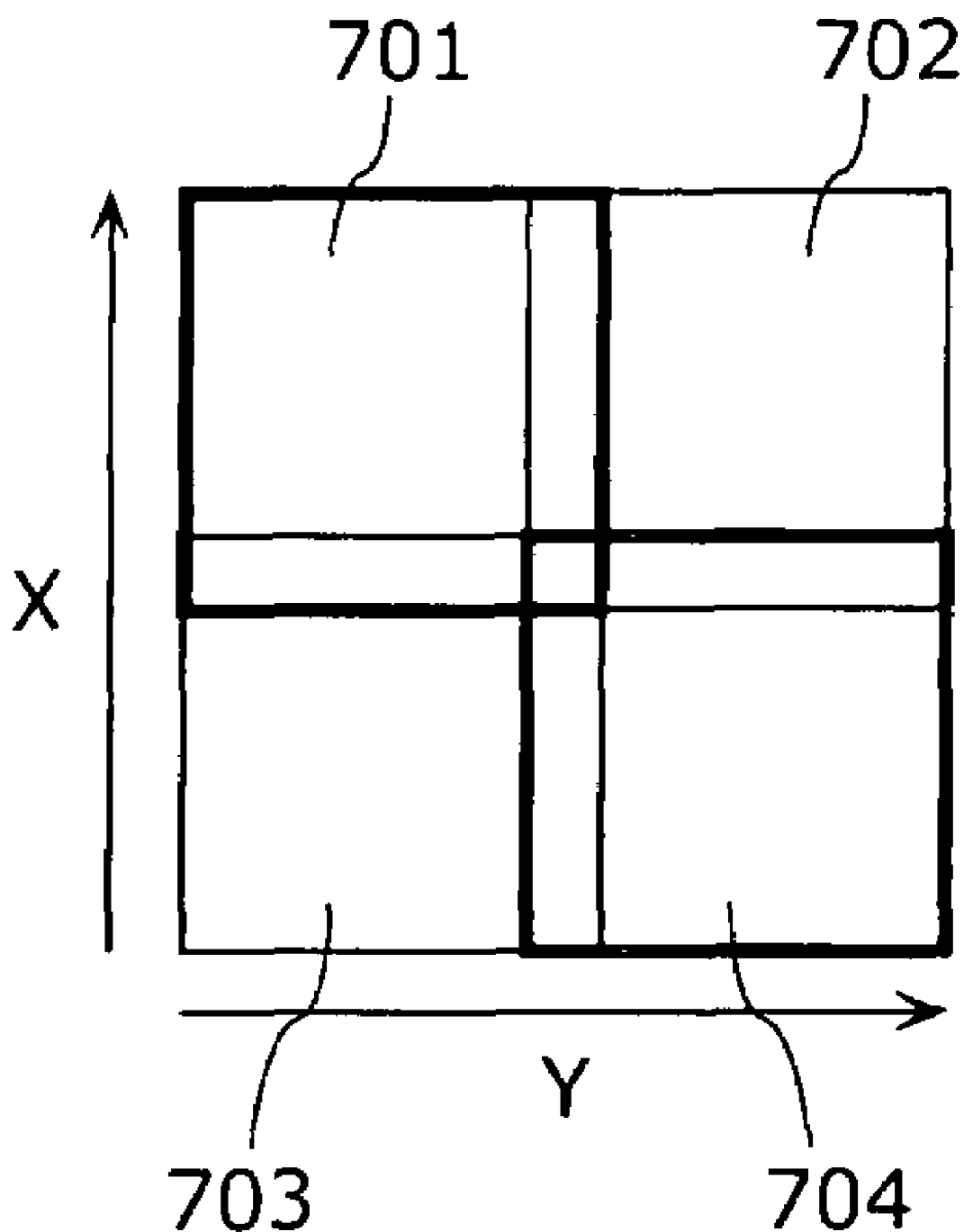
FIG. 27 is a diagram which shows an example of processing for dividing an image into regions.

When an image is divided into regions as mentioned above, respective regions may be set so that adjacent spatial and temporal regions overlap one another near the boundary between them. FIG. 27 shows an example where an image is divided so that adjacent regions overlap one other spatially. In FIG. 27, an image is divided into regions 701 to 704 so that they spatially overlap one another. By generating a video sequence corresponding to each region and then performing weighted averaging on pixel values of each region which overlaps another region, these regions are combined seamlessly. An image may be divided into regions, as is the division shown in FIG. 27, so that adjacent regions overlap one another in the time direction. Such overlapped parts allow suppression of discontinuity between adjacent regions created as division processing results.

Note that in such division processing for allowing regions to overlap one another, the size of the overlapped part is predetermined. The larger the size of the overlapped part is, the more enhanced the effect of reducing discontinuity in processing results between regions to be processed. The smaller the size of the overlapped part is, the more enhanced the effect of suppressing the increased calculation of the overlapped part.

When an image is divided into regions in the time direction, the boundary between adjacent regions may be set in the following manner. A change in an image between frames of a video sequence is previously calculated, and a temporal boundary is set for frames in which the change in the image is greater than a predetermined threshold. For example, a value SSD(t) as shown in the following Equation 17 is defined as a difference between adjacent frame images, and when SSD(t) >th is satisfied, the boundary is set between a frame of time t and a frame of time t+1. Then, the processing of the frames of time t and earlier ones of a sequence is performed separately from the processing of the frame of time t+1 and the following ones.

$$SSD(t) = \sum_{x=0}^{X_{max}} \sum_{y=0}^{Y_{max}} \{I(x, y, t) - I(x, y, t+1)\}^2 \quad \text{[Equation 17]}$$

Here, I(x, y, t) indicates the luminance at a position (x, y) in a frame image of time t, and th indicates a predetermined threshold. A boundary for separating processing need not be determined based on the threshold th, but rather it may be determined to be a time t when the SSD(t) becomes maximum in a sequence in the time domain in which the processing should be separated. By doing so, it is expected that discontinuity in processing results between temporally adjacent regions is less likely to be perceived because the discontinuity becomes relatively small with respect to a change in an image between frames.

Note that the above example shows a generation of a video sequence having the same frame rate as that of a high-speed and low-resolution video sequence and the same number of pixels as that of a low-speed and high-resolution video sequence. However, it is also possible to generate a video sequence having a much higher frame rate than that of the high-speed and low-resolution image or a video sequence having a much greater number of pixels than that of the low-speed and high-resolution video sequence.

For example, the same processing can be performed using Equations 18 and 19 instead of Equations 1 and 2 in order to generate an image having a frame rate of n times as high as that of a high-speed and low-resolution image.

$$HL(x_L, y_L, t_{HL}) = \sum_{t=0}^{1} \sum_{x=0}^{2} \sum_{y=0}^{2} HH(x, y, t) \quad \text{[Equation 18]}$$

$$LH(x, y, t_L) = \sum_{t=0}^{7} G(t) \cdot HH(x, y, t) \quad \text{[Equation 19]}$$

Here, x, y and t represent the x and y coordinates and the frame number of an image to be generated, $t_L$ represents the frame number of a low-speed and high-resolution image, and $x_L$, $y_L$, $t_{HL}$ represent the x and y coordinates and the frame number of a high-speed and low-resolution image, respectively.

Equation 18 shows that HH images are added in the spatial direction (x-y direction) as is the case with Equation 1 and further two frames are also added in the time direction so as to obtain the pixel values of a high-speed and low-resolution video sequence. In Equation 19, the number of frames to be added is twice as many as that in Equation 2.

As for motion estimation, u(x, y, t), v(x, y, t) and conf(x, y, t) are generated using the magnitudes of motions in the x and y directions $u(x_L, y_L, t_{HL})$ and $v(x_L, y_L, t_{HL})$, as well as the confidence level of the motion estimation $conf(x_L, y_L, t_{HL})$ obtained as a result of motion estimation of a high-speed and low-resolution images.

Here, u(x, y, t), v(x, y, t) and conf(x, y, t) are respectively calculated by expanding, by spatial and temporal interpolation, $u(x_L, y_L, t_{HL})$, $v(x_L, y_L, t_{HL})$ and $conf(x_L, y_L, t_{HL})$ n times (for example, two times) in the time direction and m times (for example, three times) in the spatial direction.

Particularly when the values of u(x, y, t) and v(x, y, t) are represented by the number of pixels, these values may be calculated by multiplying, n times and m times respectively, the values obtained by expanding $u(x_L, y_L, t_{HL})$ and $v(x_L, y_L, t_{HL})$ by spatial and temporal interpolation. This is because when a frame interval is 1/n times, the magnitude of motion also becomes 1/n times because an object moves at the same speed as the frame. Moreover, the value for representing the same magnitude of motion becomes m times because the number of pixels of one frame become m times in both x and y directions, respectively.

The same processing can be performed using Equations 20 and 21 instead of Equations 1 and 2 in order to generate an image having the number of pixels of n' times (for example, two times) as many as that of a low-speed and high-resolution image both vertically and horizontally.

$$HL(x_L, y_L, t) = \sum_{x=0}^{5} \sum_{y=0}^{5} HH(x, y, t) \quad \text{[Equation 20]}$$

$$HL(x_{LH}, y_{LH}, t_L) = \sum_{t=0}^{3} \left\{ G(t) \cdot \sum_{x=0}^{1} \sum_{y=0}^{1} HH(x, y, t) \right\} \quad \text{[Equation 21]}$$

Here, x and y indicate x-y coordinates of a pixel of an image to be generated, $x_{LH}$ and $y_{LH}$ indicate x-y coordinates of a pixel of a low-speed and high-resolution image, and $x_L$ and $y_L$ indicate x-y coordinates of a pixel of a high-speed and low-resolution image, respectively. In Equation 20, the numbers of pixels to be added in the x and y directions are respectively twice as many as those in Equation 1. Equation 21 shows that low-speed and high-resolution pixel values are obtained by adding pixels in the x and y directions in addition to the addition thereof in the time direction as shown in Equation 2.

As for motion estimation, $u(x, y, t)$, $v(x, y, t)$ and $\text{conf}(x, y, t)$ are generated using the magnitudes of motions in the x and y directions $u(x_L, y_L, t)$, $v(x_L, y_L, t)$ as well as the confidence levels of the motion estimation $\text{conf}(x_L, y_L, t)$ obtained as a result of motion estimation of a high-speed and low-resolution video sequence.

Here, $\text{conf}(x, y, t)$, $u(x, y, t)$ and $v(x, y, t)$ are respectively calculated by expanding, by spatial interpolation, $\text{conf}(x_L, y_L, t)$, $u(x_L, y_L, t)$ and $v(x_L, y_L, t)$ in the spatial direction n'×m times.

Particularly when the values of $u(x, y, t)$ and $v(x, y, t)$ are represented by the number of pixels, these values may be calculated by multiplying, n'×m times respectively, the values obtained by expanding $u(x_L, y_L, t)$ and $v(x_L, y_L, t)$ by spatial and temporal interpolation. This is because the value for representing the same magnitude of motion becomes n'×m times because the number of pixels in the x and y directions are respectively n'×m times.

Furthermore, by combining the processing using the above-mentioned Equations 18 and 19 with the processing using Equations 20 and 21, it is easy to generate a video sequence having the same frame rate as that of a high-speed and low-resolution video sequence and the same number of pixels as that of a low-speed and high-resolution video sequence.

The image generation apparatus of the present invention has been described based on the first embodiment, but the present invention is not limited to this embodiment. The present invention also includes other embodiments obtained by adding variations conceived by those of ordinary skill in the art to the present embodiment.

A part or all of the image generation processing performed by the image generation apparatus of the present invention may be performed by a dedicated device. Or, a computer terminal apparatus, a communication device placed in a base station or the like, or a CPU integrated in a standalone computer may execute an image generation processing program so as to perform the above-mentioned image generation processing.

Figure 28:
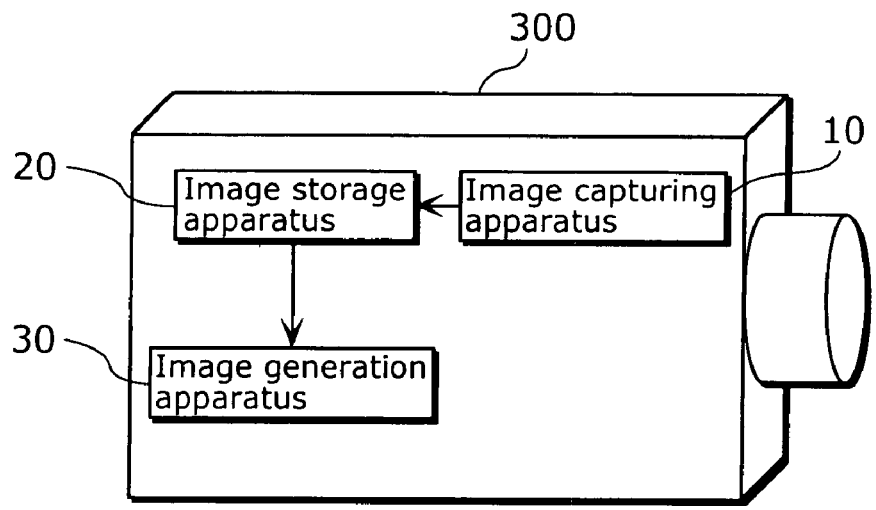
FIG. 28 is a block diagram which shows a specific example of an image generation system.

The present invention may be embodied as a camera 300 as shown in FIG. 28, namely as a standalone apparatus, using a structure including all the units of the image generation system 100 shown in FIG. 3 except for the display apparatus 40.

Furthermore, the present invention may be embodied as a camera with a video recording/playback function by adding the display apparatus 40 to the camera 300 shown in FIG. 28.

Figure 29:
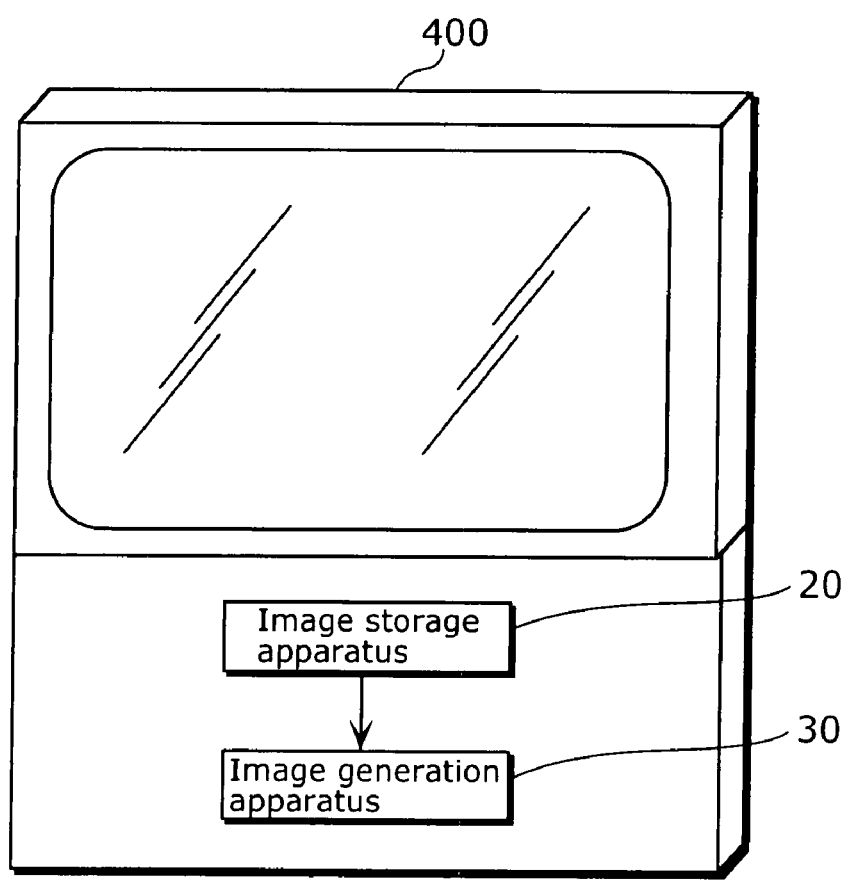
FIG. 29 is a block diagram which shows a specific example of an image generation system.

The present invention may also be embodied as a display device 400 as shown in FIG. 29, using a structure including all the units of the image generation system 100 shown in FIG. 4 but the image capturing apparatus 10. In this case, it is possible to display a previously recorded video sequence with an enhanced spatial and temporal resolution.

Second Embodiment

The second embodiment of the present invention is one example where the above-described image generation apparatus is applied to a plurality of video sequences having different spatial and temporal phases. In the second embodiment, the image receiving unit receives, as the plurality of video sequences having different spatial and temporal phases, a plurality of video sequences, each of which is made up of a series of one type of field images through a plurality of frames, out of a plurality of types of field images which represent respective different parts of each original frame of an original video sequence obtained at different times. The image integration unit generates a new video sequence which is made up of frames having a frame rate which is the same as a field rate of the original video sequence and a resolution which is the same as a resolution of the original frame.

With this structure, by integrating field images of a lower resolution than that of original frame images by the processing as described in the first embodiment, it is possible to generate a high-speed and high-resolution video sequence including frame images of a resolution equivalent to that of the original frame images at a time rate equivalent to that of the field images.

In addition, by photographing an object so that the exposure time of the field image becomes longer than the temporal interval between temporally adjacent fields, it is possible to obtain more amount of information of the image.

An image generation system in the second embodiment of the present invention will be described in detail with reference to the diagrams.

Figure 30:
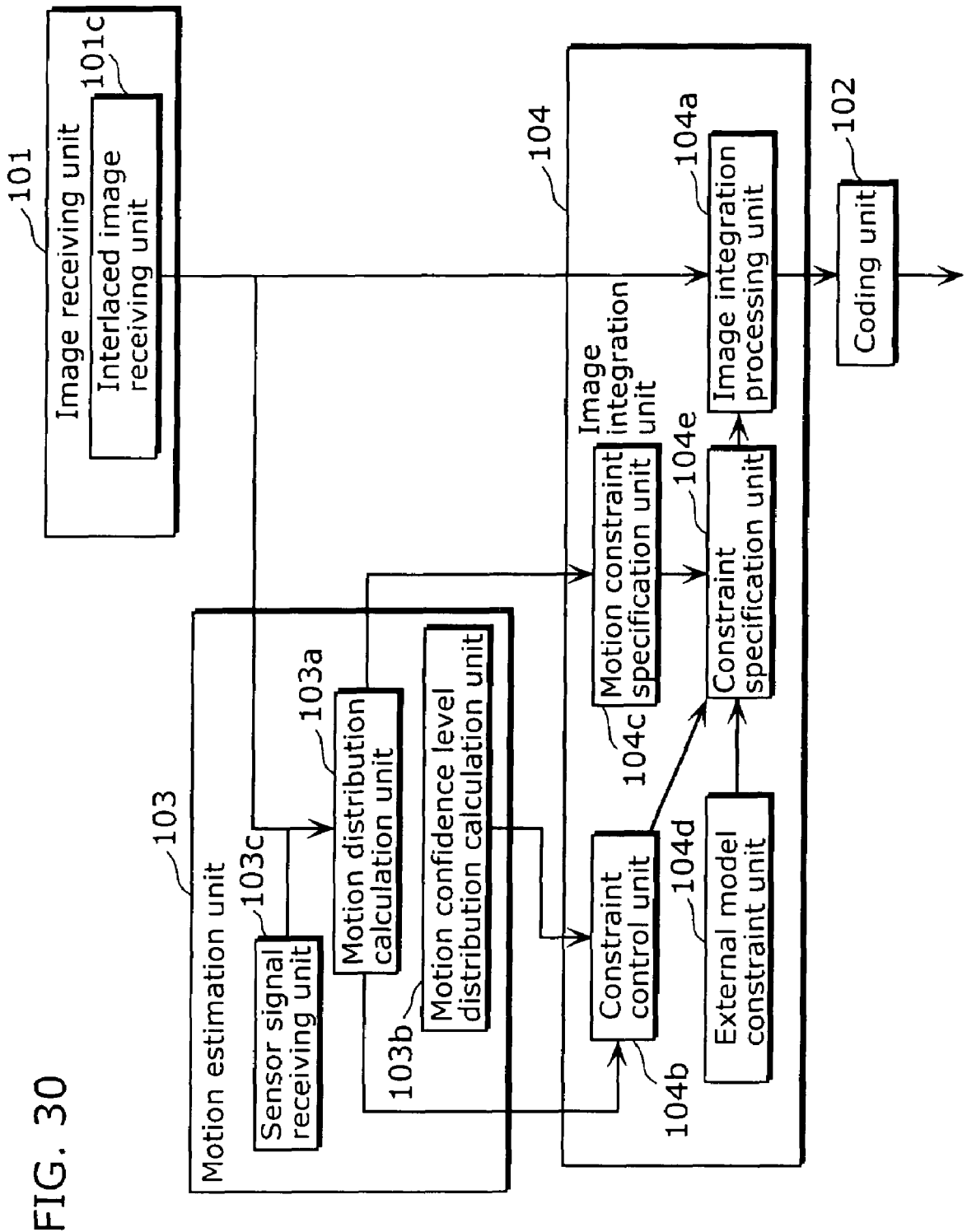
FIG. 30 is a functional block diagram which shows the structure of the image generation apparatus in a second embodiment.

FIG. 30 shows the structure of an image generation apparatus in the second embodiment. The basic structure is the same as that in the first embodiment, but different in that the image receiving unit 101 includes an interlaced image receiving unit 101c which photographs the same object.

The interlaced image receiving unit 101c receives an image of one frame as n (n is an integer of 2 or greater) interlaced images. Specifically, it receives n types of field images which are different in their pixel positions in images and imaging timings (i.e., a plurality of video sequences in different spatial and temporal phases).

Figure 31:
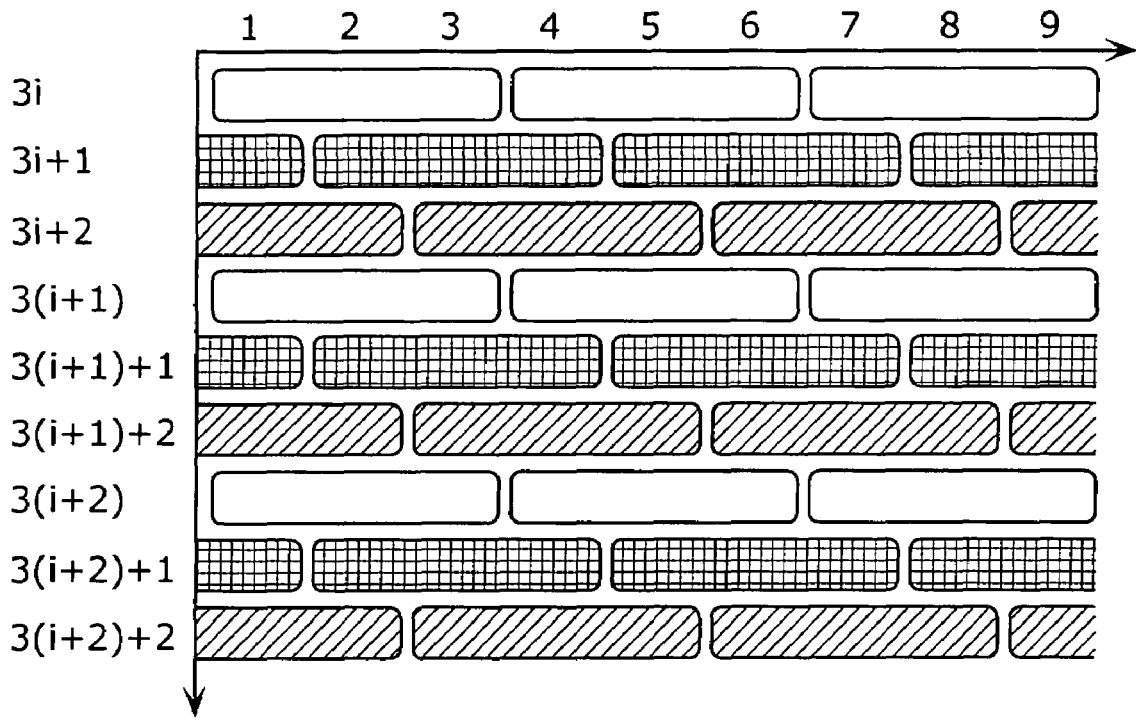
FIG. 31 is a diagram which shows an example of positions and timings of capturing inputted images.
Figure 32:
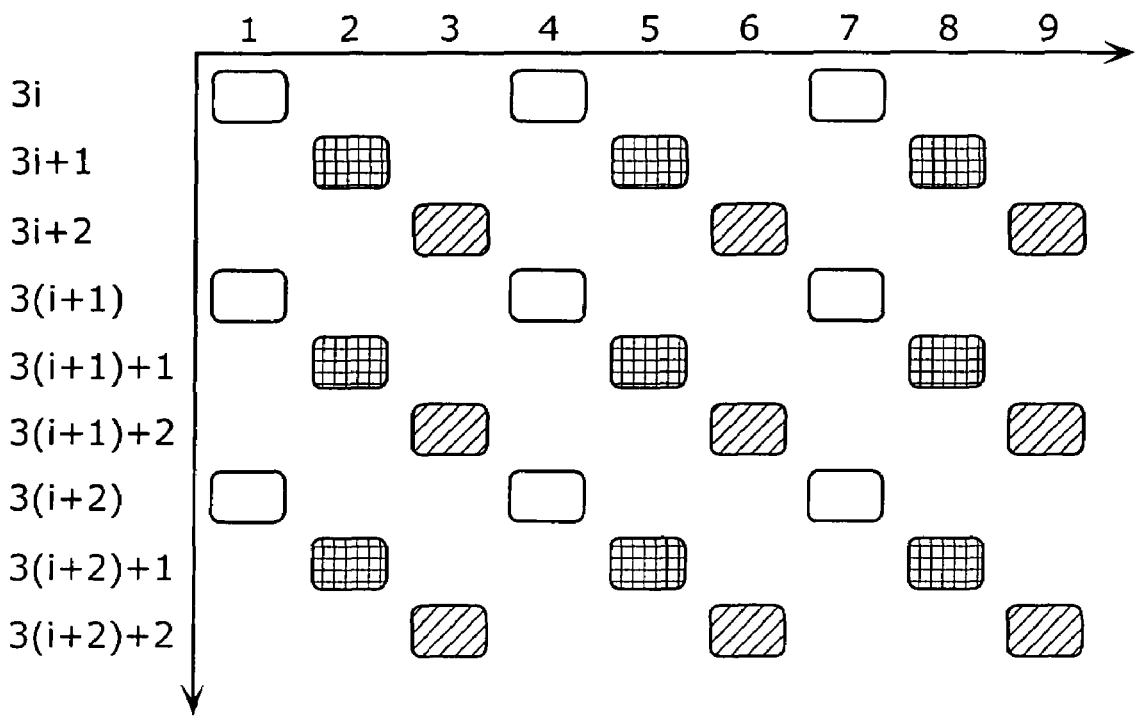
FIG. 32 is a diagram which shows an example of positions and timings of capturing inputted images.

An example of a method for capturing different field images will be explained with reference to FIGS. 31, 34, 35, 36 and 37. FIGS. 31 and 32 show the imaging timings of respective parts of field images when n=3. In these diagrams, the numbers on the horizontal axis represent the field numbers and correspond to respective imaging timings. The numbers on the vertical axis represent the vertical axis (the number of horizontal lines) of each image. "i" is an arbitrary integer of 0 or greater and indicates each horizontal line position in the image.

In these diagrams, each rectangle represents an exposure time period at each pixel position. When n=3, a white rectangle, a grid rectangle and a hatched rectangle respectively represent three types of field images of different line positions and imaging timings. In this case, these plural field images are obtained by capturing one frame image at different timings for each horizontal line position. Respective horizontal lines of each field image are captured simultaneously.

Here, an exposure time of each field image does not need to be shorter than an interval between adjacent fields (like FIG. 32), and it may be longer as shown in FIG. 31. In such a longer exposure time, information about a change in luminance of an object can also be obtained, thus allowing the generation of a high-resolution video sequence using the above information.

Figure 33:
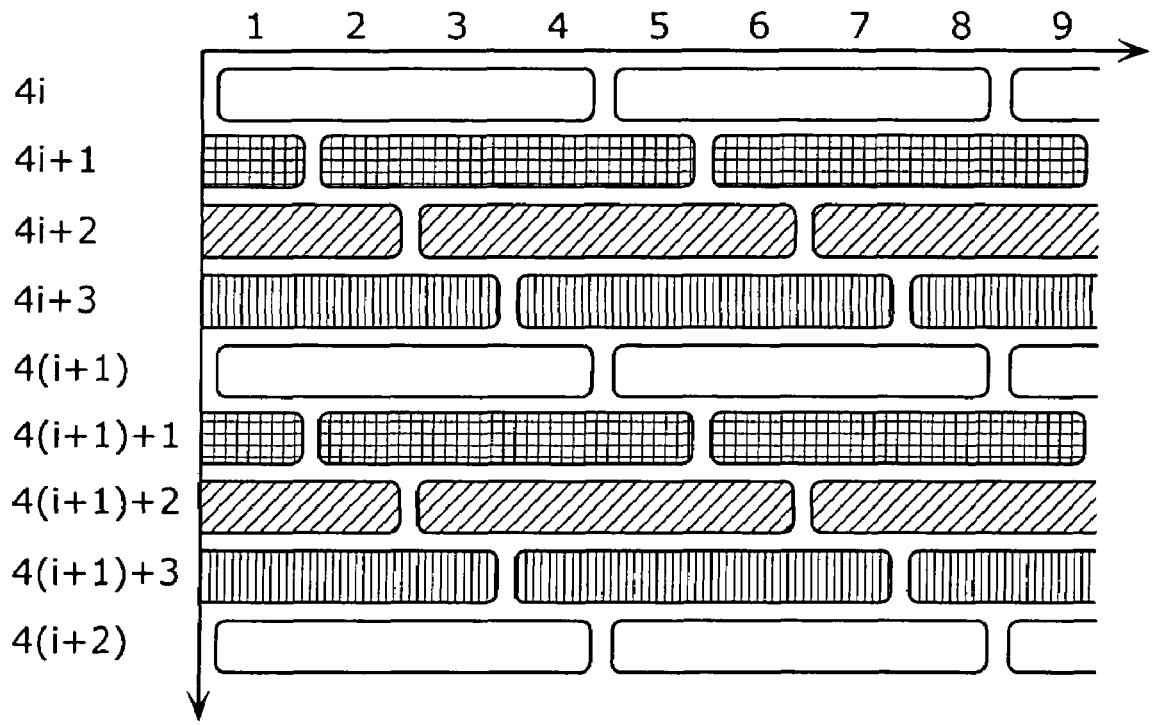
FIG. 33 is a diagram which shows an example of positions and timings of capturing inputted images.
Figure 34:
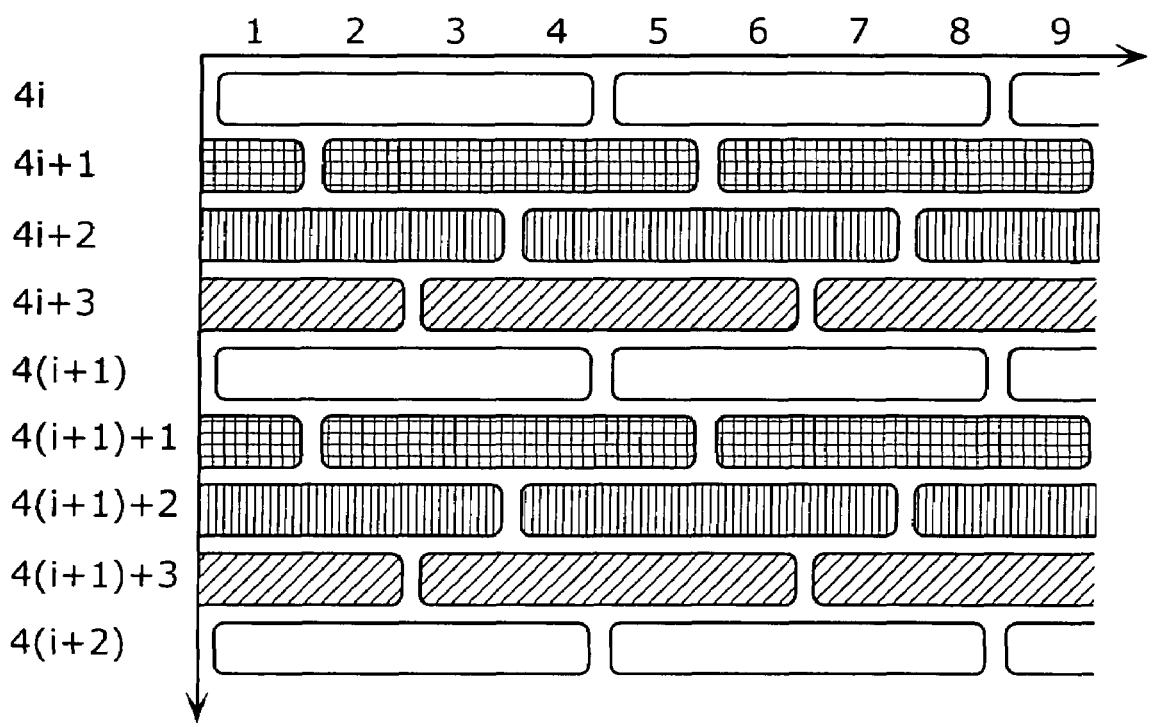
FIG. 34 is a diagram which shows an example of positions and timings of capturing inputted images.

FIGS. 33 and 34 show imaging timings of four types of field images (white rectangles, grid rectangles, hatched rectangles and vertical striped rectangles) when n=4. FIG. 33 is different from FIG. 34 in the image capturing order of respective lines. Adjacent lines do not always need to be captured one by one as shown in FIG. 33. It is more desirable that the lines to be captured are located at spatially and temporally dispersed places as shown in FIG. 34.

Figure 35:
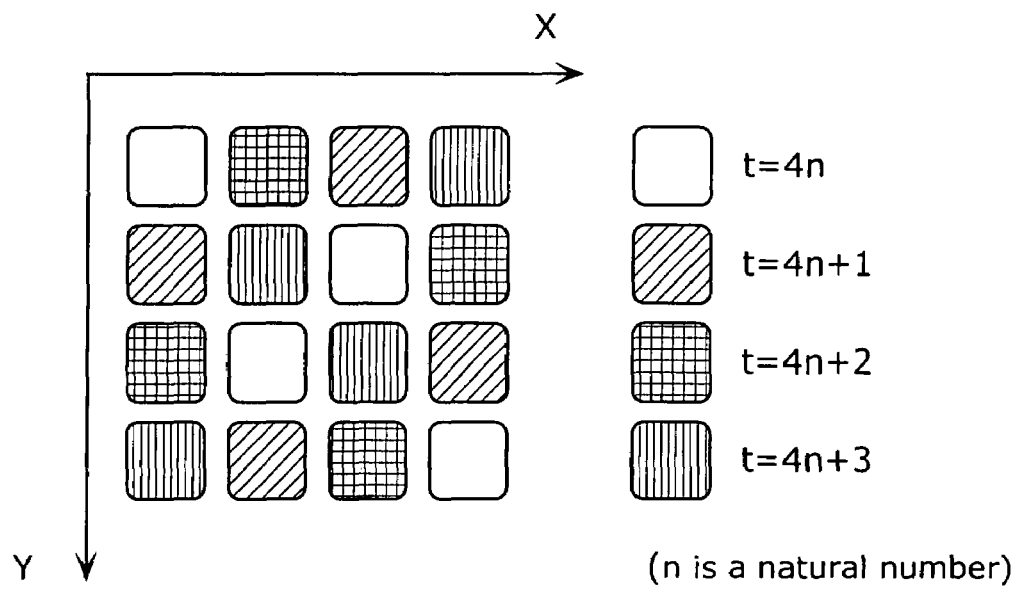
FIG. 35 is a diagram which shows an example of positions and timings of capturing inputted images.

FIG. 35 shows the imaging positions (respective rectangles indicate pixel positions) and imaging timings (different patterns of rectangles indicate different timings) of respective field images when the imaging position and imaging timing are also changed in the horizontal direction of an image in the case of n=4. In FIG. 35, the imaging timings of four types of pixels are temporally different from those in FIGS. 33 and 34. The captured pixels are defined so that they are temporally dispersed both vertically and horizontally (in both y axis and x axis directions) of an image.

When the above-mentioned interlaced images are inputted, pixel values in different fields can be obtained at different timings. Therefore, it is possible to input images consisting of more pixels even if they are read at the same speed as in the normal progressive image capturing method.

Next, the following Equations 22 to 24 show the relationships between inputted pixel values (luminance values in this case) and the pixel values of a high-speed and high-resolution video sequence in the above-mentioned case (i.e., n=3). The relationships shown in Equations 22 to 24 are used for image generation as external model constraints which should be satisfied by each pixel of the high-speed and high-resolution video sequence, as is the case with Equations 1 and 2 in the first embodiment.

$$MI1(x, y, t1) = \sum_{t=3\times t1}^{3\times t1+2} HH(x, y, t)$$ [Equation 22]

$$MI2(x, y, t2) = \sum_{t=3\times t2+1}^{3\times t2+3} HH(x, y, t)$$ [Equation 23]

$$MI3(x, y, t3) = \sum_{t=3\times t3+2}^{3\times t3+4} HH(x, y, t)$$ [Equation 24]

Here, HH(x, y, t) represents the pixel value at a pixel position (x, y, t) of a high-speed and high-resolution image, as is the case with the first embodiment. Here, the number of pixels in each image of the high-speed and high-resolution video sequence is the sum of the numbers of pixels of all the field images (i.e., the number of pixels of one type of field images multiplied by n), and the frame interval of the high-speed and high-resolution video sequence is the same as the temporal interval between temporally adjacent field images.

Figure 36:
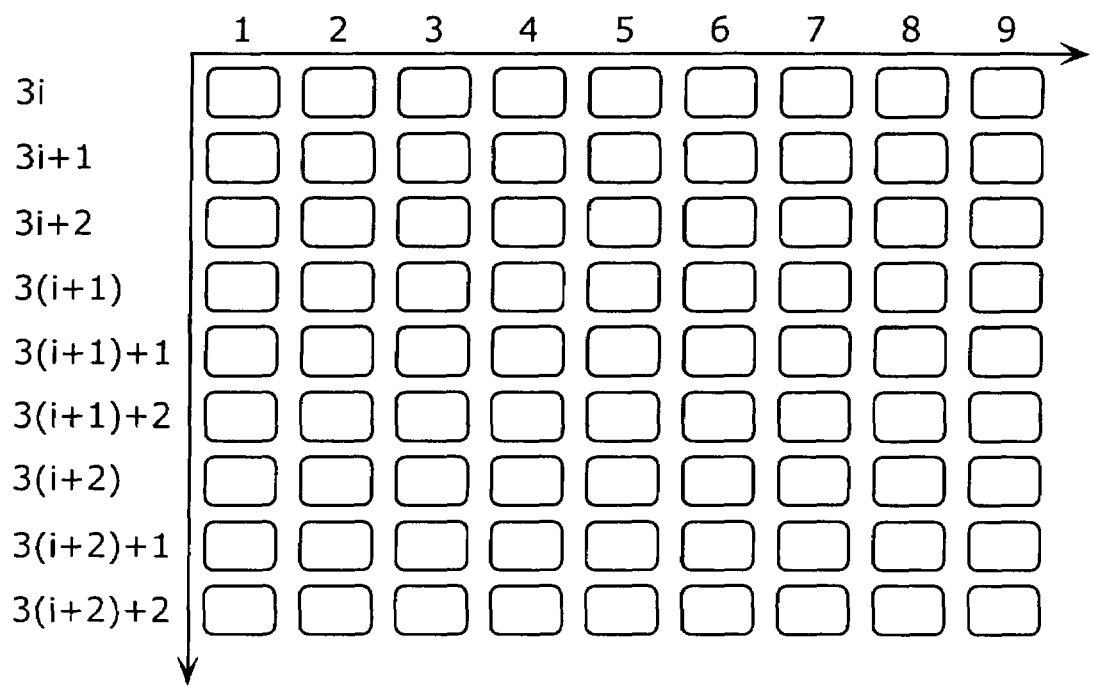
FIG. 36 is a diagram which shows an example of pixel arrangement of a high-speed and high-resolution video sequence.

FIG. 36 shows an example of pixel arrangement in each frame of a high-speed and high-resolution video sequence which corresponds to the frames shown in FIG. 31 and FIG. 32. Each of white rectangles in FIG. 36 shows the pixel position in each frame. MI1 (x, y, t1) represents the pixel value at the pixel position (x, y, t1) in the first field image, and Equation 22 shows that the image equivalent to three fields are exposed. The same applies to MI2 (x, y, t1) and MI3 (x, y, t1).

Here, the pixel value in each image is proportional to an amount of incident light received when the image is captured, and the proportional constant is also common to all the pixels. If the pixel value is not proportional, it is modified in the same manner as in the first embodiment. R, G and B color values can also be handled in the same manner as luminance values. After the image is inputted, the same processing is performed as in the first embodiment.

Figure 37:
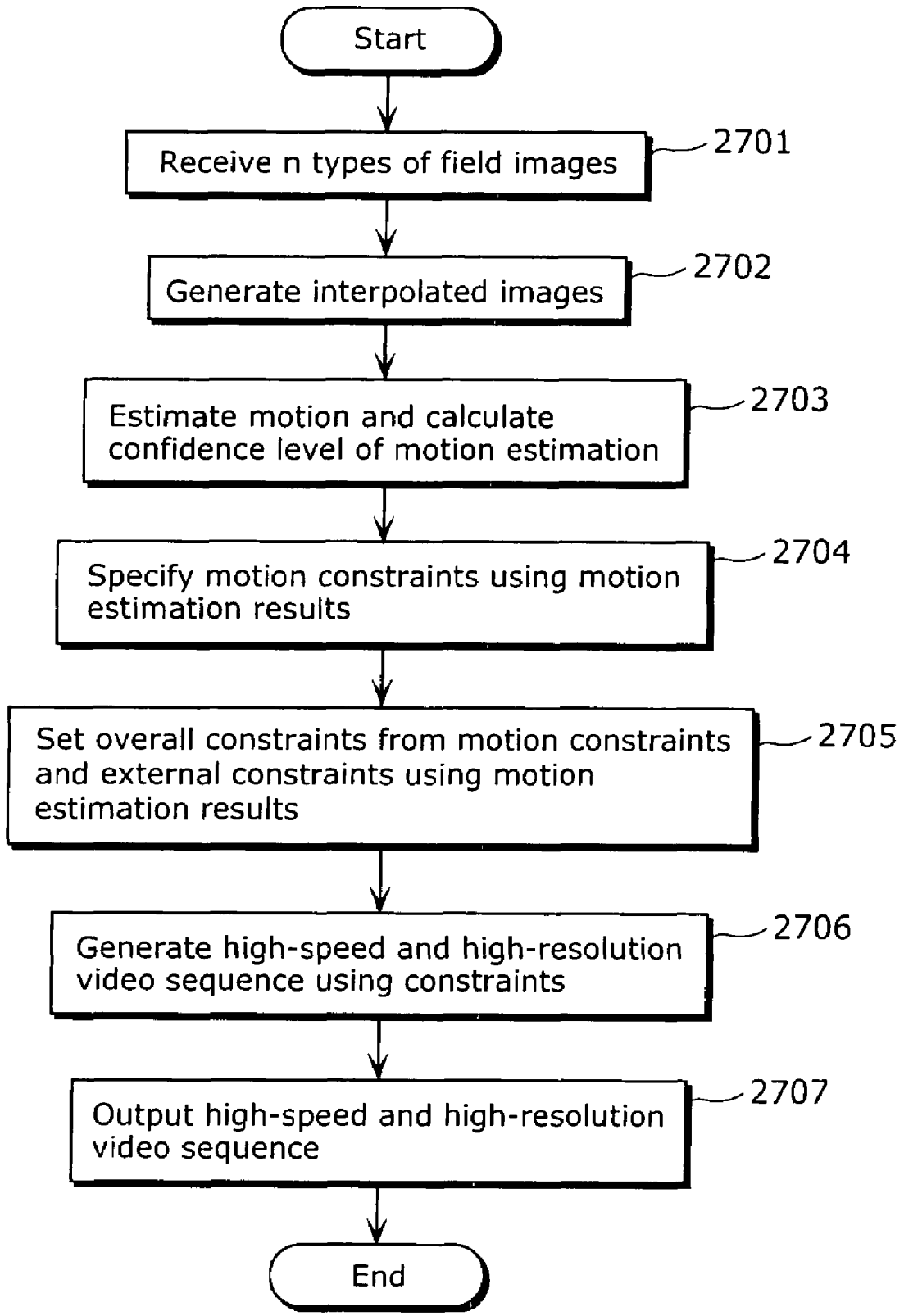
FIG. 37 is a flowchart which shows the operations of the image generation apparatus.

A sequence of operations in the second embodiment will be described with reference to FIG. 37. The major operations are the same as those in the first embodiment, but in Step 2701 where images are inputted, n types of interlaced images which are different in their pixel positions and imaging timings are read.

Figure 38:
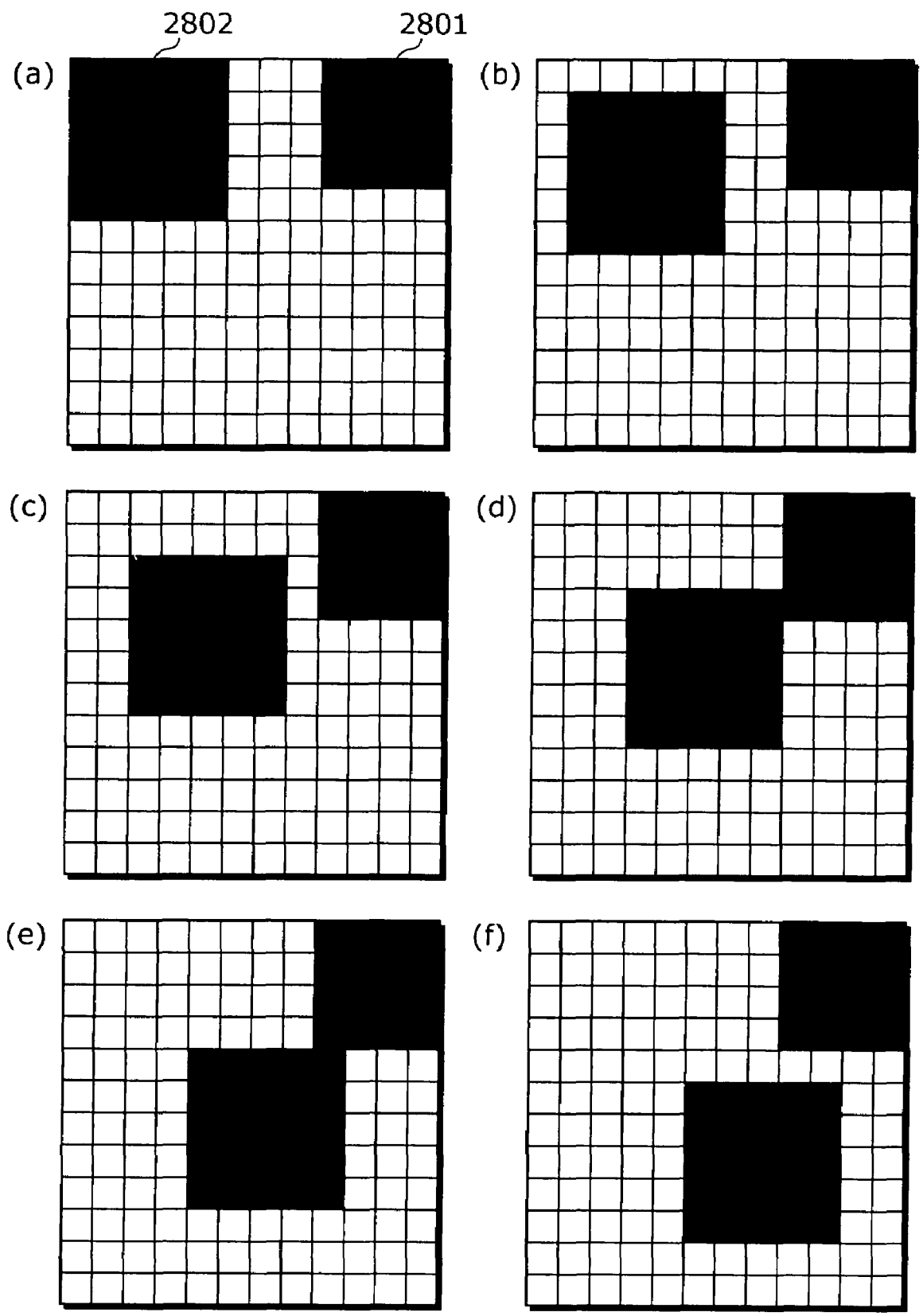
FIG. 38 is a diagram which shows examples of frame images of a high-speed and high-resolution video sequence in the second embodiment.

FIG. 38 shows an example of objects (i.e., a high-speed and high-resolution video sequence to be actually generated). In FIG. 38, six frame images of twelve pixels by twelve pixels are shown in time order from (a) to (f). These images each include a still black rectangle 2801 and another black rectangle 2802 which is moving toward the lower right.

FIGS. 39, 40 and 41 show examples of interlaced images obtained by photographing the objects shown in FIG. 38 using the image capturing method (n=3) shown in FIG. 31. FIG. 39 shows the result obtained by photographing the objects in FIG. 38 at the imaging positions and the imaging timings of white rectangles in FIG. 31. In this diagram, a distance between pixels is indicated as blanks. In FIG. 39, (a) shows an image area of vertical four pixels by horizontal twelve pixels obtained by capturing the first through third frames in FIG. 38, in which diagonally shaded parts represent the pixels which are blurred due to the movement of the black rectangles. In FIG. 39, (b) shows an image area obtained by capturing the fourth through sixth frames.

Similarly to FIG. 39, FIG. 40 shows two field images obtained at the imaging positions and the imaging timings of hatched rectangles in FIG. 31, whereas FIG. 41 shows two field images obtained at the imaging positions and the imaging timings of grid rectangles in FIG. 31.

Next, in Step 2702, pixel values at non-imaging positions and timings are obtained by performing interpolation processing on the images in FIGS. 40, 41 and 42, when necessary, so as to obtain high-speed and high-resolution images.

No non-imaging time exists in the image capturing method as shown in FIG. 31 because the images are exposed for a time period equivalent to three frames of high-speed and high-resolution images. However, a non-imaging position and timing exist in the image capturing method as shown in FIG. 32.

FIGS. 44, 45 and 46 show examples of interlaced images obtained using the image capturing method shown in FIG. 32. Compared with the interlaced images shown in FIGS. 39, 40 and 41, the images shown in FIGS. 44, 45 and 46 have no blurred pixels, whereas information of the non-imaging timing is not reflected to the pixel values.

Therefore, the pixel values at non-imaging positions and non-imaging timings are obtained from previously obtained pixel values, using a common image interpolation method (such as bi-cubic interpolation). Interpolation may be performed by another method. For example, an interpolated image can be generated only using the constraints other than motion information (constraints based on motion estimation) in the image generation method as described in the first embodiment.

Even if an image including no non-imaging position is obtained using the image capturing method of FIG. 31, the image generation method in the first embodiment may be used for image generation. By doing so, it becomes possible to convert an image including motion blur into a more desirable image using constraints, and therefore improvement in motion estimation accuracy in the next step can be expected.

In the above example, motion is estimated and the confidence level of the motion estimation is calculated after an interpolated image is generated in Step 2702. It should be noted, however, that the effects of the present invention can also be achieved even if motion is estimated and the confidence level of the motion estimation is calculated using an image on which interpolation has not yet been performed.

Next, motion is estimated and the confidence level of the motion estimation is calculated using an image including no non-imaging position (Step 2703). The processes from Step 2703 to Step 2704 correspond to those in the first embodiment (see Step 602 to Step 603 in FIG. 5).

Next, an overall constraint J(HH) is set for a target high-speed and high-resolution video sequence (Step 2705). The following Equation 25 shows an example of an overall constraint J in the second embodiment.

$$J=|MI1-MI1'|^2+|MI2-MI2'|^2+|MI3-MI3'|^2+Qs+Qm+Qse+Qte+Qpc \quad \text{[Equation 25]}$$

In Equation 25, the first term of the right side is a constraint indicating the difference (the sum of squares of the differences between the corresponding pixels) between an interlaced image MI1' created from a high-speed and high-resolution video sequence using Equation 22 and an interlaced image MI1 which is actually inputted to the interlaced image receiving unit 101*c*.

The second term is a constraint indicating the difference between an interlaced image MI2' created from a high-speed and high-resolution video sequence using Equation 23 and an interlaced image MI2 which is actually inputted to the interlaced receiving unit 101*c*.

The third term is a constraint indicating the difference between an interlaced image MI3' created from a high-speed and high-resolution video sequence using Equation 24 and an interlaced image MI3 which is actually inputted to the interlaced receiving unit 101*c*.

The constraints in the first to third terms are used so that the relationship of luminance values between a generated image and a captured image satisfies the relationships shown in Equations 22 to 24 as much as possible. In other words, these constraints are the conditions for avoiding inconsistency in luminance values between the generated image and the captured image as much as possible. The fourth and the following terms of the right side of Equation 25 are equal to those of Equation 12 in the first embodiment.

The following Steps 2706 and 2707 correspond to Steps 605 and 606 of FIG. 3 in the first embodiment.

Figure 43:
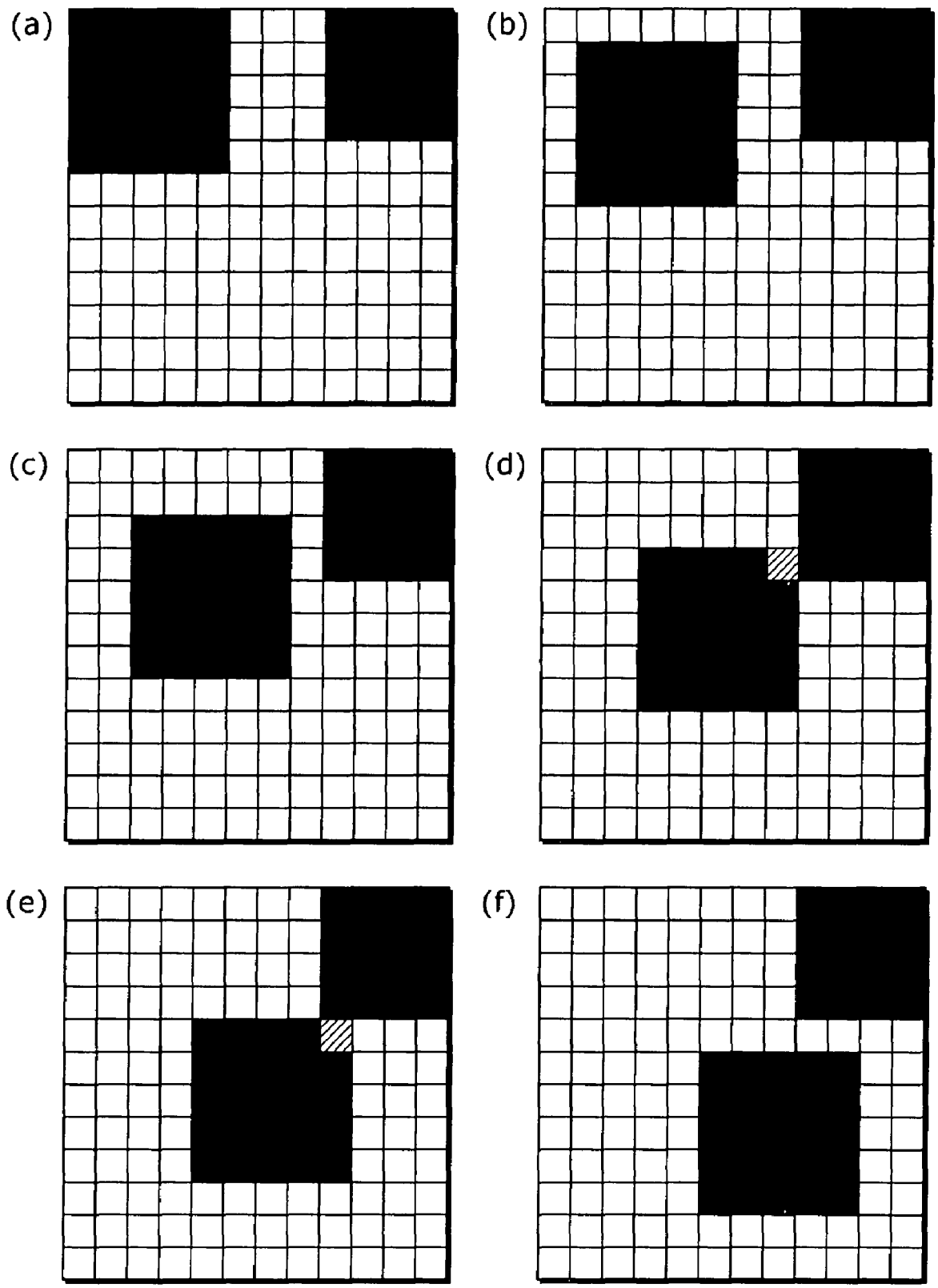
FIG. 43 is a diagram which shows examples of frame images of a generated video sequence.

FIGS. 42 and 43 show examples of generated images. FIG. 42 shows examples of images generated without using the confidence level of motion estimation, whereas FIG. 43 shows examples of images generated using the confidence level of motion estimation.

As is the case with the first embodiment, since motion estimation generally becomes difficult near the boundary between two black rectangles in the images of FIG. 38, an error tends to occur in motion estimation. Therefore, the confidence level of motion estimation tends to have a lower value near the boundary between the two rectangles in each field image.

If the confidence level of motion estimation is not used, the images are generated using inaccurate motion estimation near the boundary between rectangles, which causes the images shown in FIG. 42. On the other hand, if the confidence level of motion estimation is used, it is possible to obtain desirable images as shown in FIG. 43, without placing importance on the result of motion estimation, but rather using other high-speed conditions preferentially for the areas near the boundaries between rectangles.

In the second embodiment, by setting constraints using the confidence level of motion estimation to be used, as described above, it is possible to obtain a high-speed and high-resolution video sequence even if the inputted images include areas on which motion estimation is difficult to be performed.

Furthermore, according to the structure of the second embodiment, the image receiving unit receives images of which pixel values are read in the different order, at the different timing, and in the different manner from the pixel values read from a common imaging element, thereby giving an advantage that the higher spatial and temporal resolution of images than the images captured by such a common imaging element can be achieved.

Note that the above-mentioned constituent units correspond to the elements defined in the claims as follows. To be more specific, examples of "the image receiving unit", "the motion estimation unit", "the external model constraint unit" and "the image integration unit" in the claims correspond to the image receiving unit 101, the motion estimation unit 103, the external model constraint unit 104*d* and the image integration unit 104, respectively. These elements defined in the claims are not limited only to the constituent units of the above embodiments, but also include their equivalents.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The present invention can be used not only as an image generation apparatus which generates a new video sequence from a plurality of video sequences, particularly as an image generation apparatus which generates a high-speed and high-resolution video sequence from a high-speed and low-resolution video sequence and a low-speed and high-resolution video sequence, but also as a video device or system, a video synthesis apparatus, a video editing apparatus, an image reconstruction apparatus, an image reconstruction program, and the like, in which such an image generation apparatus is incorporated.

What is claimed is:

1. An image generation apparatus that generates, from a plurality of video sequences obtained by photographing a same object, a new video sequence which represents the same object, said image generation apparatus comprising:
   an image receiving unit operable to receive a first video sequence including frames having a first resolution and a second video sequence including frames having a second resolution which is higher than the first resolution, each frame of the first video sequence being obtained with a first exposure time, and each frame of the second video sequence being obtained with a second exposure time which is longer than the first exposure time; and
   an image integration unit operable to generate, from the first video sequence and the second video sequence, the new video sequence including frames having a resolution which is equal to or higher than the second resolution, at a frame rate which is equal to or higher than a frame rate of the first video sequence, by reducing a difference between a value of each frame of the second video sequence and a sum of values of frames of the new video sequence which are included within an exposure period of a frame of the second video sequence.

2. The image generation apparatus according to claim 1, wherein each frame of the second video sequence is obtained by open exposure between the frames of the second video sequence.

3. The image generation apparatus according to claim 1, further comprising
   a constraint unit operable to specify a constraint to be satisfied by pixel values of the new video sequence to be generated, based on continuity between pixel values of spatially and temporally adjacent pixels,
   wherein said image integration unit is operable to generate the new video sequence in which the specified constraint is satisfied.

4. The image generation apparatus according to claim 1, further comprising:

a motion estimation unit operable to estimate a motion of the same object from at least one of the plurality of video sequences received by said image receiving unit; and a constraint unit operable to specify a constraint to be satisfied by pixel values of the new video sequence to be generated, based on a result of the estimated motion, wherein said image integration unit is operable to generate the new video sequence in which the specified constraint is satisfied.

5. The image generation apparatus according to claim 4, wherein said motion estimation unit is operable to calculate a confidence level of the estimated motion, and said image integration unit is operable to generate the new video sequence, using the specified constraint based on a result of the estimated motion for an image area with a high confidence level calculated by said motion estimation unit, and using a predetermined constraint other than the specified constraint based on the estimated motion for an image area with a low confidence level.

6. The image generation apparatus according to claim 5, wherein said motion estimation unit is operable to estimate the motion of the same object on the basis of blocks obtained by dividing each of the frames which constitute the first video sequence, and to calculate, as the confidence level, a negative value of a sum of squares of differences in pixel values between the blocks, and said image integration unit is operable to generate the new video sequence by setting, as the image area with the high confidence level, a block with a confidence level greater than a predetermined value, and setting, as the image area with the low confidence level, a block with a confidence level equal to or smaller than the predetermined value.

7. The image generation apparatus according to claim 4, wherein said motion estimation unit further includes an attitude sensor signal receiving unit operable to receive a signal from an attitude sensor that detects an attitude of an imaging device which images an object, and is operable to estimate the motion of the same object using the signal received by said attitude sensor receiving unit.

8. The image generation apparatus according to claim 1, wherein said image integration unit is operable to extract chrominance information from the first video sequence, to generate a new intermediate video sequence from the second video sequence and luminance information obtained from the first video sequence, and to generate the new video sequence by adding the chrominance information to the new intermediate video sequence.

9. The image generation apparatus according to claim 1, wherein said image integration unit is operable to calculate an amount of temporal change between frames of at least one of the plurality of video sequences, and to generate the new video sequence by setting a temporal boundary between frames between which the calculated amount of temporal change exceeds a predetermined value.

10. The image generation apparatus according to claim 1, wherein said image integration unit is further operable to calculate a value indicating a confidence level of the new video sequence, and to output the calculated value and the new video sequence.

11. An image generation method for generating a new video sequence from a plurality of video sequences, said image generation method comprising:

receiving a first video sequence including frames having a first resolution and a second video sequence including frames having a second resolution which is higher than the first resolution, each frame of the first video sequence being obtained with a first exposure time, and each frame of the second video sequence being obtained with a second exposure time which is longer than the first exposure time; and generating, from the first video sequence and the second video sequence, the new video sequence including frames having a resolution which is equal to or higher than the second resolution, at a frame rate which is equal to or higher than a frame rate of the first video sequence, by reducing a difference between a value of each frame of the second video sequence and a sum of values of frames of the new video sequence which are included within an exposure period of a frame of the second video sequence.

12. A computer-readable medium having a computer program recorded thereon, said computer program for generating a new video sequence from a plurality of video sequences, said computer program causing a computer to execute:

receiving a first video sequence including frames having a first resolution and a second video sequence including frames having a second resolution which is higher than the first resolution, each frame of the first video sequence being obtained with a first exposure time, and each frame of the second video sequence being obtained with a second exposure time which is longer than the first exposure time; and generating, from the first video sequence and the second video sequence, the new video sequence including frames having a resolution which is equal to or higher than the second resolution, at a frame rate which is equal to or higher than a frame rate of the first video sequence, by reducing a difference between a value of each frame of the second video sequence and a sum of values of frames of the new video sequence which are included within an exposure period of a frame of the second video sequence.

* * * * *

UNITED STATES PATENT AND TRADEMARK OFFICE
CERTIFICATE OF CORRECTION

PATENT NO. : 7,596,177 B2 Page 1 of 1
APPLICATION NO. : 11/785367
DATED : September 29, 2009
INVENTOR(S) : Taro Imagawa et al.

It is certified that error appears in the above-identified patent and that said Letters Patent is hereby corrected as shown below:

Title Page
In Section (56) References Cited, under the "OTHER PUBLICATIONS" heading,
"...Technical report of 1EICE..." should read --...Technical report of IEICE...--.

Signed and Sealed this

First Day of June, 2010

David J. Kappos
*Director of the United States Patent and Trademark Office*